United States Patent [19]

Shimatani et al.

[11] Patent Number: 4,905,258
[45] Date of Patent: Feb. 27, 1990

[54] DATA CIRCUIT-TERMINATING EQUIPMENT

[75] Inventors: Toshimichi Shimatani, Fuchuu; Yoshihiro Kawata, Tokorozawa; Masaharu Kamigaki, Tokyo, all of Japan

[73] Assignee: Iwatsu Electric Co., Ltd., Tokyo, Japan

[21] Appl. No.: 229,558

[22] Filed: Aug. 8, 1988

[30] Foreign Application Priority Data

Sep. 30, 1987 [JP] Japan ................................ 62-247600

[51] Int. Cl.$^4$ ............................................. H04L 25/38
[52] U.S. Cl. ........................................ 375/117; 370/49
[58] Field of Search .................. 375/117, 121; 370/41, 370/49, 105; 178/69 R

[56] References Cited

U.S. PATENT DOCUMENTS

| | | | |
|---|---|---|---|
| 4,569,062 | 2/1986 | Dellande et al. | 375/117 |
| 4,586,189 | 4/1986 | Tyrrell | 375/117 |
| 4,761,800 | 8/1988 | Lese et al. | 375/117 |

Primary Examiner—Benedict V. Safourek
Assistant Examiner—Marianne Huseman
Attorney, Agent, or Firm—Oblon, Spivak, McClelland, Maier & Neustadt

[57] ABSTRACT

There is disclosed a data circuit-terminating equipment (DCE) which connects a start-stop synchronous data terminal equipment (DTE) which is not synchronized with a PCM transmission line having various speeds. Further the DCE can satisfy recommendations of the V25 bis of CCITT. The DCE includes a start-stop synchronizing circuit to deliver a sampled request-to-send signal RS, a sampled send data and to transmit a clear-to-send signal CS to the DTE, a PLL obtaining a clock from the line, a timing generator generating timings for circuits, a mapping circuit mapping to make the sampled send data match into the line speed, a sending register converting transmission speed of the mapping circuit output to send to the line at the instructed period, a receiving register receiving data from the line to deliver data with the required speed during the required period for the DTE, and a demapping circuit receiving the receiving register output to demap and send to the DTE. In the DCE satisfying the recommendations, the demapping circuit ANDs a clear-to-send signal and bits indicating the synchronized state to send the clear-to-send signal, and a short line shorting the clear-to-send signal and a carrier detect signal is employed.

22 Claims, 82 Drawing Sheets

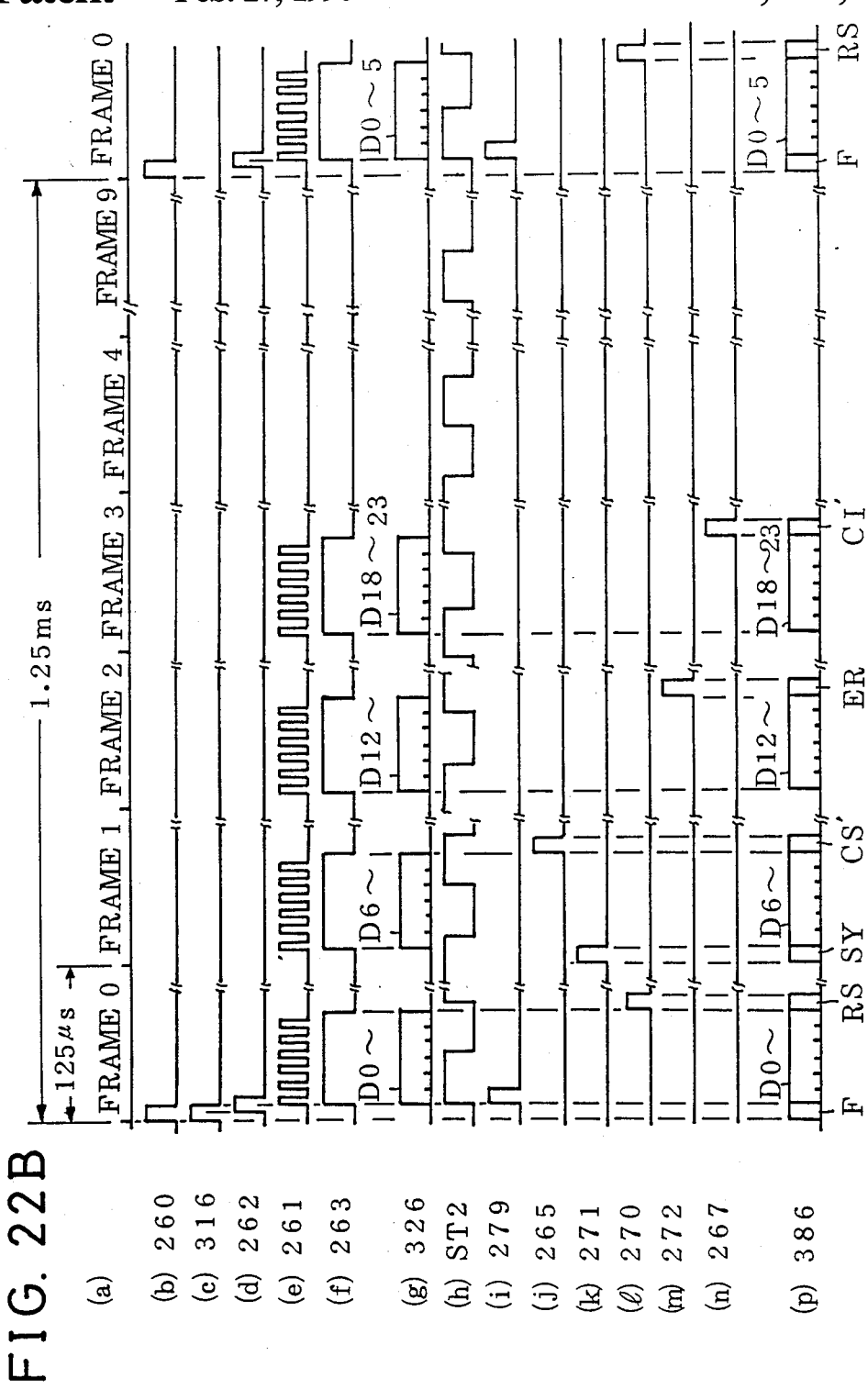

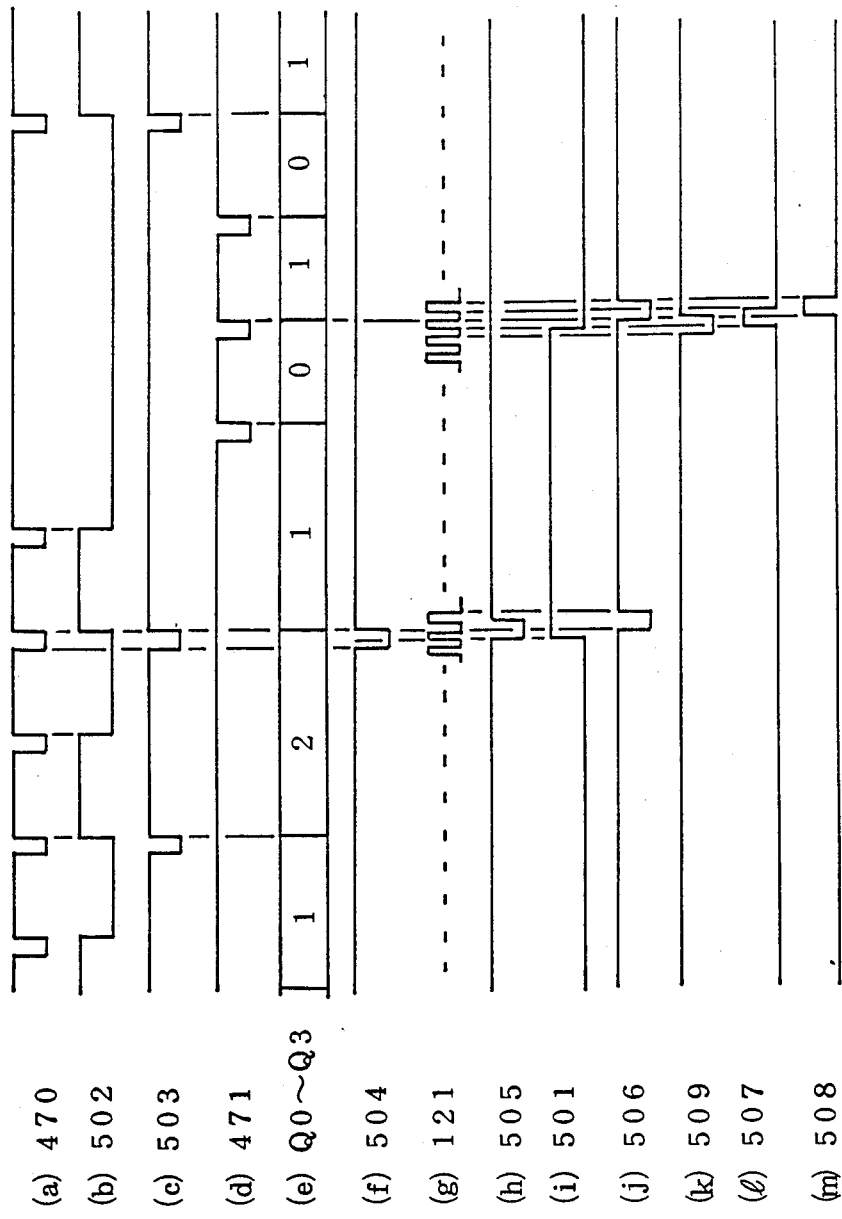

DATA CIRCUIT-TERMINATING EQUIPMENT

BACKGROUND OF THE INVENTION

1. Field of the Invention

The present invention relates to a data circuit-terminating equipment for terminating a data transmission line.

The invention is particularly concerned with a data circuit-terminating equipment for connecting various start-stop synchronous data terminal equipments with a PCM transmission line.

2. Description of the Prior Art

The prior art relating to a conventional data circuit-terminating equipment for various synchronous data terminal equipments is disclosed in U.S. Pat. No. 4,694,470 which will be described.

With reference to FIGS. 1 and 2, the principle of the prior art will first be described in detail.

FIG. 1 is a diagram showing the principles established to accommodate a terminal equipment having a speed of 19.2 Kbps in an electronic exchange with a 64 Kbps transmission line. Flag synchronizing bits (F bits) at a bit "0" position of a frame "0" is to notify the frame position to a receiving party by transmitting a flat pattern "1010". The receiving party can easily recognize the frame position by detecting the flag pattern. To accommodate the 19.2 Kbps terminal equipment in the 64 Kbps transmission line, it is necessary only to accommodate data D0 to D23 of 24 bits in specified bit positions every 10 multi frames, as shown in FIG. 1. Incidentally, blank fields are not used.

FIG. 2 shows the principles established to accommodate a 9.6 Kbps terminal equipment. If data D0 to D11 of 12 bits which is one-half that in the case of 19.2 Kbps in FIG. 1 can be accommodated, a transmission speed conversion is possible. In this instance, however, in order to accommodate data of different transmission speeds in the same circuit, the same data is inserted twice in succession, as depicted in FIG. 2, thereby to accommodate data of a transmission speed different from 19.2 Kbps. In a similar manner, data of 4.8 Kbps and data of 2.4 Kbps can be accommodated by inserting the same data four times and eight times in succession, respectively.

A description will be given, with reference to FIG. 3, of the principle of a synchronization establishing bit (a SY bit) at the bit 0 position of the frame 1. In FIG. 3, reference characters $L_1$ and $L_2$ indicate lines which are transmitting and receiving lines, respectively, as viewed from the party of equipment (A), but receiving and transmitting lines, as viewed from the party of equipment (B). The following description will be given, with the above lines as viewed from the party (A).

The line interface equipment (data circuit-terminating equipment) DCEa on the party (A) detects the F bit on the receiving line $L_2$ and, upon establishment of synchronization, puts the SY bit into its ON state and provides it on the transmitting line $L_1$. The equipment DCEb on the party (B) similarly provides the ON state of the SY bit on the receiving line $L_2$ when synchronization of the transmitting line $L_1$ is established by the F bit. Thus the equipment DCEa on the party (A) can detect the synchronized state of the transmitting Line $L_1$ by monitoring the SY bit on the receiving line $L_2$. This is also true for the equipment DCEb on the party (B). Control line information defined by JIS-C6361 is accommodated in bits 7 of frames 0 to 3. In FIGS. 1 and 2, signals above oblique lines are control signals to be provided on the transmitting line $L_1$ and signals below the oblique lines are control signals to be received from the receiving line $L_2$.

In FIG. 2, RS indicates a request-to-send signal for requesting transmission, CD a carrier detect signal, CS and CS' clear-to-send signals, ER an equipment ready signal, DR a data set ready signal and CI' call indicator signal.

Each equipment DTEa and DTEb includes an address sending circuit respectively to send out an address. A modem MDM has an address receiving circuit which receives an address and sends out a defined signal to a line or an equipment connected with the modem MDM in which the line or the equipment is not shown in FIG. 3. The address is received or transmitted between the address sending and receiving circuits.

FIG. 4 shows a method for accommodating control signals between terminal equipments, and FIGS. 5A and 6B a method for accommodating control signals between a terminal equipment and a modem.

In FIG. 4, since terminal equipments (A) and (P) are interfaces of the same input/output relationship, sending data SD sent from the terminal equipment (A) is received as receiving data RD at the terminal equipment (B). Likewise, the other lines are connected as shown. Transmission lines are shown to be connected to have a one-to-one correspondence to each other for the sake of clarity, but since data is accommodated in such formats as depicted in FIGS. 1 and 2, the transmission lines are concentrated to the two transmitting and receiving lines $L_1$ and $L_2$, as shown in FIG. 3. As is evident from the principles described previously in conjunction with FIGS. 1 and 2, since the control signals are sampled only once every 10 frames, for example, even if the terminal equipment (A) turns ON the RS (request-to-send) signal, the carrier detect signal CD in the terminal equipment (B) is delayed by 1.25 ms at most in turning ON. Accordingly, the terminal equipment (B) cannot receive the receiving data RD from the terminal equipment (A) if it arrives before the carrier detect signal CD turns ON.

To avoid this, the carrier detect signal CD is held in the on state during data reception, by determining the value of the request to send signal in terms of the logic OR of its previous and current sampled values and by determining the state of data transmission over the transmission line, as shown below in Table 1.

TABLE 1

| Previous state | Current state | Transmission state |
| --- | --- | --- |
| OFF | OFF | OFF |
| OFF | ON | ON |
| ON | OFF | ON |
| ON | ON | ON |

FIG. 6 shows the relationship between the request-to-send signal RS and the send data SD. The request-to-send signal RS and the data SD bear such a relation that data D is valid while the request-to-send signal RS is in the ON state. Sampling it in units of 10 multiframes (1.25 ms), RS sample pulses (RSP) are obtained. However, by delaying the data D by 1.25 ms and providing it as the send data SD on the transmission line and making the state decision of Table 1 to determine the value of the request to send signal RS, the relationship between the request-to-send signal RS and the data D becomes as shown, assuring the above-said relationship.

The delay of data for 1.25 ms can be accomplished by providing 24-stage (24-BIT) registers, as shown in FIG. 7, and by selecting timings, load pulses to be 1.25 ms for shifting the data from the register REGa to the register REGb. The reason for the provision of 24 stages of registers is to insert 24 bits in the aforementioned 10 multiframes.

FIG. 5A shows the connection of a terminal equipment and a modem. FIG. 5B shows a time chart illustrating signals 7 at various portions of FIG. 5A. Unlike in FIG. 4, the send data SD is connected to the sending data SD of the modem in a manner to have a one-to-one correspondence to each other. The other control signals are also connected to have a one-to-one correspondence to each other, as shown. Furthermore, the signals CS and CI, which are output from the modem, can easily be implemented by the connection to CS' and CI'.

A calling sequence between a terminal equipment(A) and a modem will be described refering to FIG. 5B.

When the terminal equipment (A) calls, the equipment ready signal ER of (a) and the request-to-send signal RS of (b) are turned from "0s" to "1s" to be transmitted to the modem. Receiving the signals ER and RS, the modem confirms that a data terminal equipment connected to the modem by a line can receive signals from the data terminal equipment (A) by checking the state of the line. Then the modem turns on a clear-to-send signal CS' from a "0" to a "1" as shown in (c). The SY bit has shown a "1" and so the clear to send signal CS of (d) is turned on from a "0" to a "1".

Receiving the CS signal of a "1", the data terminal equipment (A) sends out the sending data SD of (e). An address is transmitted as the first data of the sending data SD.

The line interface equipments (data circuit-terminating equipments) shown in FIGS. 3, 4 and 5A transmits data from a synchronous data terminal equipment and various control signals to a transmission line by multiframe as shown in FIG. 1 or 2 at a fixed rate of 64 kilobits per second.

On the other hand, various data terminal equipments have been available recently. Some of those data terminal equipments operate by their own clock independently of the timing of the transmission line. There has accordingly been a great increase in the demand to asynchronously transmit data from asynchronous data terminal equipments on the PCM transmission line. However, there is a problem that such an asynchronous data terminal equipment can not be connected with the PCM transmission line having various transmission rates.

There is another problem to be solved. The recommendations of the V 25 bis of CCITT was enforced in 1984. The line interface equipments (data circuit-terminating equipments) as shown in FIGS. 4 and 5A can not transmit an address as one of data to be transmitted to satisfy the recommendations. Referring to FIG. 5A, such a problem will be described.

It is defined in the recommendations of the V25 bis of CCITT that the clear-to-send signal CS must be turned from a "0" to a "1" in spite of the state of the request-to-send signal RS when the clear-to-send signal CS' becomes from a "0" to a "1". And it is further defined that the request-to-send signal RS being a "1" is not needed when the equipment ready signal ER is transmitted. The data terminal equipment (A) must therefore turn the request-to-send signal RS from a "0" to a "1" after receiving the clear-to-send signal CS turned to a "1".

In FIG. 5A, an AND gate in the line interface equipment (A) can however not send out the clear-to-send signal CS of a "1" in spite of "1s" of the SY bit and the clear-to-send signal CS' when the request-to-send signal RS shows a "0" and so the clear-to-send signal CS of a "0" is received by the data terminal equipment (A) which can not turn the request-to-send signal RS from a "0" to a "1". Therefore the communication can not be started.

SUMMARY OF THE INVENTION

An object of the present invention is to provide an improved data circuit-terminating equipment for connecting a start-stop synchronous data terminal equipment with a PCM (pulse code modulation) transmission line.

Another object of the invention is to provide a novel data circuit-terminating equipment which can process an address as one of data to be transmitted.

A further object of the present invention is to provide a data circuit-terminating equipment for connecting various start-stop synchronous data terminal equipments, which are not synchronized with a PCM transmission line, with the line which can transmit data at various speeds.

Another important object of this invention is to provide a data circuit-terminating equipment to satisfy recommendations of the V25 bis of CCITT (The International Telegraph and Telephone Consultative Committee) wherein the recommendations relate to a integrated services digital network (ISDN).

Other objects, advantages and features of the present invention will become apparent to those having ordinary skill in the art upon a reading of the following description when taken in conjunction with the accompanying drawings.

BRIEF DESCRIPTION OF THE DRAWINGS

The principle, construction and operation of the present invention will be clearly understood from the following detailed description taken in conjunction with the accompanying drawings, in which

FIG. 22B is a time chart illustrating waveforms at various portions in the block diagram of FIG. 22A;

FIG. 33B is a time chart illustrating waveforms at various portions in the circuit diagram of FIG. 33A;

DESCRIPTION OF THE PREFERRED EMBODIMENTS

Like numerals and characters represent like elements throughout the figures of the drawings.

Figure 8A:
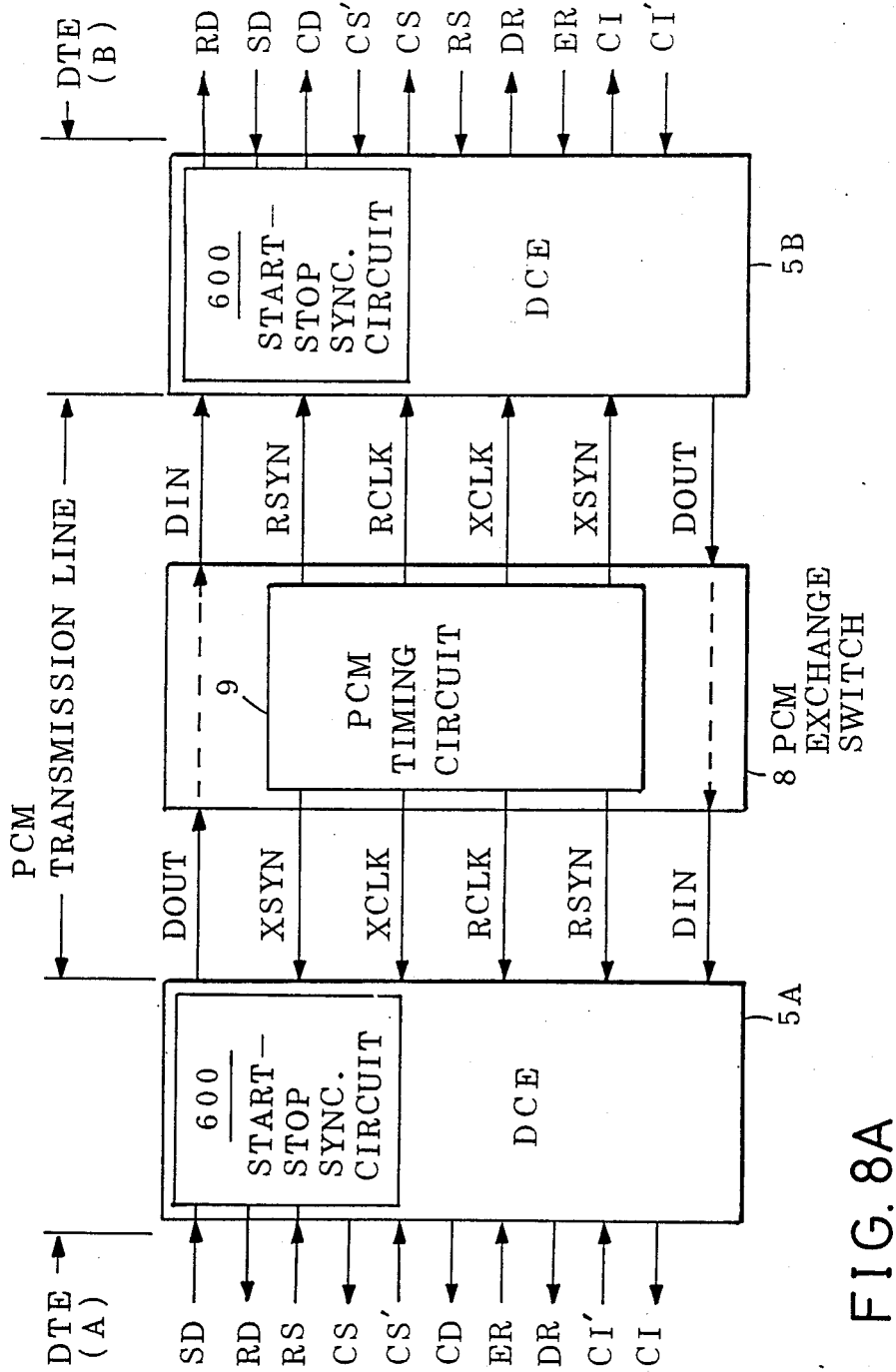
FIG. 8A is a block diagram illustrating an operational conception of the present invention.

A systematic bock diagram is shown in FIG. 8A in order to describe a concept of an operation of the present invention constructed as a data circuit-terminating equipment which can be connected with a PCM transmission line transmitting data of various speeds.

There is shown in FIG. 8A a PCM transmission line between a data circuit terminating equipment DCE 5A connected to an asynchronous data terminal equipment DTE (A) and a DCE 5B connected to a DTE (B). Data speeds on the PCM transmission line are 128, 192, 256, 384 kilobits, 1.544, 2.048 megabits per second and so on. A PCM exchange switch 8 is provided in order to exchange signals on the PCM transmission line. The PCM exchange switch 8 includes a PCM timing circuit 9 which sends out various timing signals i.e. a sending synchronization signal XSYN which is one of PCM synchronization signals, a sending clock XCLK which is one of PCM clocks, a receiving synchronization signal RSYN which is one of POM synchronization signals and a receiving clock RCLK which is one of PCM clocks, to send and receive data signals.

Figure 8B:
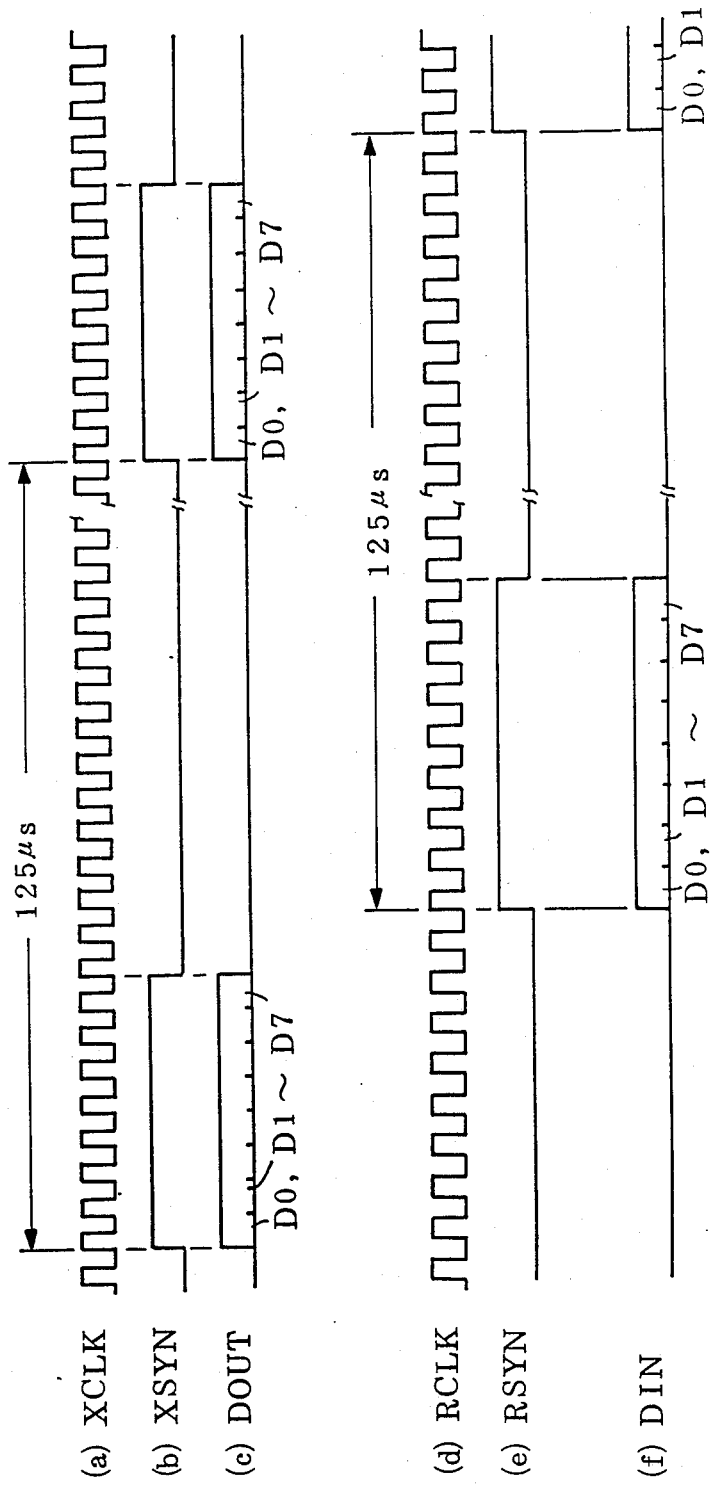
FIG. 8B is a time chart illustrating waveforms at various portions in the block diagram of FIG. 8A.

FIG. 8B is a time chart showing various timing signals from the PCM timing circuit 9 and data signals to be sent and received by the POM exchange switch 8.

The XCLK and RCLK shown in (a) and (d) of FIG. 8B are PCM clocks which can be various speeds to define various data speeds on the PCM transmission line. When the clock XCLK and the signal XSYN synchronized with the XCLK are transmitted to the data circuit terminating equipment DCE 5A, the equipment DCE 5A sends out data signal (D0 to D7), which comes from the equipment DTE (A), as a data-out DOUT shown in (c) of FIG. 8B to the PCM transmission line during the XSYN shown in (b) of FIG. 8B at a repetition rate of 125 microseconds.

The equipment DCE 5B receives data signal (D0 to D7), which comes from the equipment DTE A, as a data-in DIN shown in (f) of FIG. 8B, during the signal RSYN of (e), which is synchronized with the clock RCLK of (d), at a repetition rate of 125 microseconds.

Figure 4:
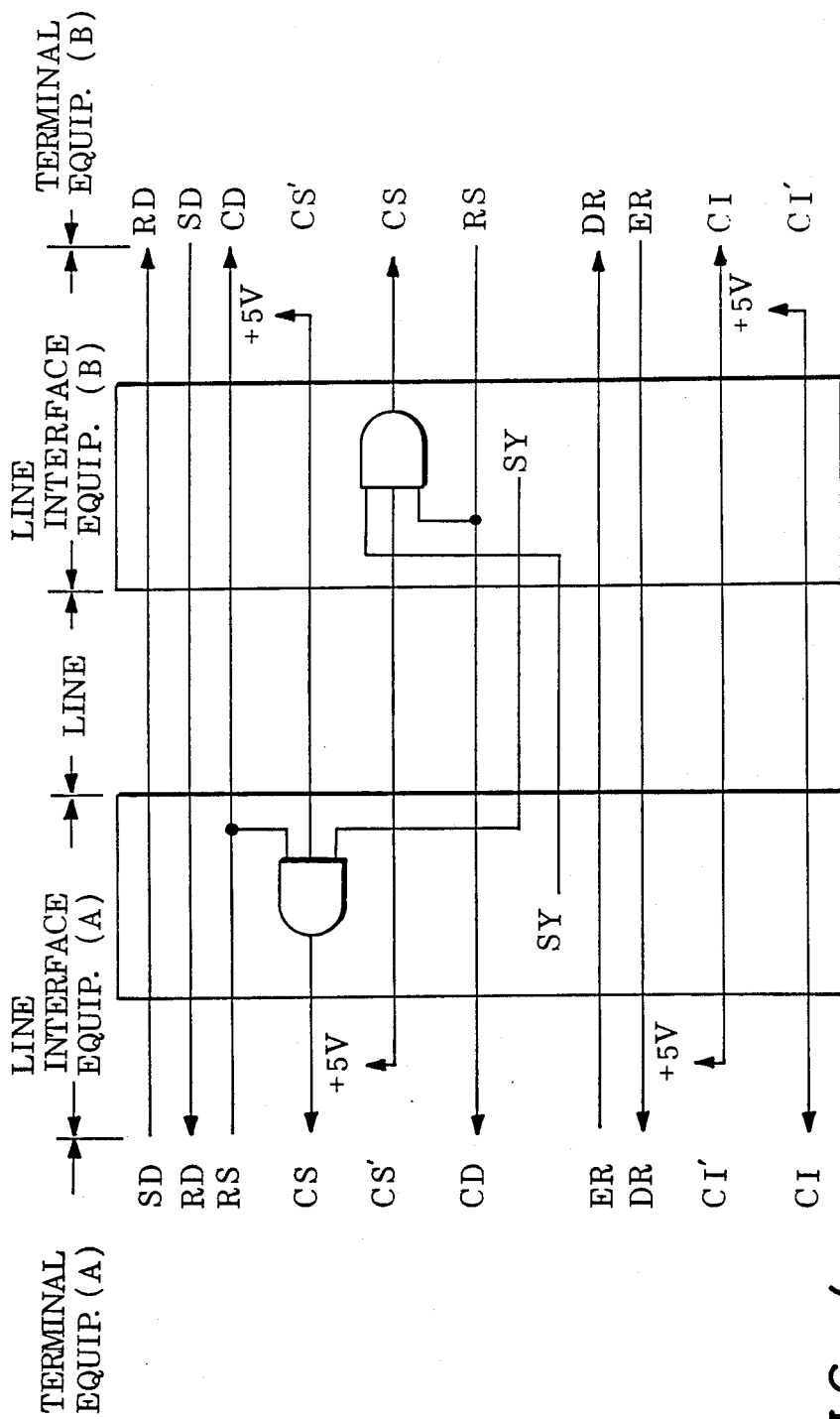
FIG. 4 is a diagram showing a control signal transmission system of the prior art.
Figure 5A:
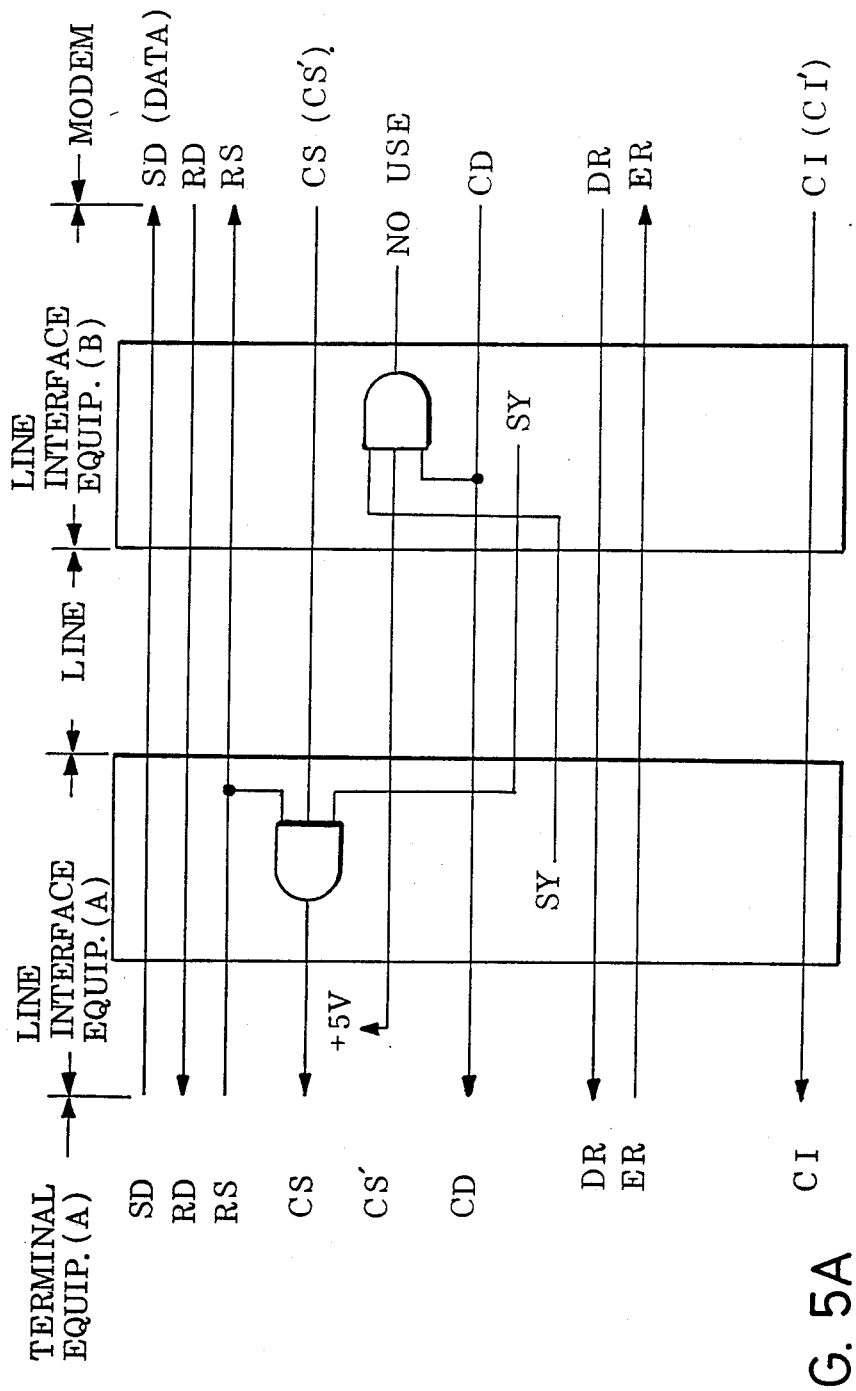
FIG. 5A is a diagram showing a control signal transmission system between a data terminal equipment and a modem in the prior art.
Figure 5B:
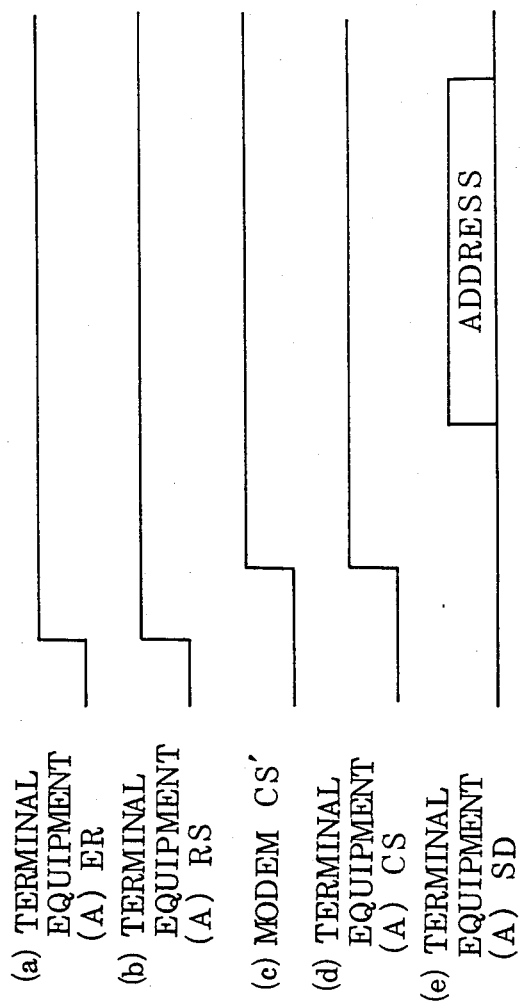
FIG. 5B is a time chart showing various signals of FIG. 5A in the prior art.

Communication between the data terminal equipments DTE (A) and DTE (B) through the data circuit-terminating equipment DCE 5A and DCE 5B can be executed by using various timing signals produced in a start stop synchronizing circuit 600 and a clock based on the signal XSYN by the equipments DCE 5A and 5B. In the communication, there are used various signals i.e. sending data SD, receiving data RD, a request-to send signal RS, CS and CS' clear-to-send signals CS and CS', a carrier detect signal CD, a equipment ready signal ER, a data set ready signal DR and call indicator signals CI and CI' shown in FIGS. 4 and 5A illustrating the prior art.

Figure 8C:
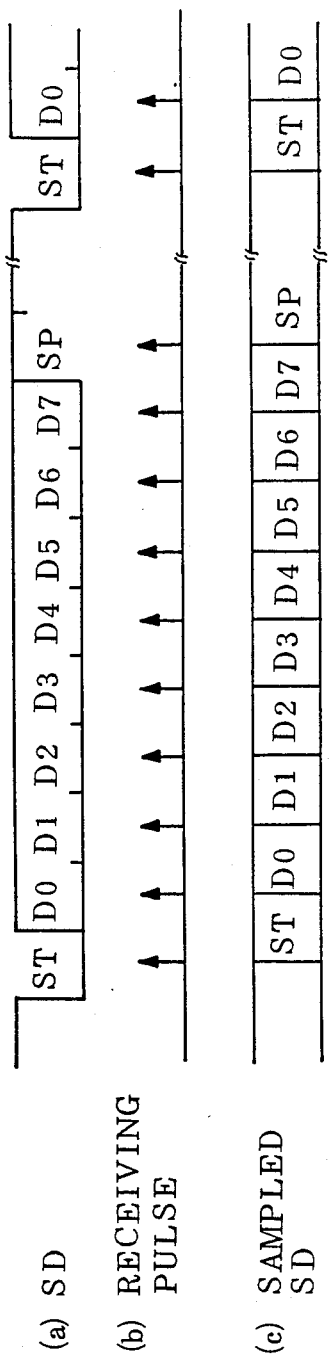
FIG. 8C is a time chart illustrating an operational conception of a start-stop synchronous data circuit-terminating equipment.

In FIG. 8C an operational conception of the start-stop synchronous data circuit-terminating equipment.

The equipment DCE 5A receives sending data SD of FIG. 8C (a) in which the sending data SD are start-stop synchronous data from the start-stop synchronous data terminal equipment DTE (A) and so the start-stop synchronizing circuit 600 samples the sending data SD of (a) by using receiving pulses of (b) to obtain the sampled SD of (c). The receiving pulses of (b) are generated by detecting a down edge of a start bit ST of (a) at every center of each SD bit which are the start-bit ST, data-bits DO to D7, a stop bit SP. The sampled SD of (c) are transmitted to the PCM transmission line by the timing of the line.

Figure 8D:
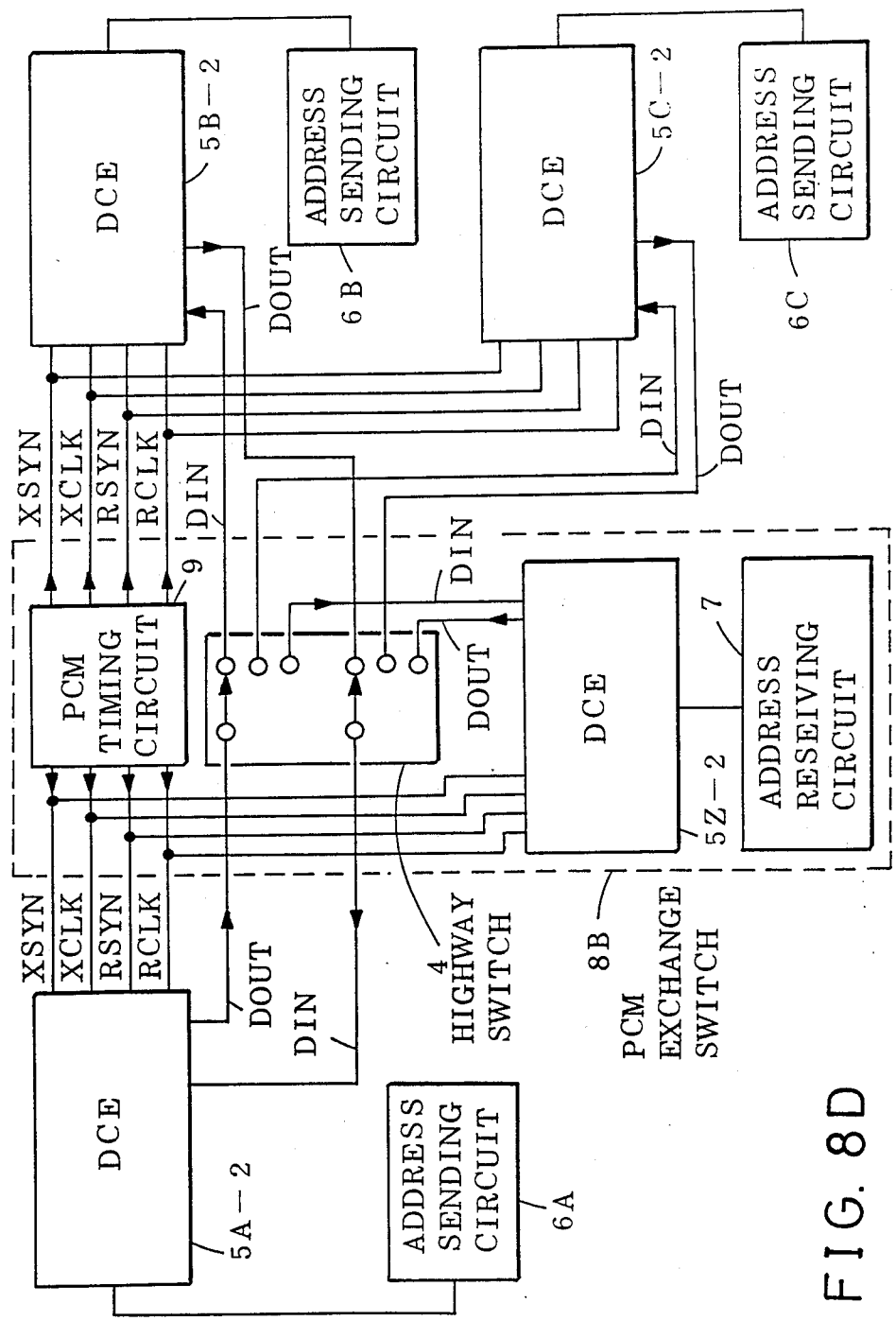
FIG. 8D is a block diagram illustrating an operational conception of another embodiment which can process an address as one of data to be transmitted.

Another systematic block diagram is shown in FIG. 8D in order to describe a concept of another operation of the present invention constructed as a data circuit-terminating equipment which satisfies recommendations of the V25 bis of CCITT (The International Telegraph and Telephone Consultative Committee) and can be connected with a PCM transmission line transmitting data of various speeds.

In FIG. 8D, address sending circuits 6A, 6B and 6C included in data terminal equipments DTEs ar shown in which it is omitted to indicate data receiving circuits and data sending circuits included in those DTEa. A PCM transmission line connects a DCE (data circuit-terminating equipment) 5A-2 with DCE 5B-2 and 5C-2 through a PCM exchange switch 8B.

The equipments DCEs 5A-2, 5B-2 and 5C-2 are respectively connected with address sending circuits 6A, 6B and 6C. Data speeds on the PCM transmission line of FIG. 8D are 128, 192, 266, 384 kilobits, 1.544, 2.048 megabits per second and so on. The PCM exchange switch 8B includes a PCM timing circuit 9, an address receiving circuit 7, the equipment DCE 5Z-2 connecting the address receiving circuit 7 with the PCM transmission line, and a highway switch 4 exchanging equipments DCEs 5A-2, 5B-2, 5C-2 and 5Z-2, in which the highway switch 4 connects the equipment DCE 5A-2 to one of equipments DECs 5B-2, 5C-2 or 5Z-2 to be easy to understand. The address receiving circuit 7 receives addresses which are sent from equipments DCEs 5A-2, 5B-2 and 5C-2 in which three equipments DCEs 5A-2, 5B-2 and 5C-2 are illustrated in order to be easy to understand.

There are shown in FIG. 8B various timing signals which are transmitted from the PCM timing circuit 9 to equipments DCEs 5A-2, 5B-2, 5C-2 and 5Z-2 via the POM transmission line, and timing of data which are exchanged by the PCM exchange switch 8B.

The equipments DCEs 5A-2, 5B-2 and 5C-2 are respectively connected with start-stop synchronous data terminal equipments which respectively include address sending circuits 6A, 6B and 6C. Those start-stop synchronous data terminal equipments not shown in FIG. 8D can transmit data each other. The address receiving circuit 7 can receive address from address sending circuit 6A, 6B or 6C.

Figure 8E:
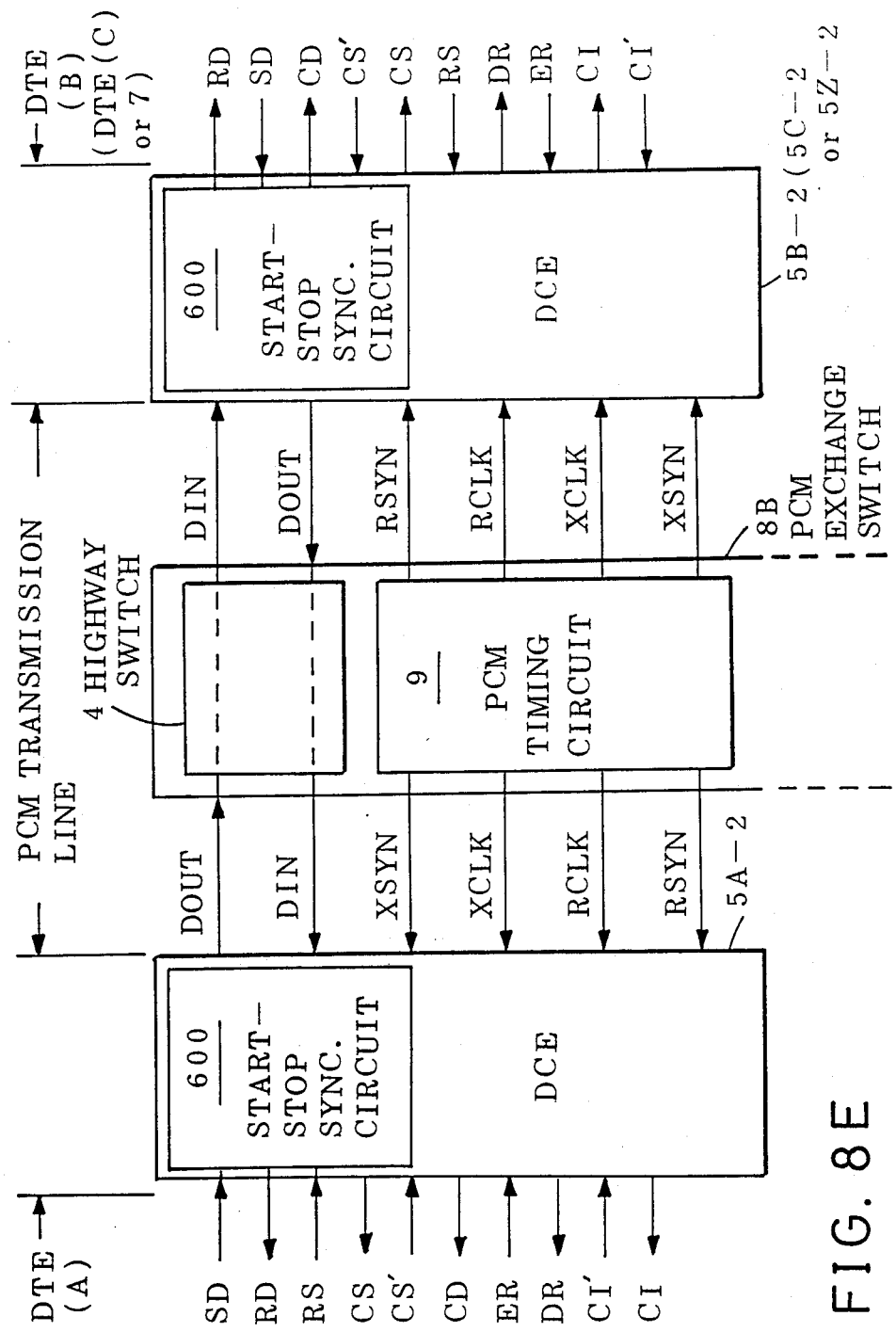
FIG. 8E is a block diagram illustrating a connection of a data circuit-terminating equipment with a PCM exchange switch.

There is detailedly shown in FIG. 8E a connection between the equipment DCE 5A-2, the equipment DCE 5B-2 (5C-2 or 5Z-2) and the highway switch 4 and PCM timing circuit 9 included in the PCM exchange switch 8B in which the equipment DCE 5A-2 is connected with the equipment DTE (A) including the address sending circuit 6A, the equipment DCE 5B-2 is connected with the equipment DTE (B) including the address sending circuit 6B, the equipment DCE 5C-2 is connected with the equipment DTE (C) including the address sending circuit 6C, and the equipment DCE 5Z-2 is connected with the address receiving circuit 7.

Each communication between the equipment DCE 5A-2 or 5B-2 (5C-2 or 5Z-2) and the address sending circuit 6A or 6B (6C or the address receiving circuit 7) is executed on the basis of a clock signal and timing signals in which the clock signal is produced from the signal XSYN in the equipment DCE 5A-2 or 8B-2 (5C-2 or 5Z-2) and the timing signals are produced in the start-stop synchronizing circuit 600, so that various signals i.e. SD, RD, RS, CS, CS', CD, ER, DR, CI', CI are transmitted as shown in FIGS. 4 and 5A which show the prior art.

Figure 8F:
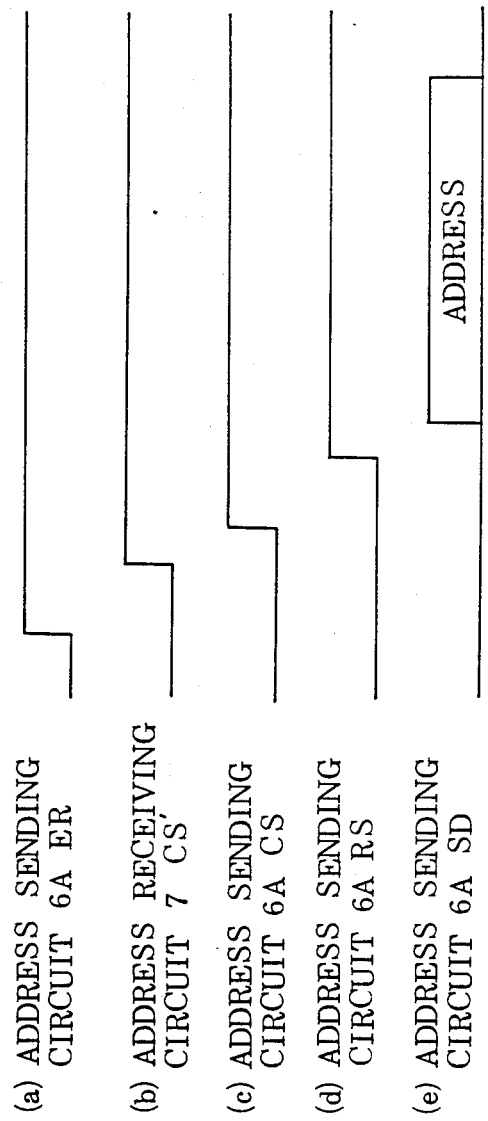
FIGS. 8F and 8G are time charts illustrating waveforms at various portions in the block diagram of FIG. 8E.

There is shown in FIG. 8F chart illustrating signals at various portions in the block diagram of FIG. 8E in which the equipment DCE 5A-2 is connected with the equipment DTE 6A and the equipment DCE 5Z-2 is connected with the address circuit 7.

When a equipment ready signal ER is sent out from the address sending circuit 6A to call as shown in FIG. 8F (a), the address receiving circuit 7 receives the equipment ready signal ER via the equipment DCE 5A-2, the highway switch 4 and the equipment DCE 5Z-2, so that the address receiving circuit 7 sends out a clear-to-send signal CS' as shown in FIG. 8F (b). The signal CS' is transmitted to the address sending circuit 6A through the equipment DCE 5Z-2 the highway switch 4 and the equipment DCE 8A-2. The address sending circuit 6A receives the signal CS' as a signal CS shown in (c) and sends out a request-to-send signal RS as shown in (d). After that, the address sending circuit 6A sends out an address as sending data SD to the address receiving circuit 7 as shown in (e).

In such a manner, when the signal CS' indicates a "1" as shown in FIG. 8F (b) , the signal CS of (c) can be sent out from the equipment DCE 5A-2 to the address sending circuit 6A in spite of the signal RS of (d) indicating a "0". Thus the recommendations of the V25 bis of CCITT can be satisfied.

The address in FIG. 8F (e) is applied to a highway switch controller being not shown, so that the highway switch 4 is controlled to connect the equipment DTE (A) including the address sending circuit 6A to e.g. the equipment DTE (B) including the address sending circuit 6B. This aspect is shown in FIG. 8G.

Figure 8G:
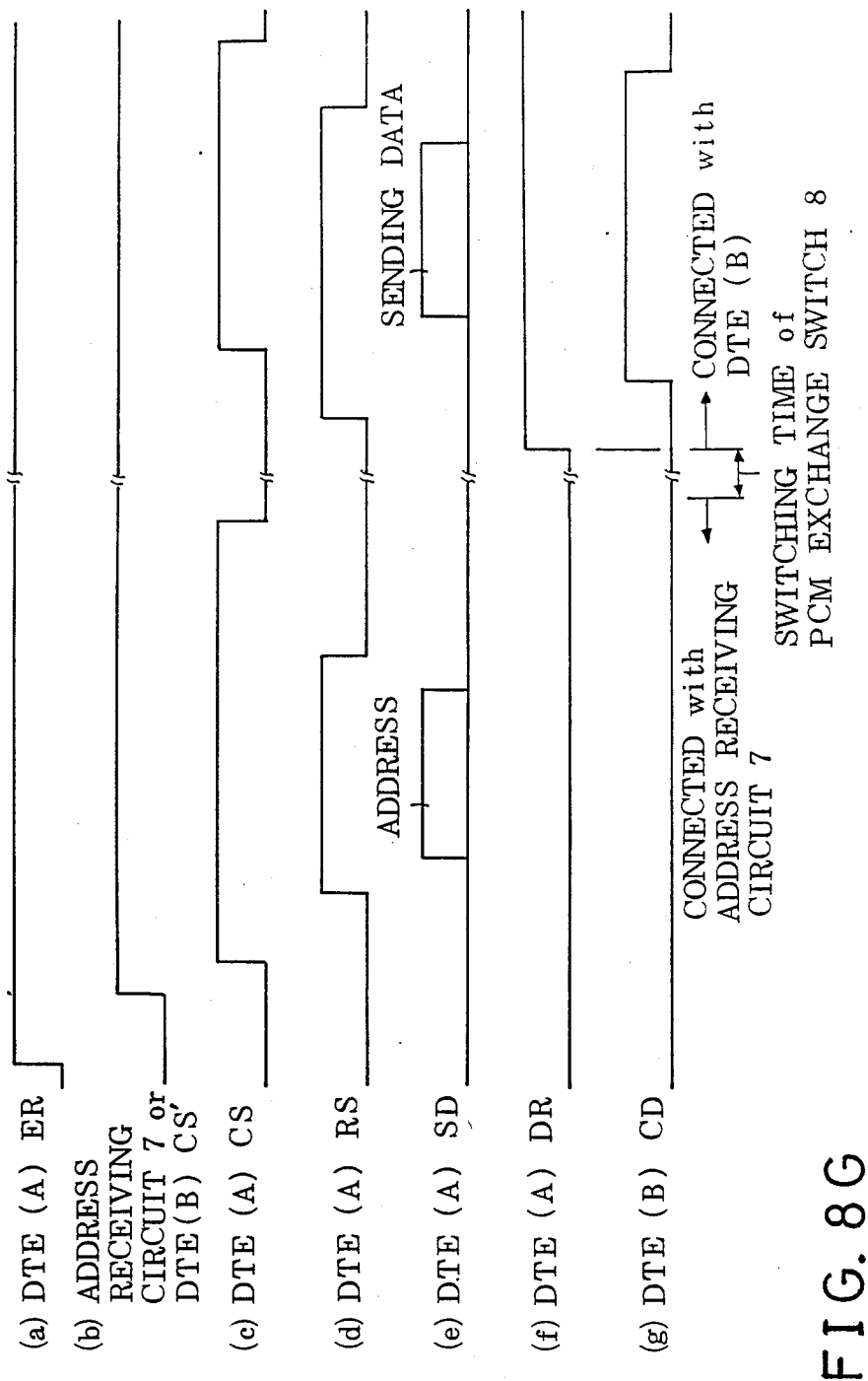

In FIG. 8G, the address of (e) is sent out as the sending data SD and so the equipment DTE (A) and (B) can be connected by operation of the PCM exchange switch 8. The equipment DTE (B) sends out a signal ER to the equipment DTE (A) which receives the signal ER as a data-set-ready signal DR of (f) and sends out the signal RS of (d). The signal RS is received as a carrier detect signal CD of (g) by the equipment DTE (B) which has a short line to short the signal CD and a carrier-to-send signal CS'. The signal CS' is therefore sent out to the equipment DTE (A). The equipment DTE (A) receives the CS' signal as a carrier-to-send CS signal of (c) and starts to send out a sending data SD as shown in (e).

Having sent out the sending data SD of (e), the equipment DTE (A) changes the RS signal of (d) from a "1" to a "0" to be sent to the DTE (B) so that the equipment DTE (B) changes the signal CD of (g) from a "1" to a "0". The signal CS of (c) is therefore changed from a "1" to a "0" because the CS signal is shorted to the signal CD.

Figure 9A:
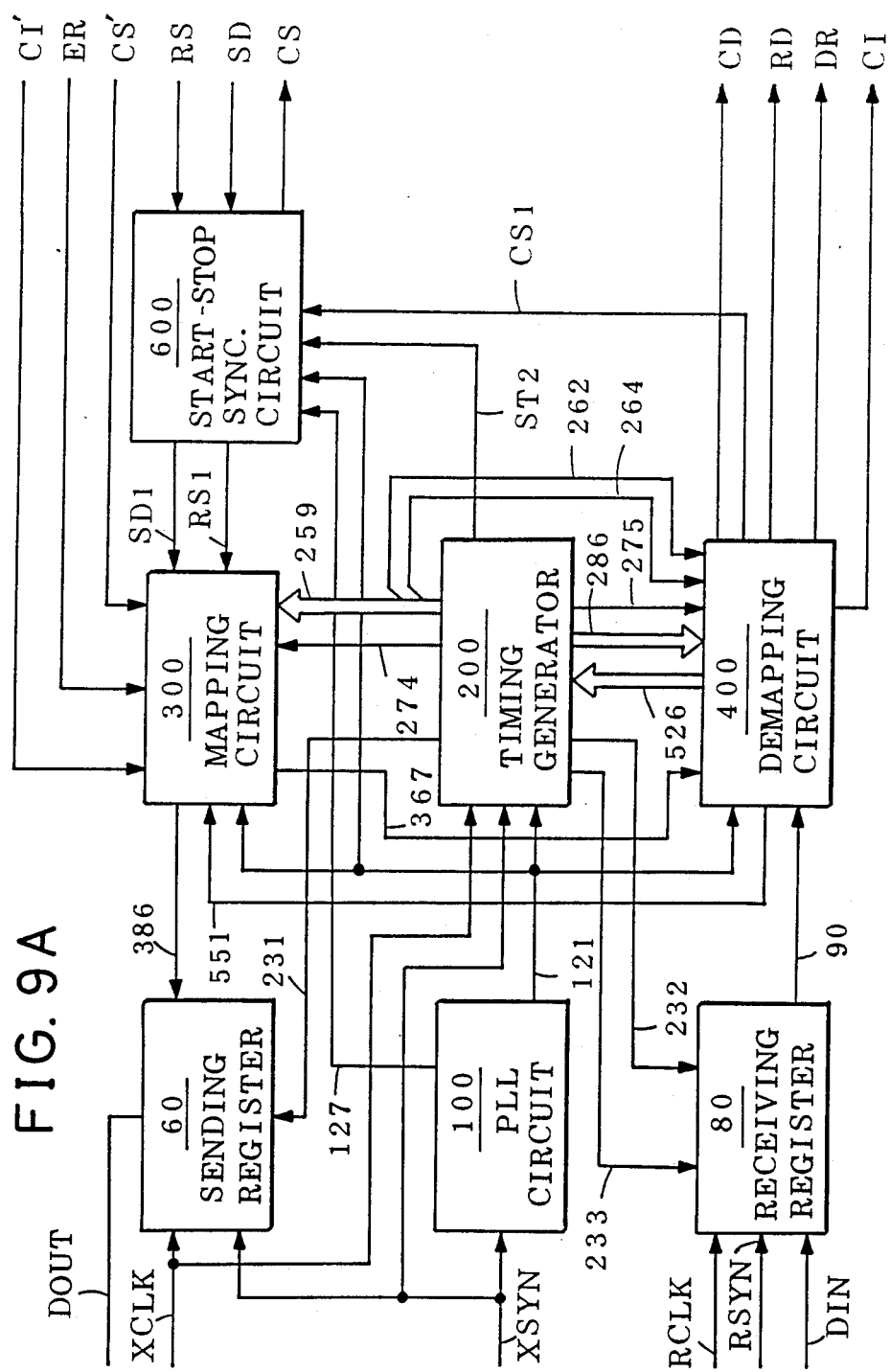
FIG. 9A is a block diagram illustrating an embodiment in accordance with the present invention.

There is shown in FIG. 9A a block diagram of an embodiment of the data circuit-terminating equipment DCE 5A or 5B according with the invention of which concept is illustrated in FIG. 8A. The equipment DCE 5B has the same construction as that of the equipment DCE 5A.

Figure 9B:
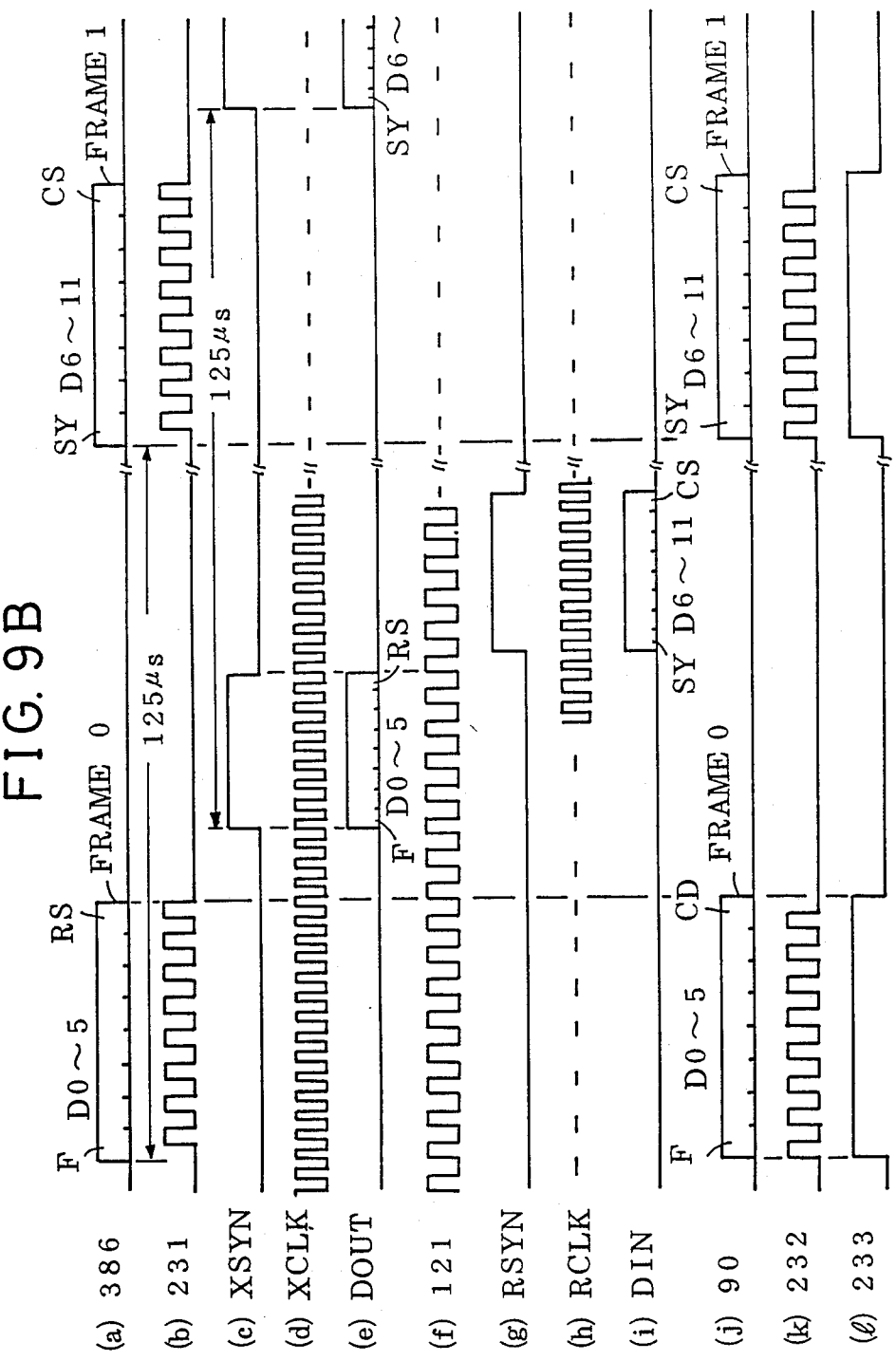
FIG. 9B is a time chart illustrating waveforms at various portions in the block diagram of FIG. 9A.

There is shown in FIG. 9B a time chart illustrating waveforms at various portions in the block diagram of FIG. 9A.

In FIG. 9A, numeral 100 indicates a PLL (phase-locked loop) circuit which generates a standard clock 121 and a clock 127 in which the standard clock 121 is on the basis of a sending synchronization signal XSYN from the PCM transmission line and the clock 127 has a repetition frequency e.g. twice that of the standard clock 121. Various timing signals in the equipment DCE 5A or SB are produced from the standard clock 121 and the clock 127. The timing relationship between the signal XSYN and the standard clock 121 is shown in FIG. 9B (c) and (f). A leading edge of the standard clock 121 of (f) synchronizes with a trailing edge of the signal XSYN of (c).

Receiving the standard clock 121 of (f), a sending clock XCLK of (d) and the signal XSYN of (c), a timing generator 200 generates various timing signals 231 of (b), 232 of (k), 233 of (l), a bus signal 259 including signals 262 and 264, a bus signal 286 and a clock ST2.

Numeral 600 shows a start-stop synchronizing circuit which receives the request-to-send signal RS and sending data SD from a DTE to sample the RS and SD by the clock 127 from the PLL circuit 100, to store the sampled RS and deliver them as a request-to-send signal RS1 and sending data SD1 on the timing of the clock ST2 from the timing generator 200. The circuit 600 receives a clear-to-send signal CS1 from the other DTE (B) to send out the signal CS1 as the signal CS to the DTE (A), till the sampled SD reaches a predetermined value in quantity, so that the circuit 600 stops to send out the signal CS to the DTE (A). The sending data SD are, therefore, stopped to be sent out from the DTE (A) to the circuit 600.

Numeral 300 identifies a mapping circuit. The circuit 300 receives a sending data SD, a request-to send signal RS as SD1 and RS1 via &he start stop synchronizing circuit 600 and directly receives a clear-to-send signal CS', a equipment ready signal ER and a call indicator signal CI' from the DTE(A). Those signals and data from a data terminal equipment are mapped by the circuit 300, as shown in FIG. 1 or 2, to be sent out as a mapped signal 386 of FIG. 9B (a).

Numeral 60 denotes a sending resister which is loaded by means of sampling the mapped signal 386 of FIG. 9B (a) by a signal 231 of (b) and sends out the loaded contents as a data-out signal DOUT of (e) synchronously with the clock CLK of (d) during the signal XSYN of (c). The data-out signal DOUT of (e) is formed at every frame which is sent out at every signal XSYN of (c) having a repetition rate of 125 microseconds. Every frame is mapped as shown in FIG. 1 or 2 and so each frame is sent out in order of frame numbers.

Numeral 80 designates a receiving register which is loaded by sampling a data-in signal DIN of FIG. 9B (i) by a receiving clock RCLK of (h) during a receiving synchronization signal RSYN of (g). So the receiving register 80 sends out a signal to-be-demapped 90 synchronously with a timing signal 232 of (k) during another timing signal 233 of (l) of FIG. 9B.

Figure 1:
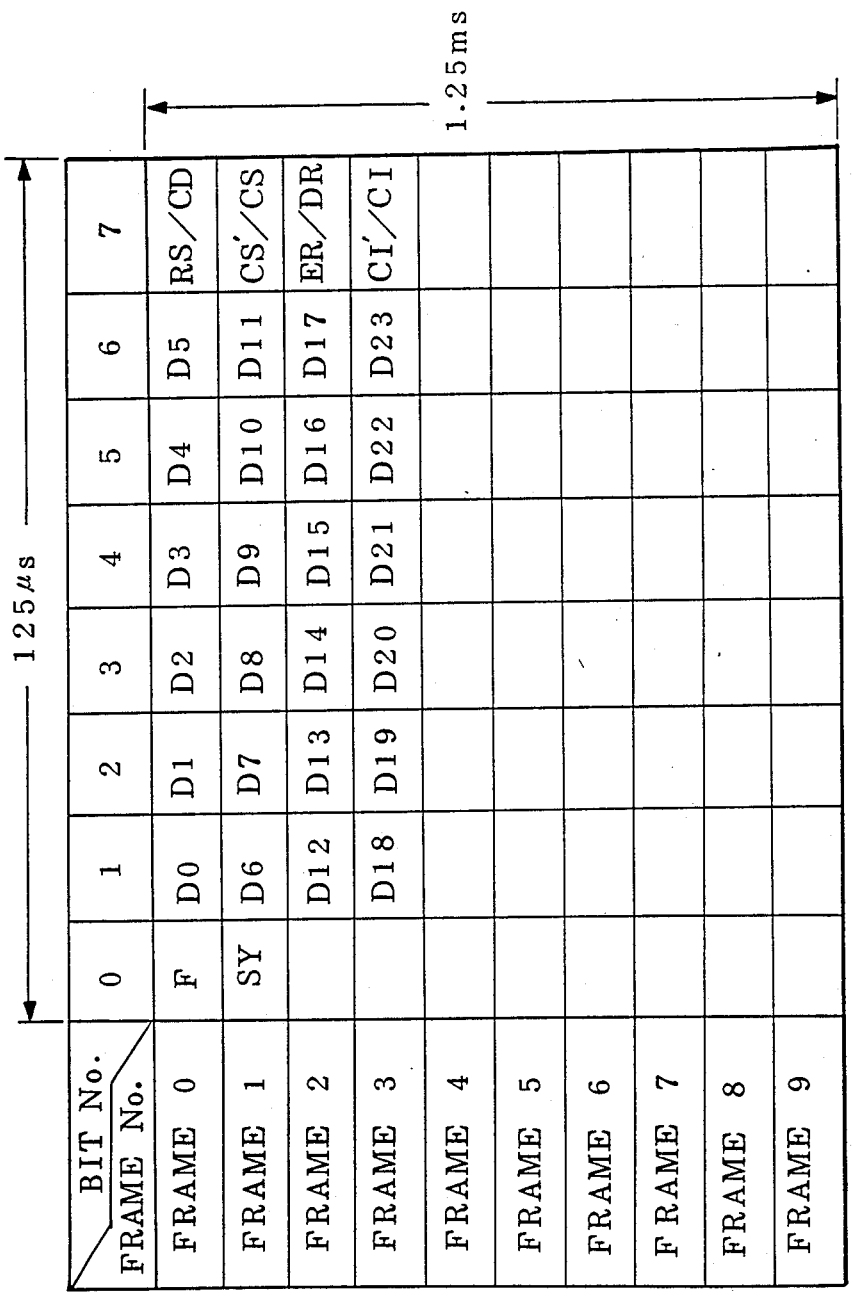
FIG. 1 is a time chart showing time slots for accommodating respective control signals and data of a 19.2 Kbps transmission speed in the prior art.
Figure 2:
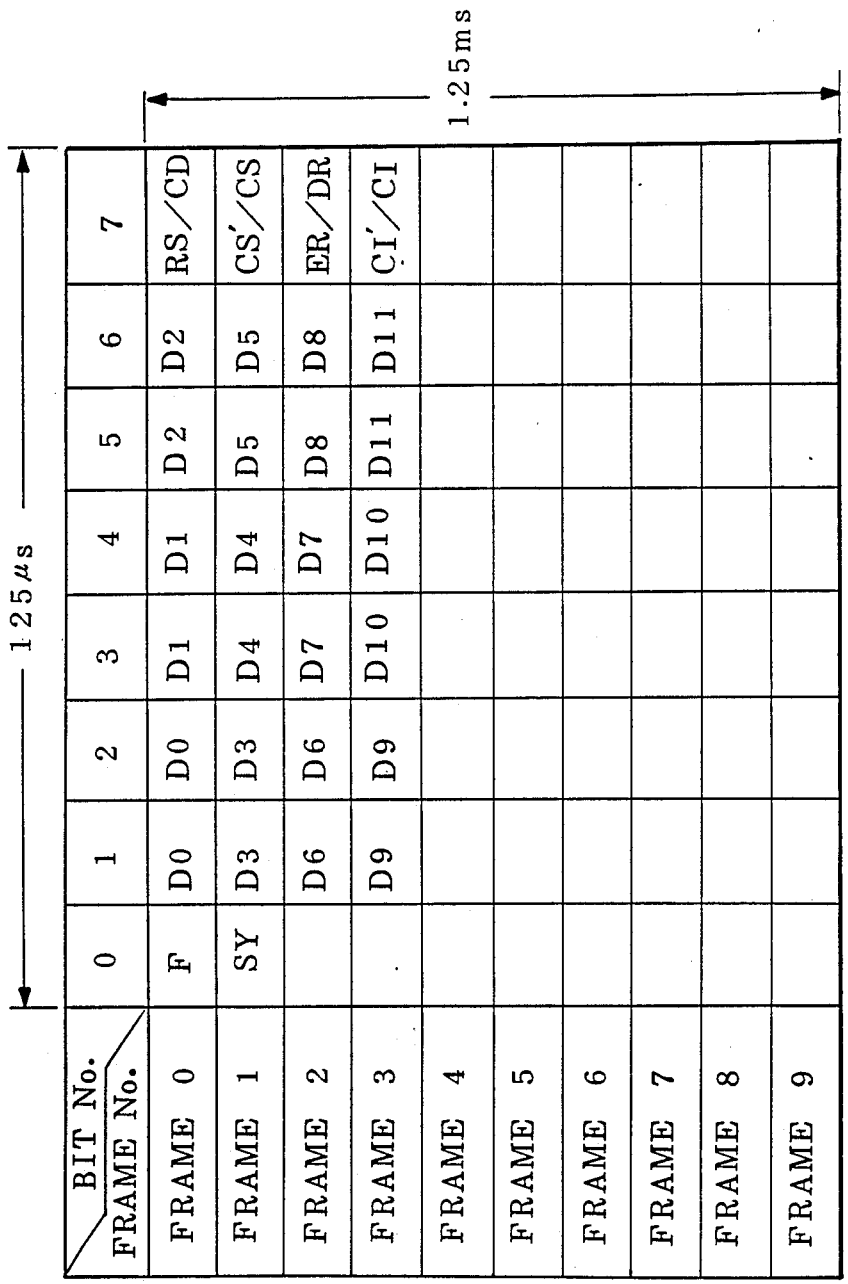
FIG. 2 is a time chart showing time slots for accommodating respective control signals and data of a 9.6 Kbps transmission speed in the prior art.
Figure 3:
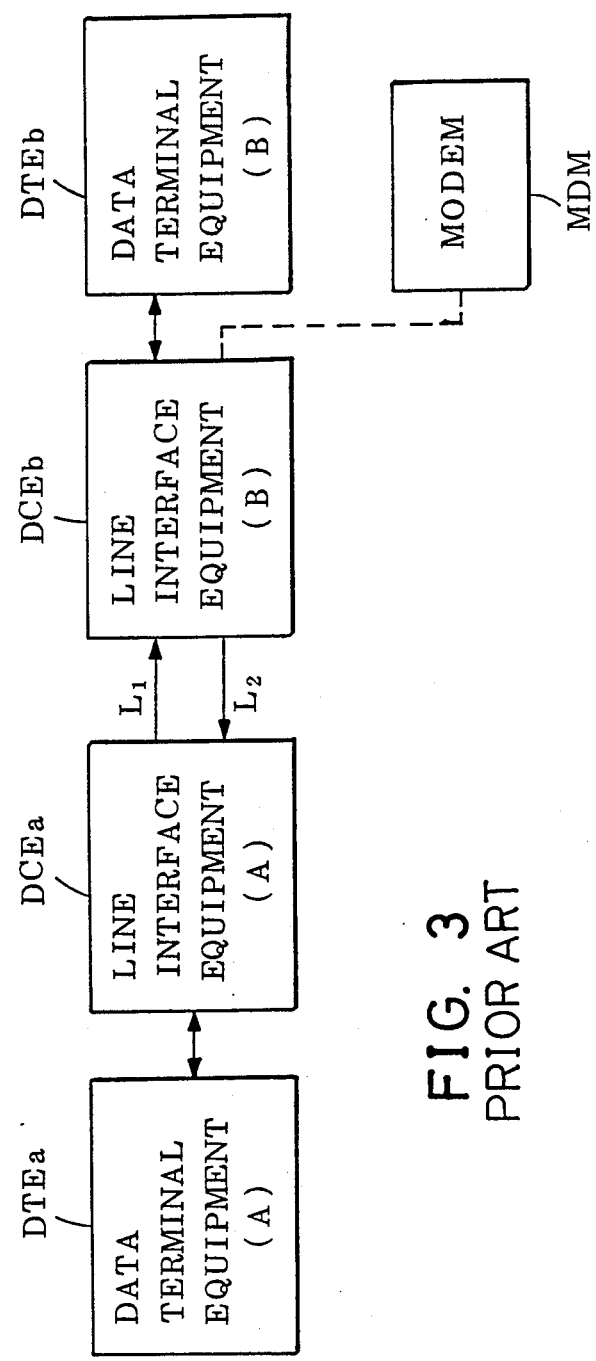
FIG. 3 is a block diagram illustrating a transmission system of the prior art.

Numeral 400 represents a demapping circuit which receives the signal to-be-demapped 90 including a receiving data RD (D0 to 5, D6 to 11 ... in FIG. 9B (j)), a clear-to-send signal CS, a data set ready signal DR, a call indicator signal CI and a carrier detect signal CD which are demapped by a process reverse to the mapping process shown in FIGS. 1 and 2. The demapping process of the signal RD is executed at the timing of signals 262 and 275, the same of the signals CS, DR and CI at the timing of the bus signal 286, and the same of the signal CD at the timing of the signal 264. Those demapped signals are sent out from the demapping circuit 400 to the data terminal equipment.

Further, the demapping circuit 400 sends out the frame numbers (frame 0, frame 1, . . .) shown in FIG. 9B (j) as the bus signal 526 to the timing generator 200. Receiving the bus signal 526, the timing generator 200 generates the bus signal 286 for demapping process.

The demapping circuit 400 detects a SY-bit (the first bit) of the frame 1 in FIG. 9B (j) and so the demapping circuit 400 sends out a signal 551 to the mapping circuit 300, which maps the SY-bit in the frame 1 of (a), in which the signal 551 indicates the establishment of the synchronization.

Receiving the signal RS, the mapping circuit 300 sends out a signal 367 to the demapping circuit 400 which sends out the signal CS by ANDing the signal 367 and a CS-bit included in the frame 1 of FIG. 9B (j).

Figure 9C:
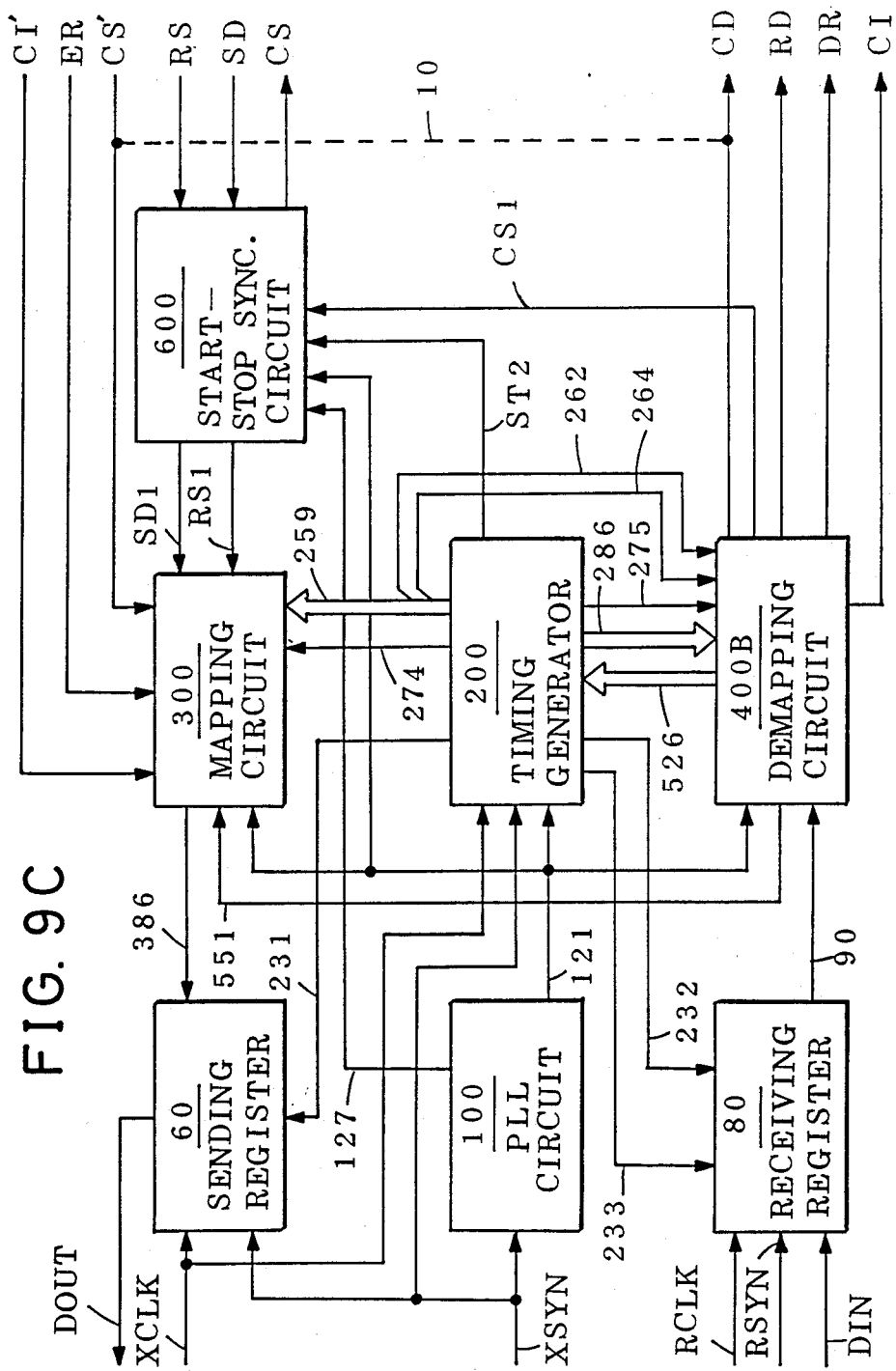
FIG. 9C is a block diagram illustrating another embodiment in accordance with the present invention.

There is shown in FIG. 9C a block diagram of an embodiment of the data circuit-terminating equipment, which satisfies recommendations of the V25 bis of CCITT, DCE 5A-2, 5B-2, 5C-2 or 5Z-2 according with the invention of which concept is illustrated in FIGS. 8D and 8E.

The equipment DCE 5A-2 has the same construction as that of the equipments DCEs 5B-2 and 6C-2.

It is the difference of the equipment DCE 5A-2 shown in FIG. 9C from the equipment DCE 5A shown in FIG. 9A that a short line 10 is appended between the signal CS' and the signal CD, and the signal 367 from the mapping circuit 300 to the demapping circuit 400B is omitted.

It is the difference of the equipment DCE 5Z-2 of FIG. 8D from the equipment DCE 5A-Z shown in FIG. 9C that the short line 10 is omitted.

When e.g. the equipment DCE 5A-2 connected with the equipment DTE (A) receives the signal RS from the equipment DTE (B) via the equipment DCE 5B-2 as shown in FIG. 8E, the demapping circuit 400B of the equipment DCE 5A-2 receives the signal RS through the receiving register 80 and demaps it to change the signal CD from a "0" to a "1". The signal CD of a "1" is sent out to the mapping circuit 300 through the short line 10. The mapping circuit 300 receives the signal CD as the signal CS' of ă "1" in which the signal CS' is mapped to be sent out to the equipment DTE (B) via the sending register 60. The equipment DTE (B) receives the mapped signal CS' as a signal CS. It is therefore not needed to obtain ANDing the signal 367 and a CS-bit included in the frame 1 (FIG. 9B) as shown in FIG. 9B.

In the case of the equipment DCE 5Z-2, the short line 10 is omitted in FIG. 9C, because the equipment DCE 5Z-2 is connected with the only address receiving circuit 7. The circuit 7 changes the signal CS' from a "0" to a "1" to send out the signal CS' to e.g. the equipment DTE (A) in only case the circuit 7 can receive an address when the circuit 7 receives a signal CD from the equipment DTE (A). Receiving the signal CS', the equipment DTE 5A sends out the address as a sending data SD to the address receiving circuit 7 as shown in FIGS. 8F (e) and 8G (e).

Receiving the request-to-send signal RS and the send data SD which are provided from the data terninal equipment, the start-stop synchronizing circuit 600 samples those signals RS and SD by the clock 127 from the PLL circuit 100 to store so that the request-to-send signal RS1 and the send data SD1 are sent out. Further the start-stop synchronizing circuit 600 transmits the signal cleare-to-send signal CS1 which is provided from another data terminal equipment DTE (B) as the signal cleare-to-send signal CS to the data terminal equipment DTE (A).

When the sampled send data SD arrives a predetermined quanntity, the start-stop synchronizing circuit 600 temporarily stops to transmit the signal CS1 as the signal CS to the DTE (A) so that the send data SD can temporarily not being provided from the DTE (A).

Figure 10A:
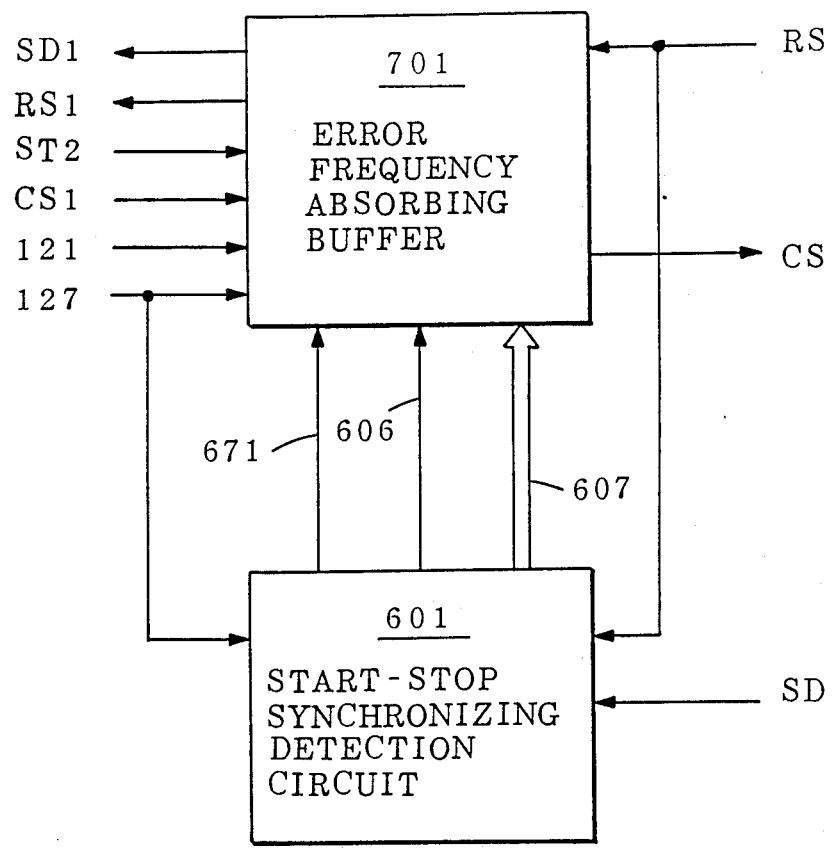
FIG. 10A is a block diagram illustrating an embodiment of a start-stop synchronizing circuit 600 shown in FIG. 9C.

FIG. 10A shows a circuit diagram of an embodiment of the start stop synchronizing circuit 600.

A start stop synchronizing detection circuit 601 samples the send data SD and request-to-send signal RS, which are provided from the DTE, with the clock 127 to deliver a bus signal 607 (SD) and a signal 606 (RS) as parallel signals, in which a signal 671 is delivered when a stop-bit included in the send data SD is detected.

A error frequency absorbing buffer 701 latches the bus signal 607 and the signal 606 at the timing of the signal 671 thereinto to temporarily store and so the send data SD1 and the request-to-send signal RS1 are delivered Further the error frequency absorbing buffer 701 is delivering the cleare-to-send signal CS to the DTE by receiving the cleare-to-send signal CS1 from the demapping circuit 400. When the send data SD being stored in a memory included in the buffer 701 arrives at a predetermined quantity, the buffer 701 stops to send out the signal CS in spite of the receipt signal CS1. Accordingly the send data SD are temporarily stopped to be transmitted from the DTE. When the stored send data SD in the memory is reduced to a predetermined quantity, the signal CS is delivered by the receipt of the signal CS1.

Circuits included in the error frequency absorbing buffer 701 can operate at timings of the standard clock 121 and the clock 127.

A signal 606 of an output of the start-stop synchronizing detection circuit 601 is obtained by sampling the signal RS with the clock 127 in which the sampling operation can be executed during only an existent period of the send data SD. The signal 606 can, therefore, not be delivered without the valid send data SD to be sampled in spite of the receipt of the request-to-send signal RS. In such a case, the error frequency absorbing buffer 701 sends out the signal RS applied thereinto as the signal RS without any process.

Figure 10B:
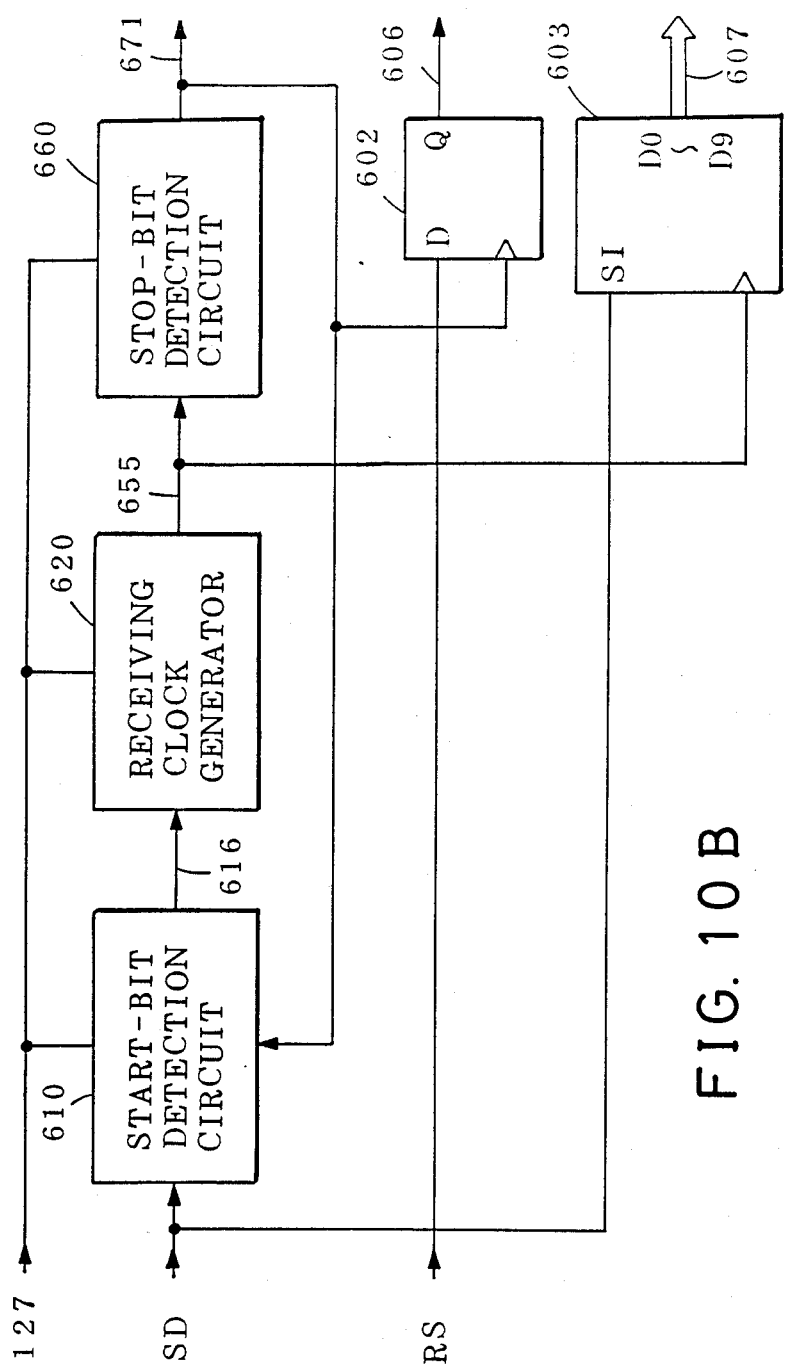
FIG. 10B is a block diagram illustrating an embodiment of a start-stop synchronizing circuit 601 shown in FIG. 10A.
Figure 10C:
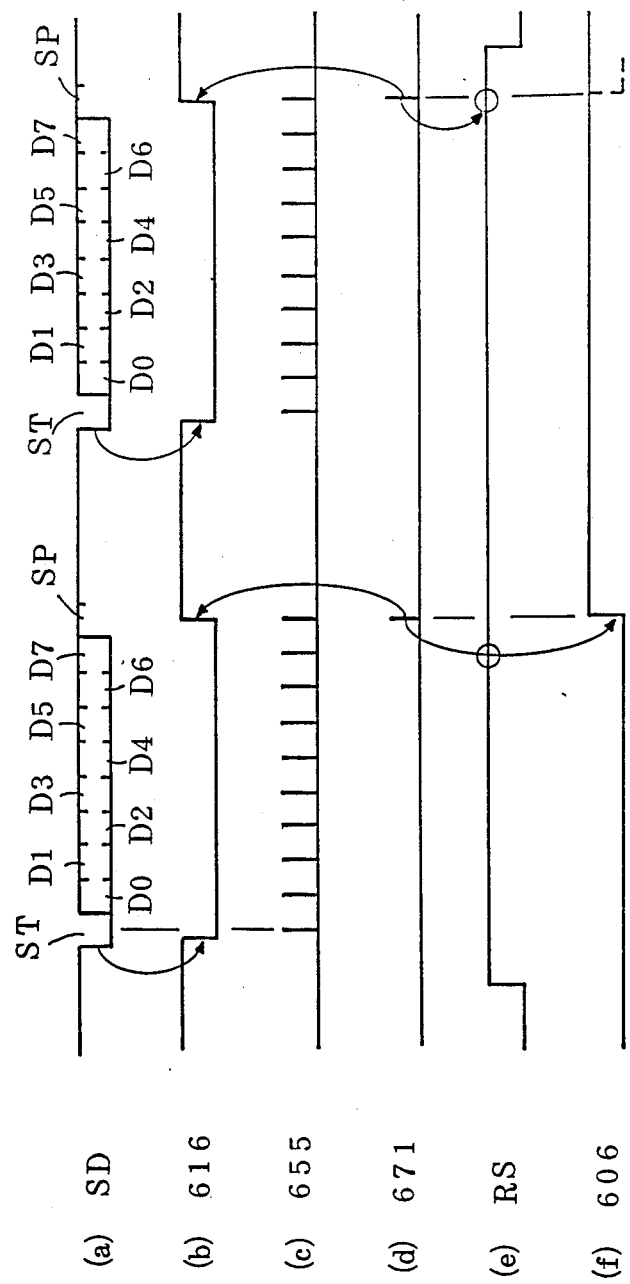
FIG. 10C is a time chart illustrating waveforms at various portions in the block diagram of FIG. 10B.

FIGS. 10B and 10c show a block diagram and its time chart of an embodiment of the start-stop synchronizing detection circuit 601.

Receiving the clock 127 and the send data SD. the start-bit detection circuit 610 detects of a trailing edge of a start-bit ST of (a) in FIG. 10C to send out a signal 616 of (b) which goes a "0".

A receiving clock generator 620 receives the clock 127 and a signal 616 of (b) to deliver a signal 655 of (c), in which each bit of the signal 655 is sent out at the center of each bit shown in (a) of FIG. 10C.

The signal 655 is applied to a S/p register 603, which is serial-in parallel-out resister, at its serial input terminal SI. The S/P register 603 samples the send data SD of (a) with the signal 655 of (c) to obtain a bus signal 607 which is delivered as parallel outputs.

Being applied the signal 665 of (c) of FIG. 10C and the clock 127, a stop-bit detection circuit 660 counts up pulses of the signal 655 from the start-bit ST to the stop-bit SP in which 10 counts are obtained in FIG. 10C.

When the stop-bit SP is detected the stop-bit detection circuit 660 delivers a signal 671 of (d). The signal 671 is fed back to the start-bit detection circuit 610 so that the circuit 610 is reset to be able to detect the next start-bit.

A D flip-flop 602 samples the signal RS of (e) in FIG. 10C, which is applied at its data terminal D, with the signal 671 of its clock terminal to deliver a signal 606 of (f).

Figure 10D:
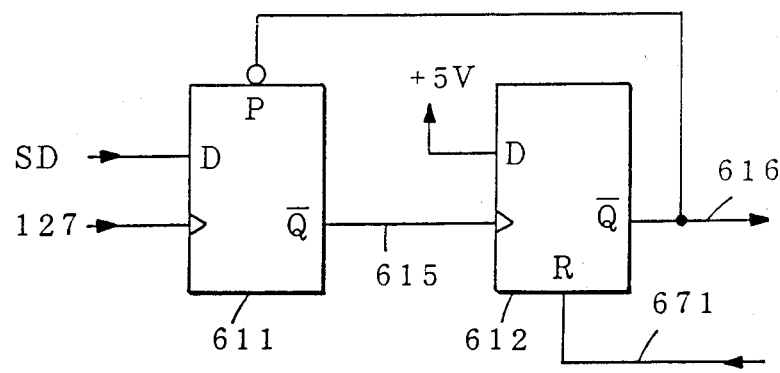
FIG. 10D is a circuit diagram illustrating an embodiment of a start-bit detection circuit 610 shown in FIG. 10B.
Figure 10E:
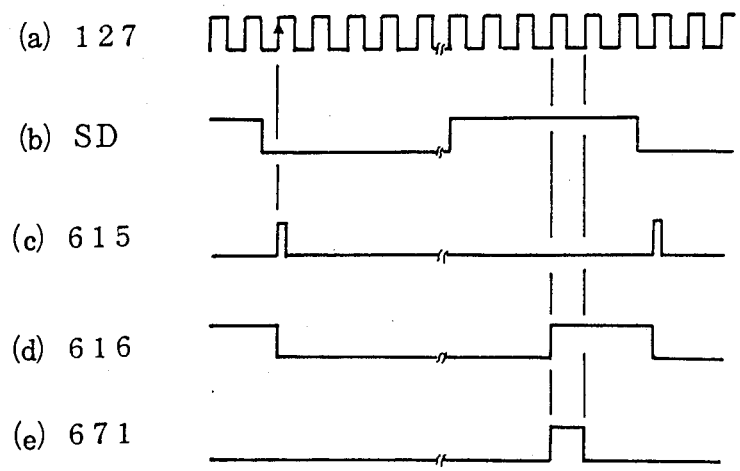
FIG. 10E is a time chart illustrating waveforms at various portions in the circuit diagram of FIG. 10D.

FIGS. 10D and 10E show a circuit diagram and its time chart of an embodiment of the start-bit detection circuit 610.

A data terminal D of a D flip-flop 611 is applied the send data SD of FIG. 10E (b) which is sampled with the clock 127 of (a) provided at its clock terminal to deliver a signal 615 of (c) in FIG. 10E from its output not-Q.

The signal 615 of (c) is applied to a clock terminal of a flip-flop 612 so that a signal 616 of (d) of its output not-Q goes to a "0". The "0" state is continued till the signal 671 of (e) from the stop-bit detection circuit 660 is applied at its reset terminal R. When the signal 671 of (e) goes to a "1", the flip flop 612 is reset so that the signal 616 of the output not-Q goes to a "1" which is applied to a preset terminal P of the D flip-flop 611 to cancel the reset state. Thus the operation detecting the start-bit can be executed.

Figure 10F:
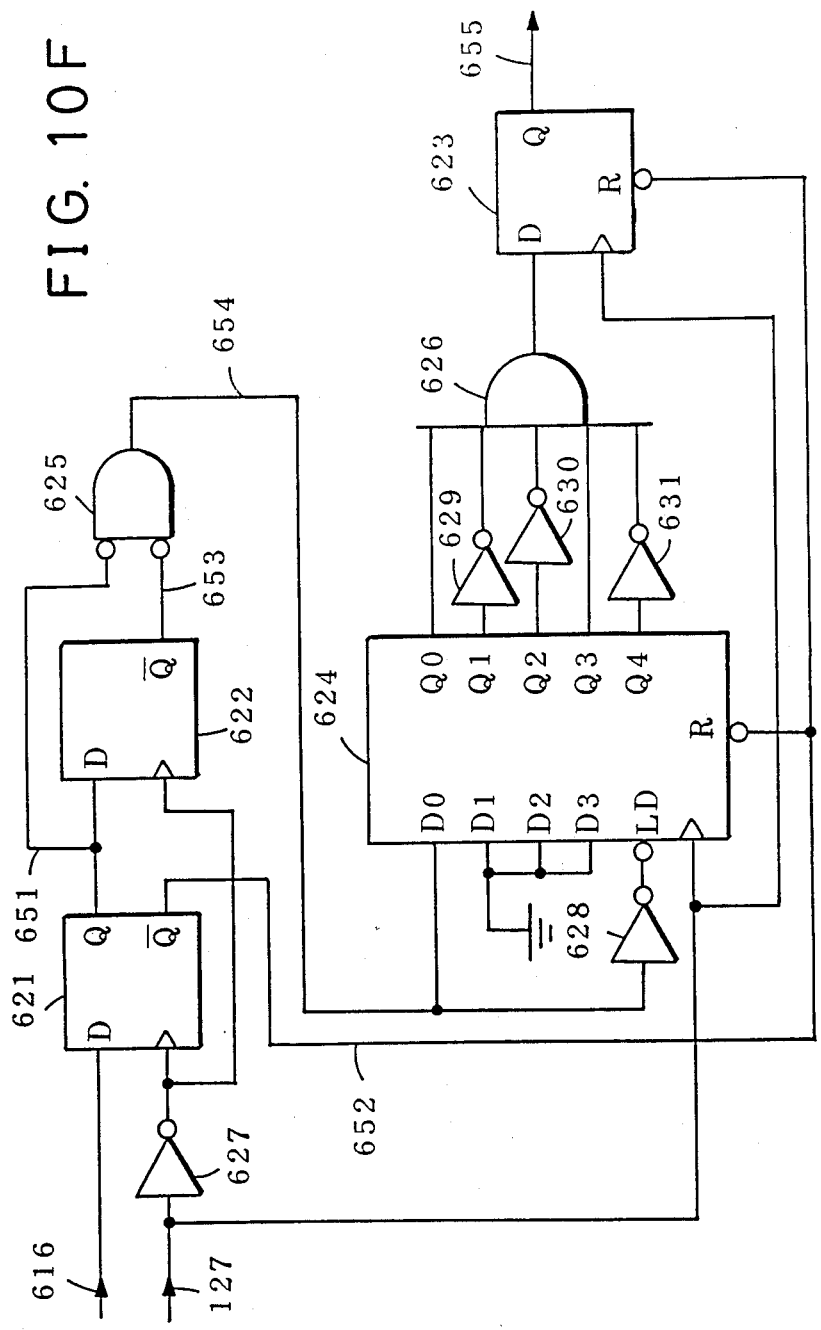
FIG. 10F is a circuit diagram illustrating an embodiment of a receiving clock generator 620 of FIG. 10B.
Figure 10G:
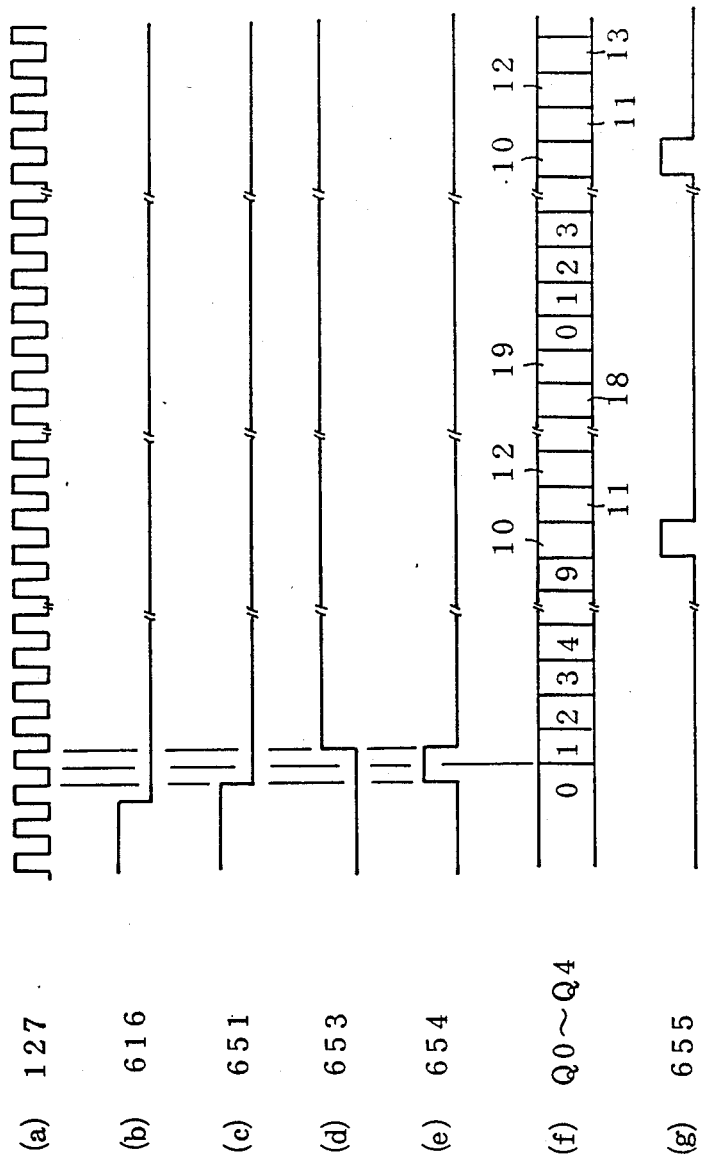
FIG. 10G is a time chart illustrating waveforms at various portions in the circuit of FIG. 10F.

FIGS. 10F and 10G show a circuit diagram and its time chart of an embodiment of the receiving clock generator 620.

A D flip-flop 621 is applied the signal 616 of (b) in FIG. 10G at its data terminal D and the clock 127 of (a) at its clock terminal through an inverter 627. The D flip-flop 621 samples the signal 616 of (b) with trailing edge of the clock 127 of (a) to deliver signals 651 of (c) from its output Q and 652 from its output not-Q.

The signal 651 of (c) is applied to a data terminal of a D flip-flop 622 which samples the signal 651 with the signal 127 of (a) at its clock terminal through the inverter 627 to deliver an output not-Q as a signal 653 of (d).

The signals 653 of (d) and 651 of (c) are applied to a NOR gate 625 which delivers a signal 654 of (e). A one-to-20 counter 624 is provided with the signal 654 of (e) at its data terminal D0, "0s" at its data terminals D1 to D3, the signal 654 of (e) at its load terminal LD through an inverter 628 and a signal 652 which is reversed the signal 651 of (c) at its reset terminal R to count the number of pulses of the clock 127 of (a) after the counter 624 is reset.

When applied the signal 654 of (e), the one-to-20 counter 624 is loaded with a "1" to start counting up and so its outputs Q0 to Q4 are applied to inverters 629, 630, 631 and AND gate 626. When having counted up to 9, the AND gate 626 deliver an output to a D flip-flop 623 which sends out a signal 655 of (g).

After the start-bit ST (refer to FIG. 10C (a)) has been detected, when the counter 624 counts up to 9, the first pulse of the signal 655 of (g) in FIG. 10G is delivered. The second pulse and more are delivered every counting up to 20. This operation is continued till the signal 616 of (b) in FIG. 10G goes to a "1" state.

Figure 10H:
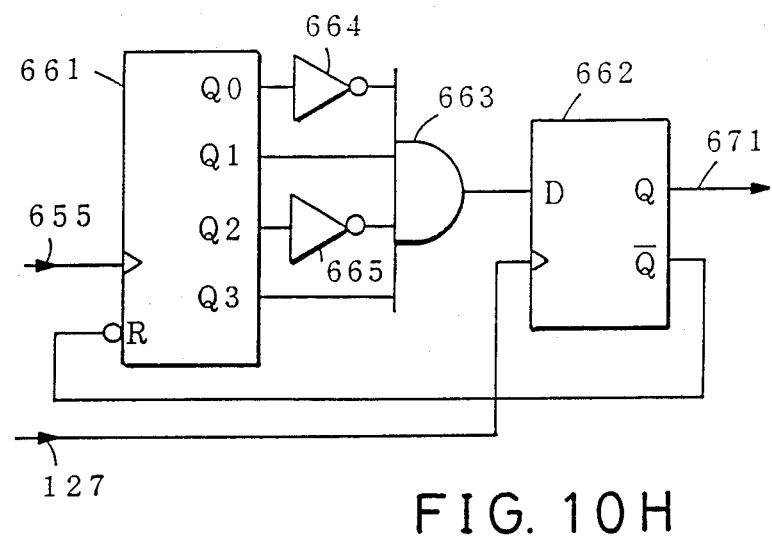
FIG. 10H is a circuit diagram illustrating an embodiment of a stop-bit detection circuit 660 of FIG. 10B.
Figure 10I:
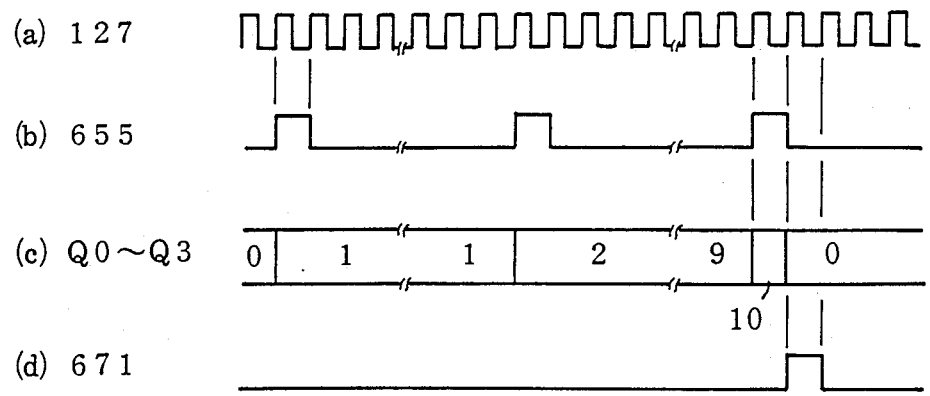
FIG. 10I is a time chart illustrating waveforms at various portions in the circuit of FIG. 10H.

FIGS. 10H and 10I show a circuit diagram and its time chart of an embodiment of the stop-bit detection circuit 660.

The signal 655 of (b) in FIG. 10I is applied to a clock terminal of a hexadecimal counter 661 which delivers values shown in (c) of FIG. 10I by counting the signal 655. Outputs Q0 to Q3 of the counter 661 are applied to inverters 664, 665 and an AND gate 668. When the outputs of the counter 661 indicates a value of 10, the AND gate 663 delivers an output to a data terminal D of a D flip flop 662 of which clock terminal receives the clock 127 to obtain a signal 671 of (d) from its output Q. Thus the signal 671 can be delivered every 10-bits consisting of a start-bit, 8-data-bits and a stop-bit. When the signal 671 of (d) is sent out, the output not-Q of the D flip-flop 662 is applied to the reset terminal R of the counter 661 to reset and so the above-descrived operation is repeated.

Figure 11A:
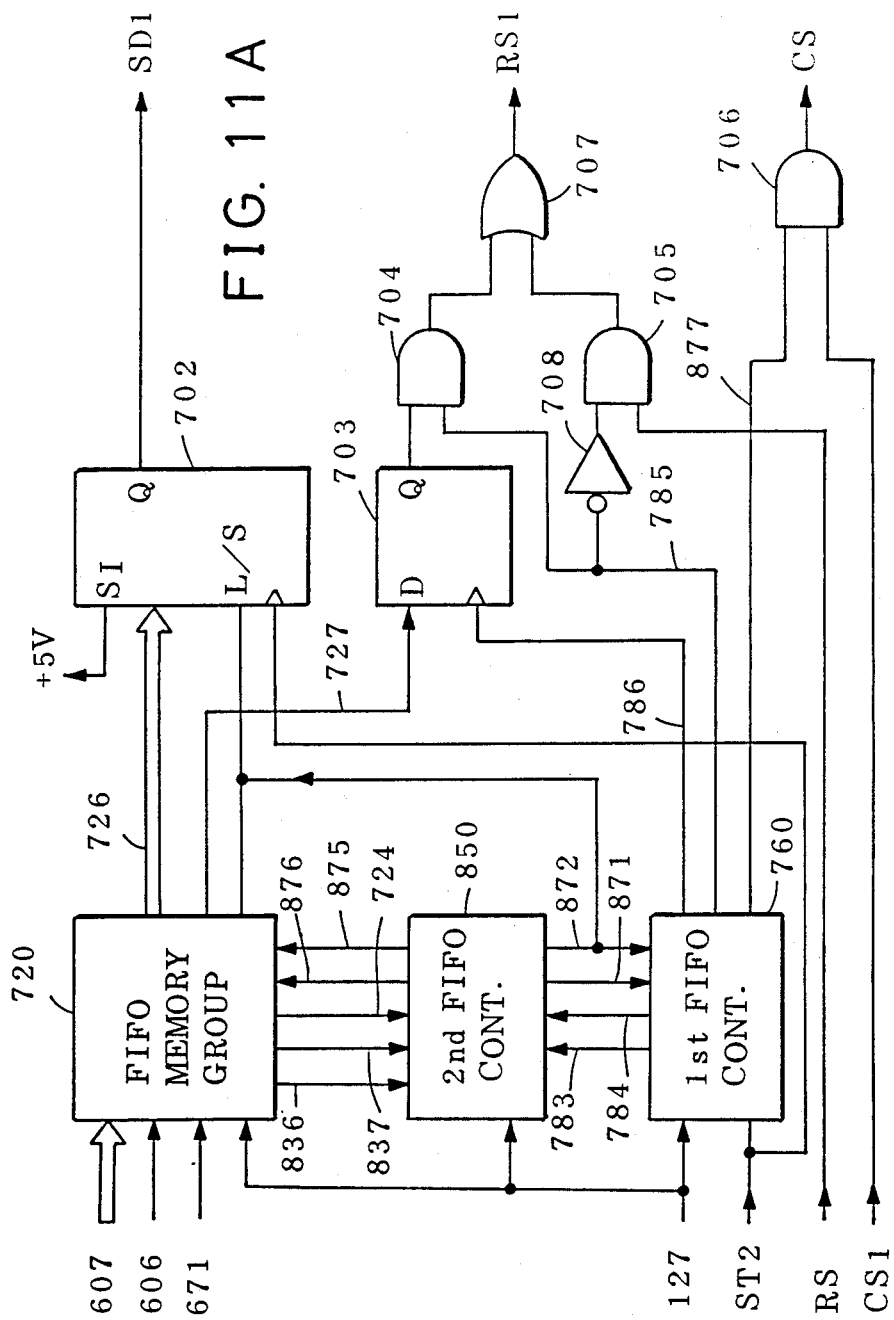
FIG. 11A is a block diagram illustrating an embodiment of an error frequency absorbing buffer 701 of FIG. 10A.
Figure 11B:
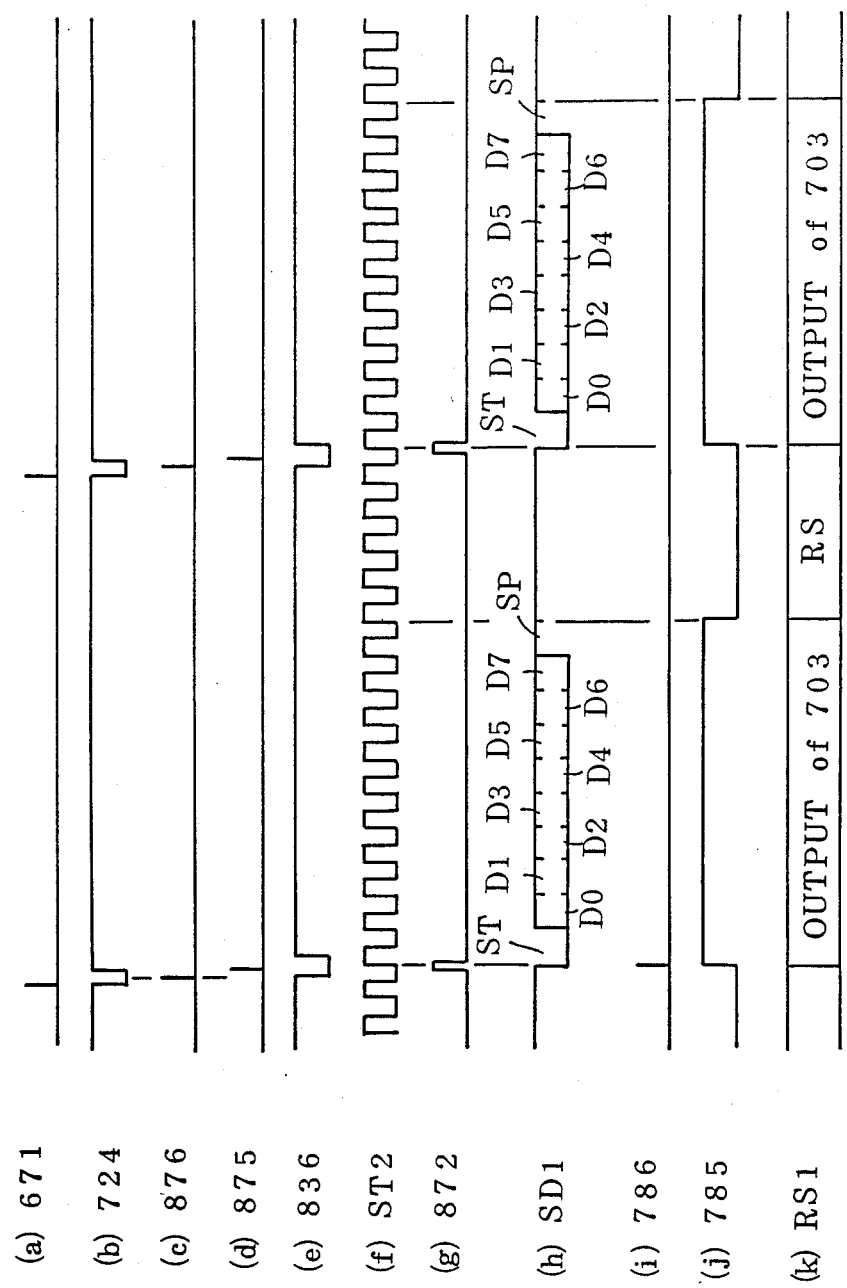
FIG. 11B is a time chart illustrating waveforms at various portions in the circuit of FIG. 11A.

FIGS. 11A and 11B show a block diagram and its time chart of an embodiment of the error frequency absorbing buffer 701.

The bus signal 607 consists of 10-bits of a start-bit, 8-data-bits and a stop-bit and the signal 606 which is obtained by sampling the request-to-send signal RS at the timing of the stop-bit ST are applied to a FIFO (first-in-first-out) memory group 720 to be stored at the timing of the signal 671 of (a) of FIG. 11B in which the clock 127 is used for processing signals and a signal 872 for reading out contents of the FIFO memory group 720. A signal 724 of (b) indicates that a 2-stage FIFO memory included in the FIFO memory group 720 is vacant, a signal 836 of (e) indicates that a 6-stage FIFO memory in the same is vacant, and a signal 837 (not shown in FIG. 11B) indicates that the 6-stage FIFO memory is full occupied.

When the signal 671 of (a) to instruct writing is applied to the FIFO memory group 720, the signal 724 of (b) having indicated a "1" to show being vacant goes to a "0" and so the countents of the 2-stage FIFO memory are shifted into the 6-stage FIFO memory by receiving a signal 876 of (c). Then the signal 836 of (e) showing the state of the 6-stage FIFO memory goes from the "1" having shown the vacant state to a "0" showing the not vacant state so that the signal 724 of (b) goes to a "1" state indicating the 2-stage FIFO memory vacant by receiving the signal 875 of (d). The signal means that the 6-stage FIFO memory has been written.

A P/S (parallel-in serial-out) register 702 is applied a bus signal 726 from the FIFO memory group 720 in parallel so that contents of the bus signal 726 are stored into the P/S register 702 at the receipt of a "1" of the signal 872 of (g), and are delivered as a send data SD1 of (h) in FIG. 11B from the output Q of the P/S register 702 during a "0" of the signal 872 of (g). A clock ST2 has the repetition rate required by the DTE. The send data SD1 from the P/S register 702 are transmitted to another DTE at the repetition rate of the clock ST2 through the mapping circuit 300 and so on.

When no data of the bus signal 726 from the FIFO memory group 720 are applied, the P/S register 702 of which serial-in terminal S1 is "1" (+5 V) continues delivering "1s" after the stop-bit SP to inform the DTE of no data to be sent till the next data are applied as shown in (h) of FIG. 11B.

The first and second FIFO controllers 760 and 850 send out control signals 872, 875 and 876 which are used in the error frequency absorbing buffer 701 and signals 785, 786 and 877. A D flip-flop 703 receives a signal 727 based on the signal RS from the FIFO memory group 720 to deliver an output at a timing of the signal 786 of (i). The signal 785 of (j) indicates a "1" during an existent period of a valid data in the send data SD1 only.

When contents stored in the FIFO memory group 720 increases to 60-bits (10-bits by 6 from ST to SP of the SD1 of (h) in FIG. 11B), a signal 877 of an output of the first FIFO controller 760 goes from a "1" to a "0" which is applied to an AND gate 706 to inhibit it from sending out the signal CS1 as CS to the DTE. By the inhibiting, the DTE can not transmit data to the DCE. Thus, when the FIFO memory group 720 becomes perfectly vacant, the signal 877 returns to a "1" to permit the DTE to send out data.

A circuit consisting of AND gates 704, 705, an OR gate 707 and an inverter 708 delivers the output Q of the D flip-flop 703 as the request-to-send signal RS1 to the party of another DTE while the signal 785 of (j) indicates a "1" in which the output Q of the flip-flop 703 is based on the request-to-send signal RS. The signal RS is sent out as the signal RS1 from the OR gate 707 while the signal 785 of (j) indicates a "0".

Figure 11C:
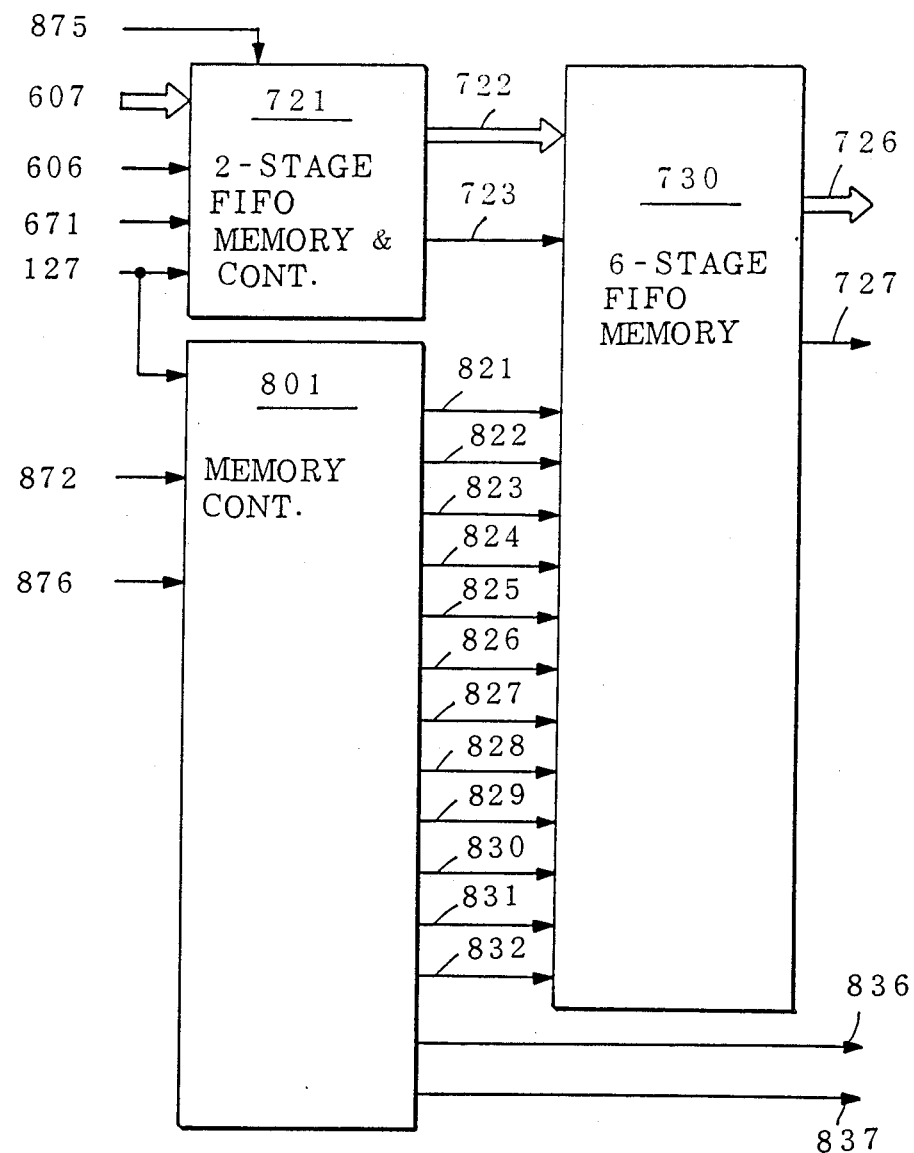
FIG. 11C is a block diagram illustrating an embodiment of a FIFO memory group 720 of FIG. 11A.

FIG. 11C shows a detailed block diagram of an embodiment of the FIFO memory group 720 in which the 2-stage FIFO memory and controller 721, the 6-stage FIFO memory 730 and a memory controller 801 controlling the 6-stage FIFO memory 730 are included.

The 2-stage FIFO memory and controller 721 delivers a bus signal 722 and a signal 723 to the 6-stage FIFO memory 730. The bus signal 722 consists of 10 bits and the signal 723 is based on the request-to-send signal RS. The memory controller 801 delivers signals 821 to 832 to the 6-stage FIFO memory 730.

Figure 11D:
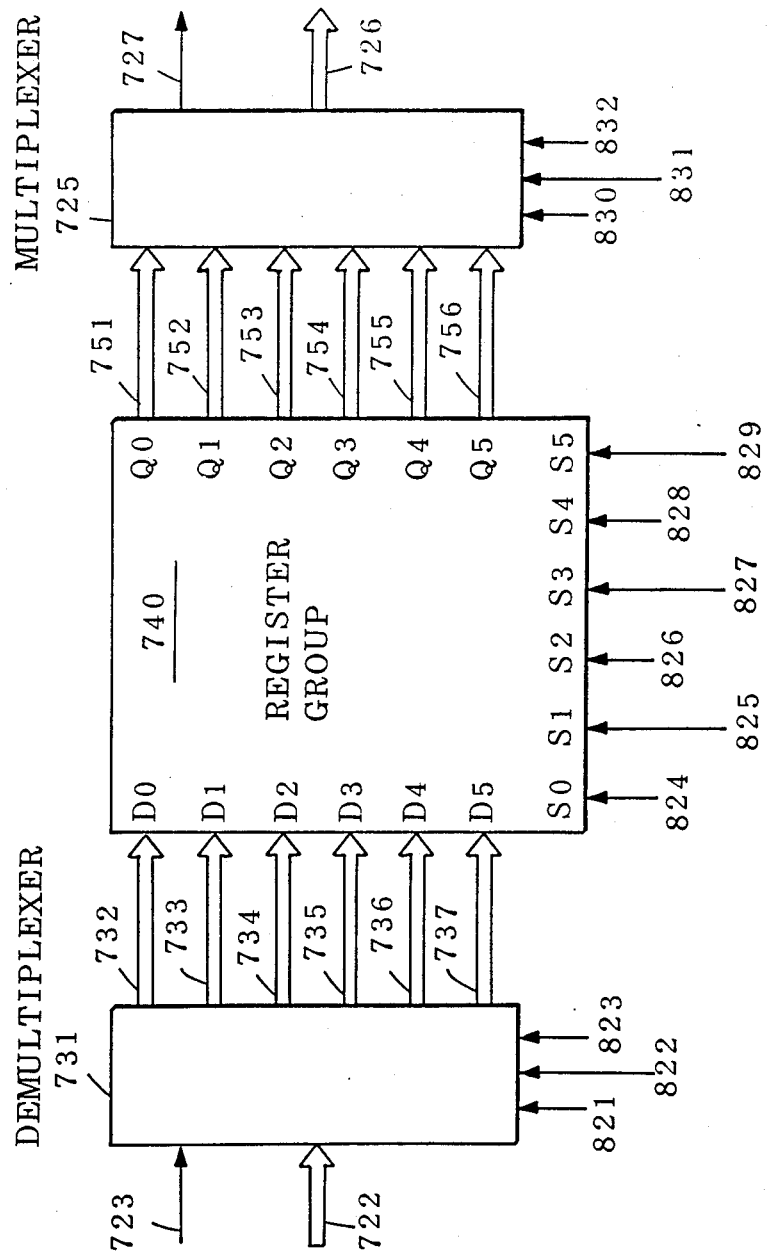
FIG. 11D is a block diagram illustrating an embodiment of a 6-stage FIFO memory of FIG. 11C.

FIG. 11D shows a detailed block diagram of an embodiment of the 6-stage FIFO memory 730. As the 2-stage FIFO memory included in the 2-stage FIFO memory and controller 721 has the same construction as that of the 6-stage FIFO memory, the block diagram of the 2-stage FIFO memory is not shown. However, the 6-stage FIFO memory 730 has a memory capacity of 66 bits and the 2-stage FIFO memory has the same of 22 bits.

In FIG. 11D, a demultiplexer 731 demultiplexes 11 bits consisting of a bus signal 722 of 10 bits and a signal 723 of a bit to exchange to one of bus signals 732 to 737 according to instructions of signals 821, 822 and 823. When the bus signal 732 is chosen, a control signal 824 is applied to a terminal S0 of the resister group 740 to store the data of the bus signal 732 which is inputted at its terminal D0. In the same manner, when the bus signal 733 applied to its terminal D1, the signal 825 is inputted at its terminal S1. In like manner, terminals D2 to D5 correspond with signals 826 to 829 respectively.

The data stored in the register group 740 are always delivered as signals 751 (11 bits) to 756 (11 bits) from its outputs Q0 to Q5 respectively. A multiplexer 725 choses one of those bus signals 751 to 756 by the instruction of signals 830, 831 and 882 to deliver a bus signal 726 (10 bits) and a signal 727 (1 bit based on the signal RS).

Figure 11E:
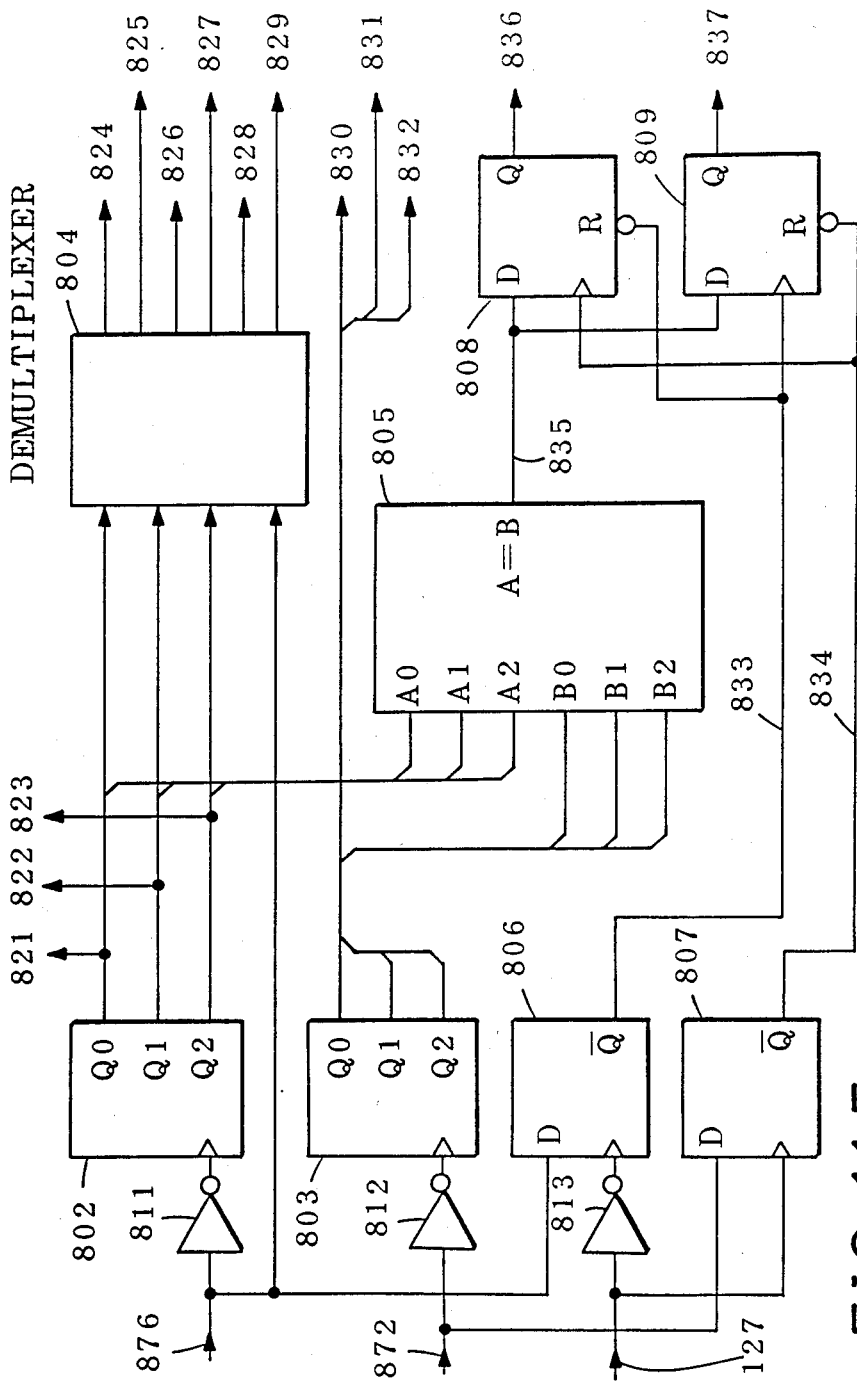
FIG. 11E is a circuit diagram illustrating an embodiment of a memory controller 801 of FIG. 11C.
Figure 11F:
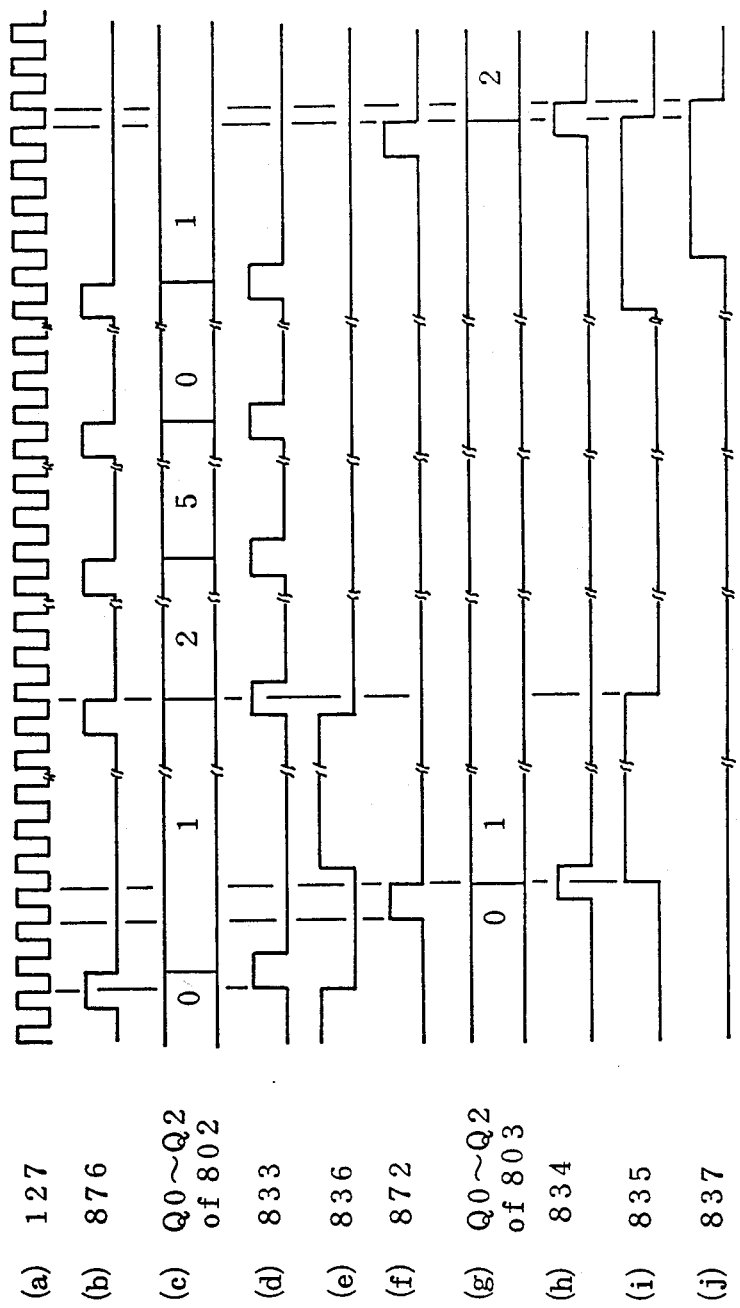
FIG. 11F is a time chart illustrating waveforms at various portions in the circuit of FIG. 11E.

FIGS. 11E and 11F show a circuit diagram and its time chart of an embodiment of the memory controller 801 which corresponds to the controller included in the 2-stage FIFO memory and controller 721. The circuit of the controller included in the 2-stage FIFO memory and controller 721 is not shown in figures because the memory controller 801 controls the 6-stage FIFO memory 730 (66 bits) and the controller included in the 2-stage FIFO memory and controller 721 controls the 2-stage FIFO memory (22 bits).

One-to-6 counters 802 and 803 respectively receive signals 876 of (b) and 872 of (f) at each clock terminal through inverters 811 and 812 to count. The one-to-6 counter 802 delivers signals 821, 822 and 823 of outputs Q0, Q1 and Q2 of (c) in FIG. 11F. Signals 821 to 823 instruct that data of the signal 722 and the signal 723 have to be applied to which of terminals D0 and D5 of the register group 740.

The one-to-6 counter 803 delivers signals 830, 831 and 832 of outputs Q0, Q1 and Q2 of (g) in FIG. 11F. Signals 830 to 832 instruct that the register group 740 has to deliver data of which of bus signals 751 to 756 from outputs Q0 to Q5 of the resister group 740.

A D flip-flop 806 receives the clock 127 of (a) at its clock terminal through an inverter 813 to obtain a signal 833 delayed by a half cycle of the clock 127 of (a) from the signal 876 applied at its data terminal D. A D flip-flop 807 receives the clock 127 of (a) at its clock terminal to obtain a signal 834 delayed by a half cycle of the clock 127 of (a) from the signal 872 applied at its data terminal D. A comparator 805 compares a value A, which is an address to be written into, shown by signals 821 to 823 with a value B, which is an address to be read out, shown by signals 830 to 832 and when A=B is obtained the comparator 805 delivers a signal 835 of (i) in FIG. 11F.

When the register group 740 is vacant or fully occupied, the A=B is obtained to deliver the signal 835.

When the number of reading cycles equals the same of writing cycles, the A=B is obtained.

When the 6th writing is executed after the writing address had approached from 0 to 5, the writing address is returned to 0. When if the number of reading cycles is 0, the A=B is obtained to deliver the signal 835 of (i).

D flip-flops 808 and 809 discriminate the signal 835 of the vacant register group 740 from the same 835 of the occupied register group 740. When vacant, a signal 836 is sent out and when occupied, a signal 837 is sent out.

In FIG. 11F (d), a "0" of the signal 833 indicates that the register group 740 has been written into. The D flip flop 809, therefore, indicates that the register group 740 is not vacant namely occupied by its output of the signal 837 of (j).

In FIG. 11F (h), a "0" of the signal 834 indicates that the register group 740 has been read out. The D flip-flop 808, therefore, indicates that the register group 740 is not occupied namely vacant by its output of the signal 836 of (e).

A demultiplexer 804 demultiplexes the signal 876, which is a writing instruction, to one of signals 824 to 829 with signals 821 to 823 showing addresses.

Figure 11G:
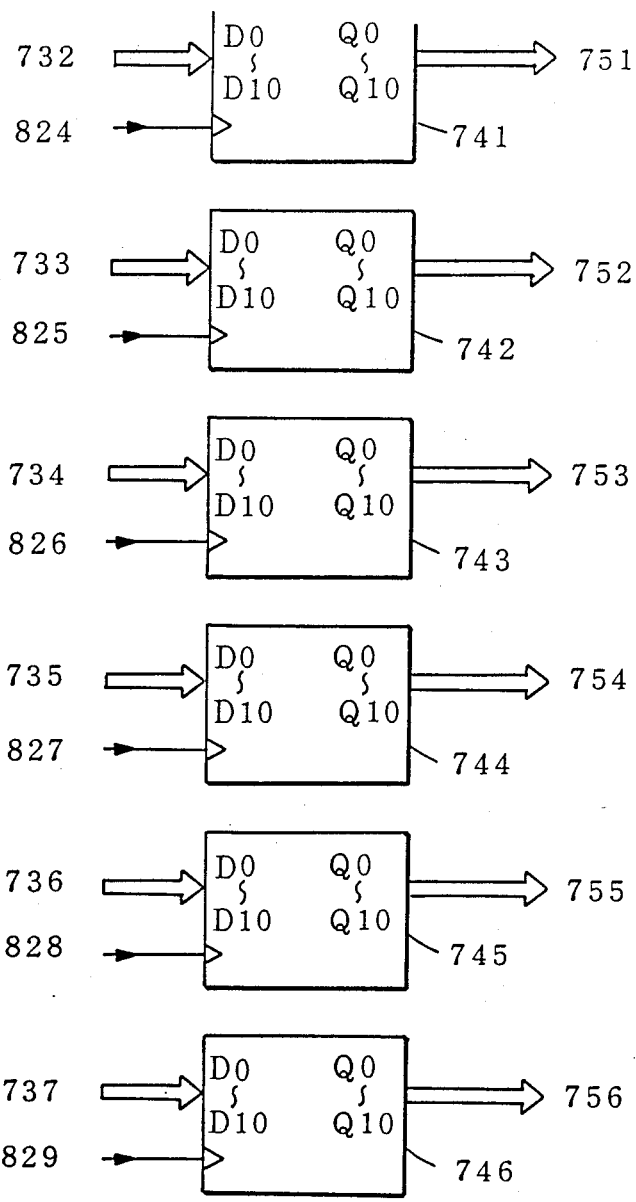
FIG. 11G is a circuit diagram illustrating an embodiment of a register group 740 of FIG. 11D.

FIG. 11G shows a circuit diagram of an embodiment of the register group 740 in which 11-bits registers 741 to 746 register contents of 11-bit bus signals 732 to 737 by writing instructions of signals 824 to 829 to deliver bus signals 751 to 756.

The 2-stage FIFO memory included in the 2-stage FIFO memory and controller 721 can be constructed with two 11-bit registers of FIG. 11G.

Figure 11H:
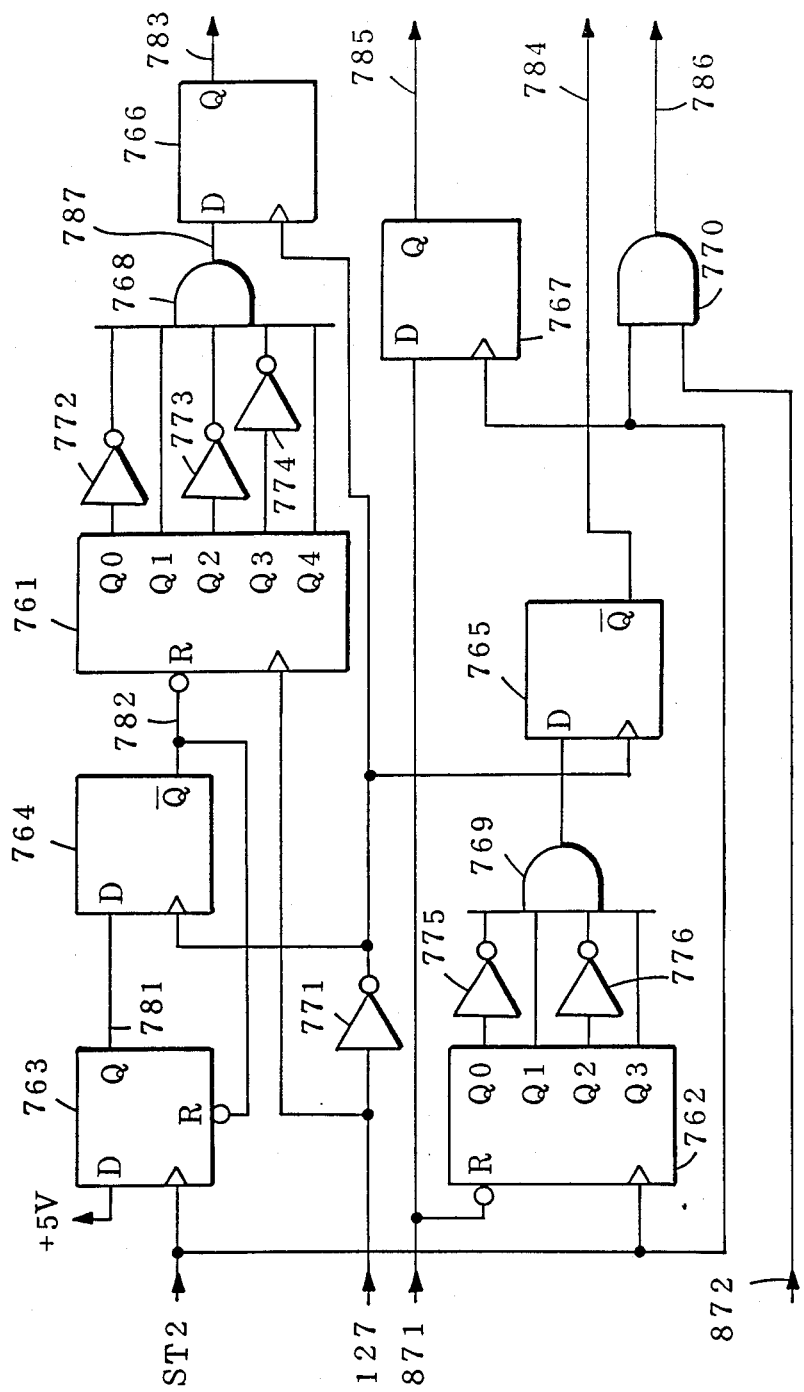
FIG. 11H is a circuit diagram illustrating an embodiment of the 1st FIFO controller 760 of FIG. 11A.
Figure 11I:
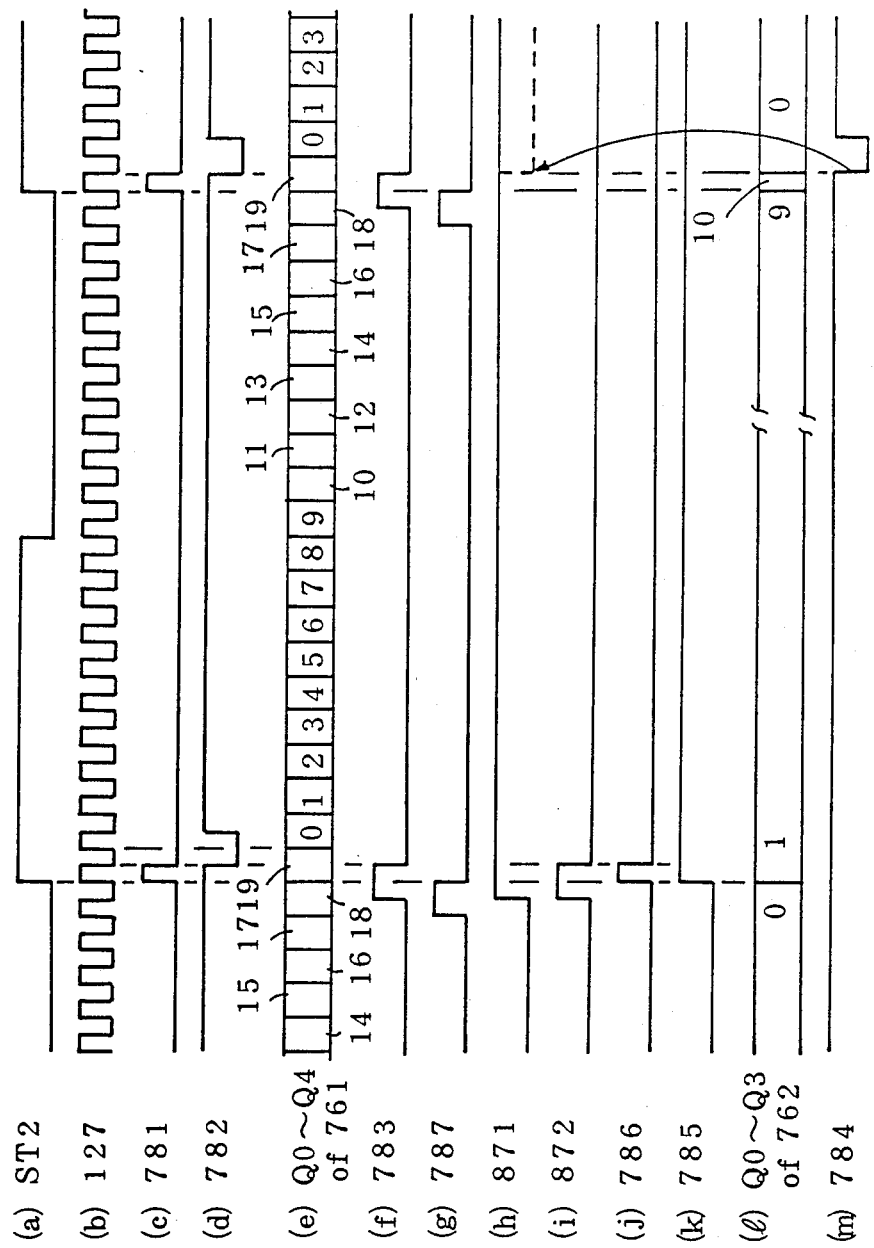
FIGS. 11I and 11J are time charts illustrating waveforms at various portions in the circuit of FIG. 11H.
Figure 11J:
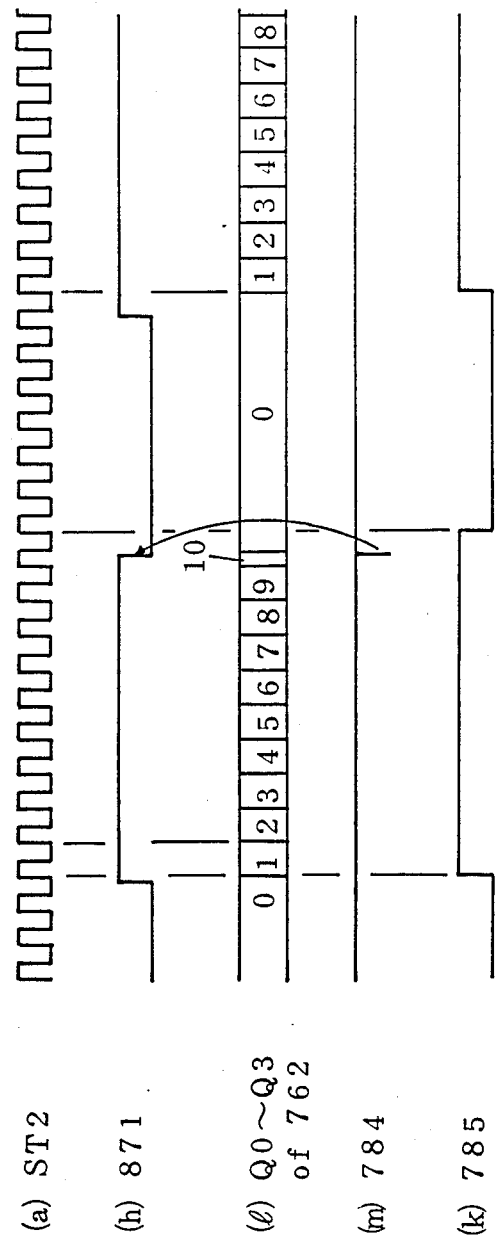

FIGS. 11H and 11I, 11J show a circuit diagram and its time chart of an embodiment of the first FIFO controller 760.

A D flip-flop 763 receives the clock ST2 of (a) in FIG. 11I at its clock terminal to obtain a signal 781 of (c). A D flip-flop 764 is applied the signal 781 at its data terminal and the clock 127 at its clock terminal through an inverter 771 to obtain a signal 782 of (d). The signal 782 applied to the D flip-flop 763 and an one-to-20 counter 761 to reset them.

The one to-20 counter 761 counts pulses of the clock 127 to deliver outputs Q0 to Q4 as shown in (e) of FIG. 11I to inverters 772, 773, 774 and an AND gate 768. When the outputs Q0 to Q4 of (e) show 18, the AND gate 768 delivers a "1" of a signal 787 of (g) to a data terminal of a D flip-flop 766.

The D flip-flop 766 is applied the clock 127 at its clock terminal through an inverter 771 to obtain the output signal 783 of (f). The leading edge of the signal 783 rises up prior to the leading edge of the clock ST2 of (a) by a half cycle of the clock 127 of (b) and falls down with delay half cycle of the clock 127 of (b) after the leading edge of the clock ST2. The signal 783 can be used as the signal prior a little bit to the clock ST2.

A D flip-flop 767 is applied the clock ST2 of (a) and a signal 871 of (h) which is a timing signal indicating a timing to send the data from the FIFO memory group 720 and delivers a signal 785 of (k) in FIG. 11I. The signal 785 indicates a "1" only during a period of the valid data of the send data SD1.

A decimal counter 762 receives a signal 871 at its reset terminal R to be reset and counts the clock ST2 applied at its clock terminal to deliver outputs Q0 to Q3 of FIG. 11I (l) which are applied to inverters 775, 776 and an AND gate 769. When outputs Q0 to 03 of the decimal counter 762 show a value of 10 as shown in (l) of FIG. 11I, the AND gate 769 deliver an output to a data terminal of a D flip-flop 765 which sends out the output of the AND gate 769 as a signal 784 of (m) of an output not Q at the timing of the clock 127 applied at its clock terminal through the inverter 771.

An AND gate 770 delivers a signal 786 of (j) by ANDing the clock ST2 of (a) and a signal 872 of (i). The signal 872 of (i) coincides with the signal 783 of (f) in timing in which the signal 783 is sent out every counting data change shown in (l) of FIG. 11I, however, the signal 872 is sent out only when the data shown in (l) changes from 0 to 1.

There are shown in FIG. 4I (l), an aspect of the first period in which outputs Q0 to Q3 show 1 and another aspect of the latter period in which outputs Q0 to Q3 show 9 and 10. When outputs Q0 to Q3 of (l) have shown 9 and shows 10, the trailing edge of the signal 784 of (m) makes the signal 871 of (h) return from a "1" to a "0" as shown by a broken line in (h) of FIG. 11I.

The above described aspect will be shown more cleare in FIG. 4J in which the time axis is condensed.

The signal 875 of (k) in FIG. 11J returns from a "1" to a "0" when the first leading edge of the clock ST2 of (a) rises up after the signal 871 of (h) has turned from a "1" to a "0".

Figure 11K:
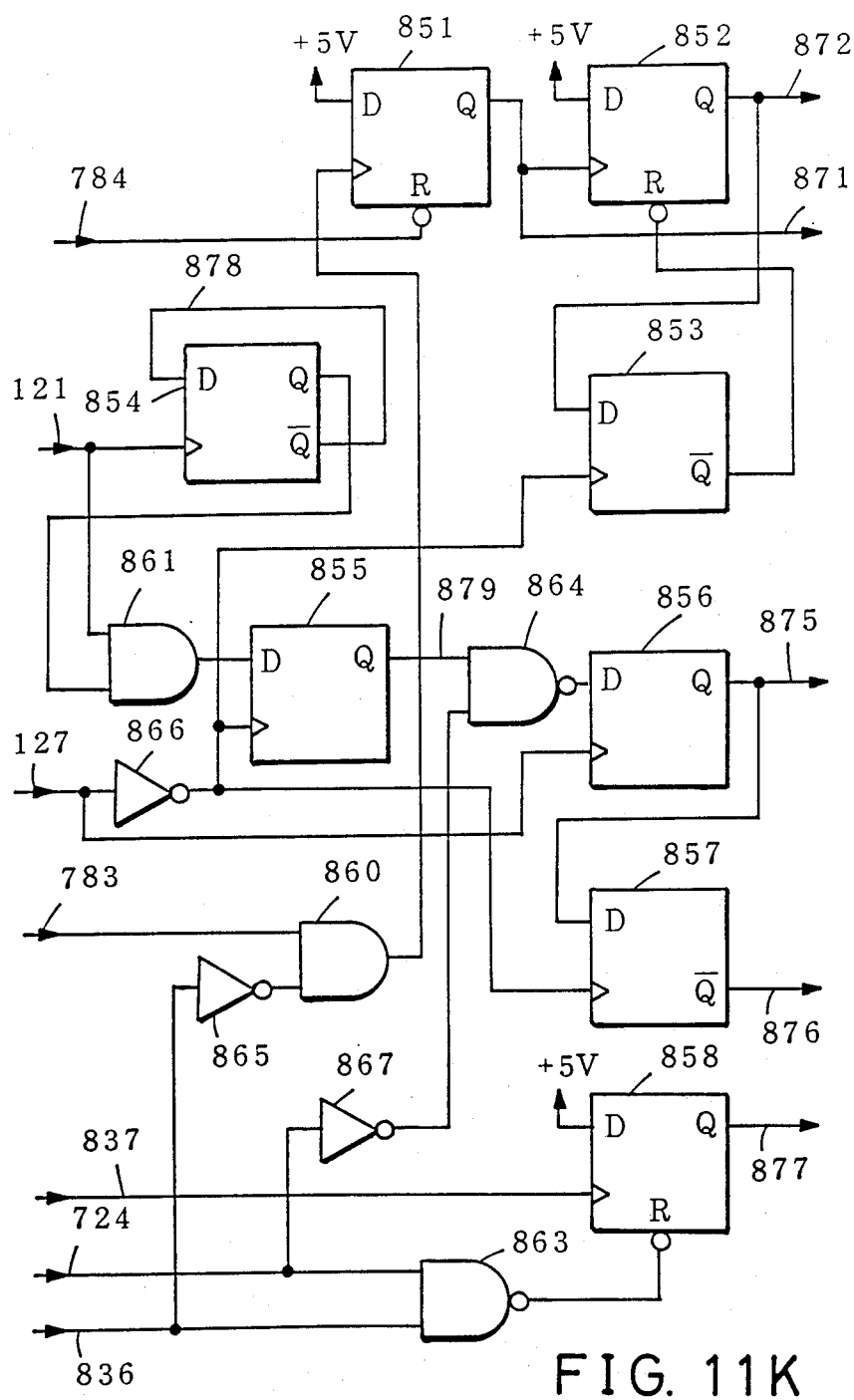
FIG. 11K is a circuit diagram illustrating an embodiment of the 2nd FIFO controller 850 of FIG. 11A.
Figure 11L:
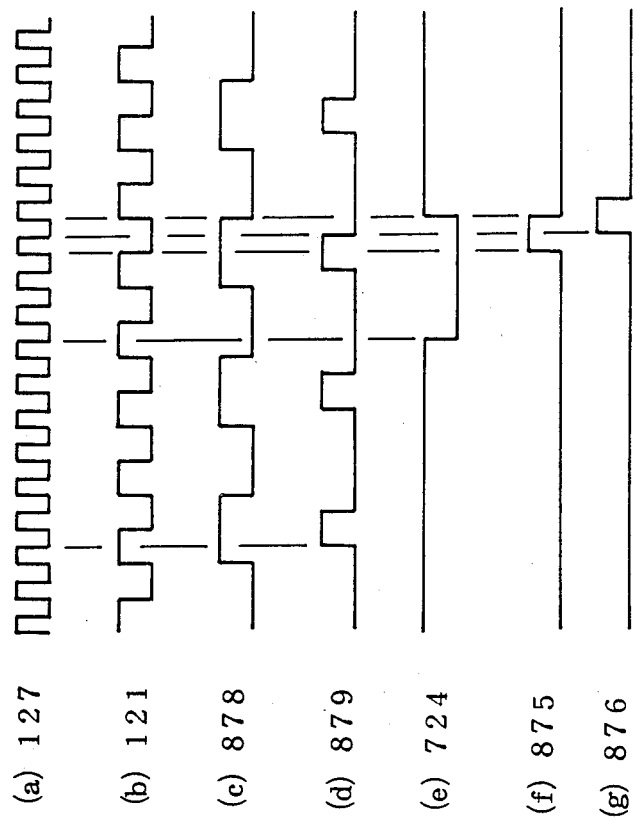
FIG. 11L is a time chart illustrating waveforms at various portions in the circuit of FIG. 11K.

FIGS. 11K and 11L show a circuit diagram and its time chart of an embodiment of the second FIFO controller 850.

Receiving the signal 783 from the first FIFO controller 760 and the signal 836 from the FIFO memory group 720 through an inverter 865, an AND gate 860 delivers a signal of a "1" indicating that the 6-stage FIFO memory 730 is not vacant to a clock terminal of a D flip-flop 881 of which data terminal D is set in "1". The D flip-flop 851 delivers a signal 871 from its output Q when the output of the AND gate 860 is applied. The D flip-flop 851 is reset by receiving a signal 784 (refer to FIG. 11J (m)) at its reset terminal R. The signal 871 is applied to a clock terminal of a D flip-flop 852 of which data terminal D is set in "1". Then the D flip-flop 852 delivers a signal 872 to a data terminal D of a flip-flop 853 of which clock terminal is provided with the clock 127 through an inverter 866. The D flip-flop 853 sends out an output not-Q to a reset terminal R of the D flip-flop 852 to reset it so that the signal 872 has the pulse width which is equal to a cycle of the clock 127.

A D flip-flop 854 receives the standard clock 121 of (b) in FIG. 11L at its clock terminal and its own output not-Q at its own data terminal to divide the standard clock 121 at a dividing ratio 2. The divided output Q of the D flip-flop 864 and the standard clock 121 are ANDed by an AND gate 865 to deliver the output to a data terminal D of a D flip-flop 855 of which clock terminal is provided with the clock 127 through an inverter 866 to obtain a signal 879 of (d).

Being applied the signal 879 and the signal 724 of (e) through an inverter 867, a NAND gate 864 delivers the output to a data terminal D of a D flip-flop 856 which clock terminal is provided with the clock 127 to obtain an output of the signal 875 of (f).

A D flip flop 867 is applied the clock 127 at its clock terminal through an inverter 866 and the signal 875 at its data terminal D to obtain a signal 876 of (g) from its output not-Q.

The signal 724 of (e) in FIG. 11L indicating that the 2-stage FIFO memory included in the 2-stage FIFO memory and controller 721 is vacant and the signal 836 indicating that the 6-stage FIFO memory 730 is vacant are applied to a NAND gate 863 to deliver the output to a reset terminal R of a flip-flop 858 to be reset. The D flip-flop 858 is provided with a "1" always at its data terminal D and the signal 837, which indicates that the 6-stage FIFO memory 730 is occupied, at its clock terminal to obtain a signal 877 from the output Q. The signal 877 goes to a "1" when the 6-stage FIFO memory 730 is occupied, and returns to a "0" when the 2-stage and 6-stage FIFO memories are vacant.

Figure 12:
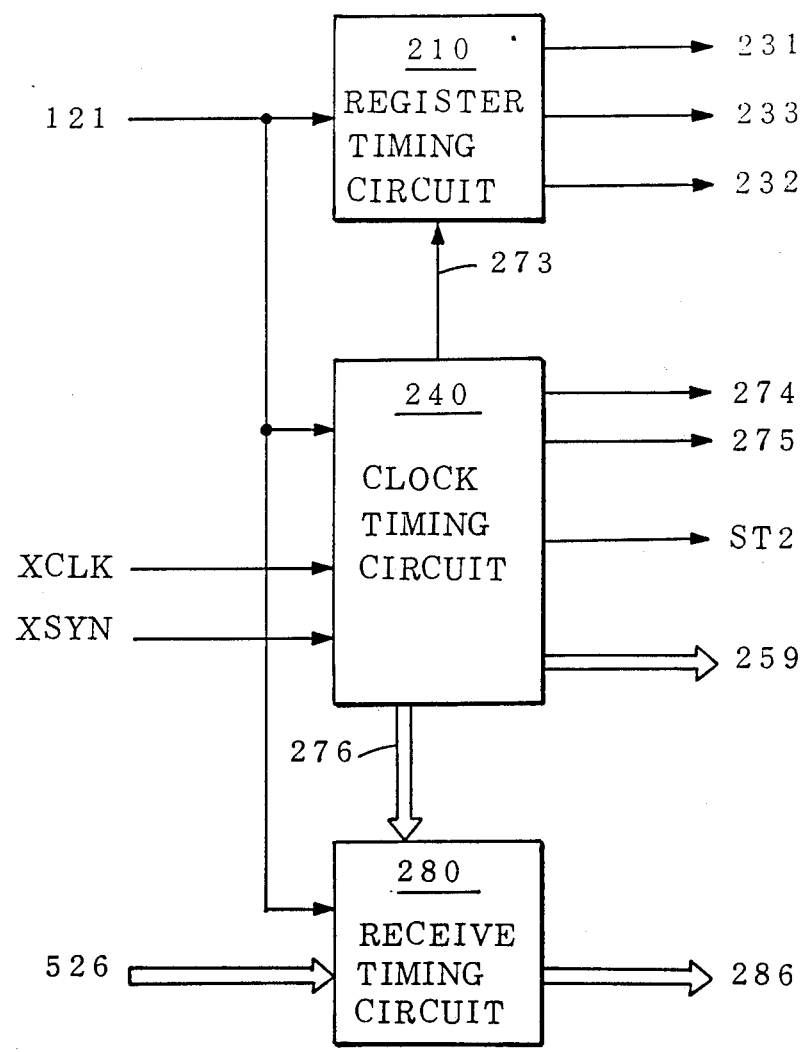
FIG. 12 is a block diagram illustrating an embodiment of the timing generator 200.

In FIG. 12, a block diagram of the timing circuit 200 is shown. Numeral 210 indicates a register timing circuit generating timing signals 231, 232 and 233 to be sent to the sending register 60 and the receiving register 80 on the basis of the standard clock 121 and a signal 273

Numeral 240 identifies a clock timing circuit 240 generates the signal 273 to the register timing circuit 210, a bus signal 276, a signal 274 and a bus signal 259 to the mapping circuit 300, a signal 275 to the demapping circuit 400, and a clock ST2 to the data terminal equipment by receiving the standard clock 121, the sending clock XCLK and the sending synchronization signal XSYN. Signals 262 and 264 included in the bus signal 569 are sent out to the demapping circuit 400.

Numeral 280 denotes a receive timing circuit which sends out a bus signal 286 to the demapping circuit 400 by receiving the standard clock 121, bus signals 526 and 276.

Figure 13A:
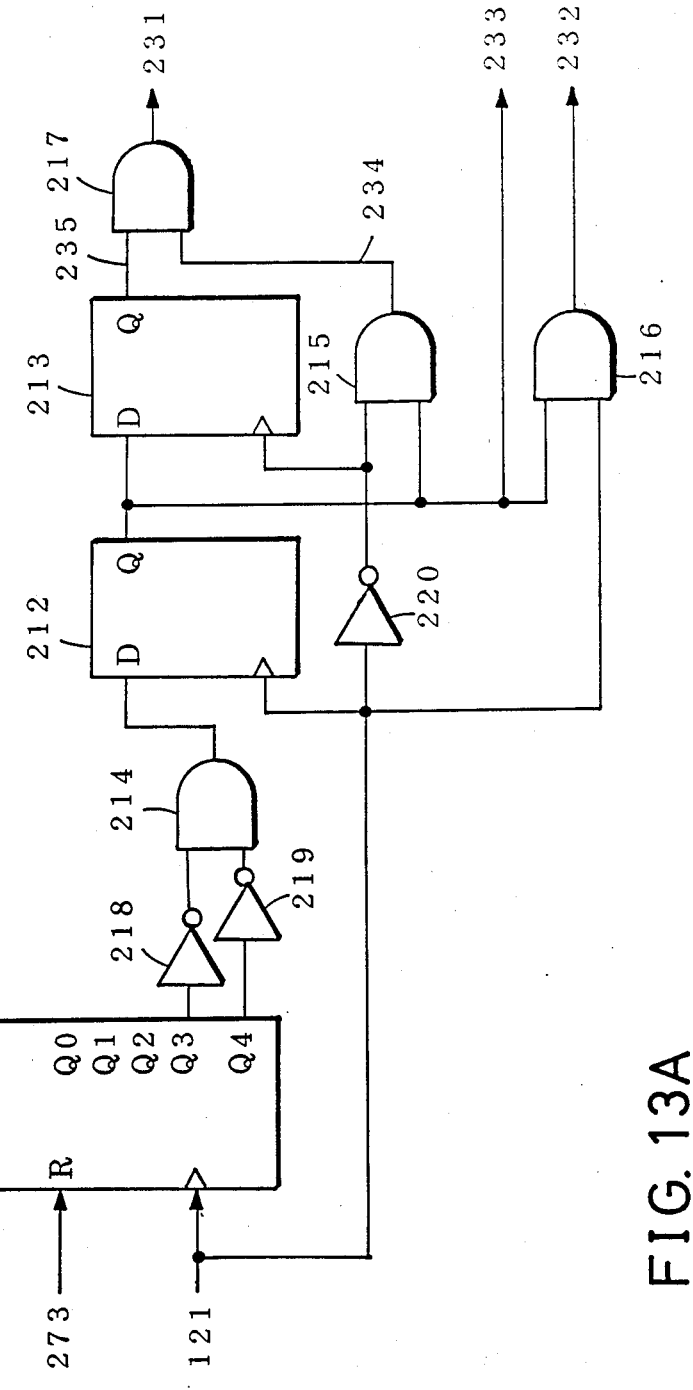
FIG. 13A is a circuit diagram illustrating an embodiment of a register timing circuit 210 included in the timing generator 200 of FIG. 12.
Figure 13B:
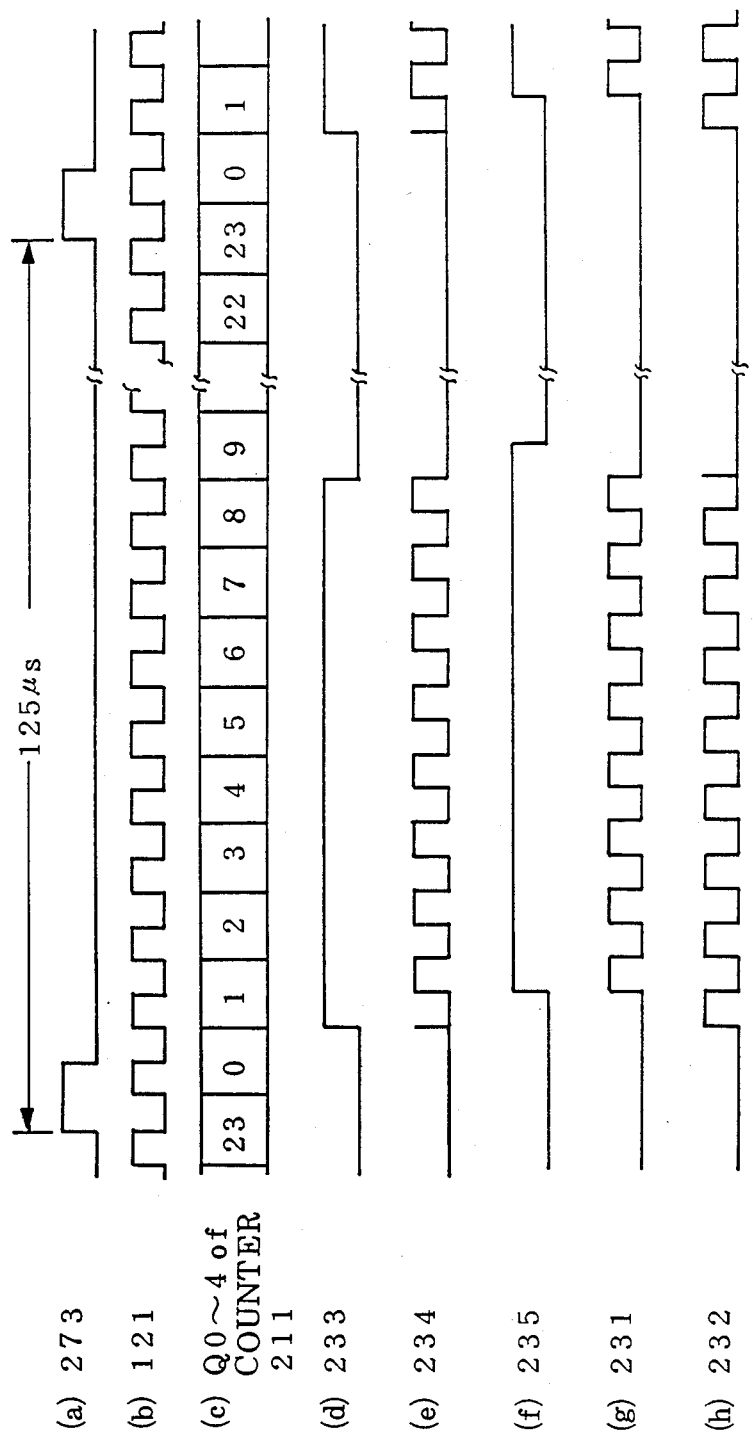
FIG. 13B is a time chart illustrating waveforms at various portions in the circuit of FIG. 13A.

There is shown in FIG. 13A a circuit diagram of an embodiment of the register timing circuit 210 of which time chart illustrating waveforms is shown in FIG. 13B.

The signal 273 in FIG. 13B (a) from the clock timing circuit 240 is applied to a reset terminal R of a one-to-24 counter 211 at a repetition rate of 125 microseconds. The one-to-24 counter 211 starts to count up from zero and so the signal 23 of (a) is reset when outputs of from Q0 to Q4 of (c) indicate 23. When both outputs Q3 and Q4 of &he one-to-24 counter 211 indicate "0s", an AND gate 214 applied the "0s" delivers a "1". Both outputs Q3 and Q4 of the one-to-24 counter 211 indicate "0s" during a period of from numerals zero to seven shown in FIG. 13B (c).

While the AND gate 214 delivers a "1", a D flip-flop 212 applied the "1" continuously delivers "1" by receiving the standard clock 121 at its clock terminal so that a signal 233 of (d) is obtained at an output Q of the D flip-flop 212. An AND gate 216 ANDs the signal 283 and the standard clock 121 to deliver a signal 232 shown in (h).

Receiving the signal 233 of FIG. 13B (d) and the standard clock 121 of (b) through an inverter 220, a D flip-flop 213 sends out a signal 235 as shown in FIG 13B (f) from its output Q in which the signal 235 is delayed from the signal 233 of (d) by a half cycle of the standard clock 121.

Receiving the signal of (d) and the standard clock 121 via the inverter 220, an AND gate 215 ANDs to obtain a signal 231 of (g).

Figure 14A:
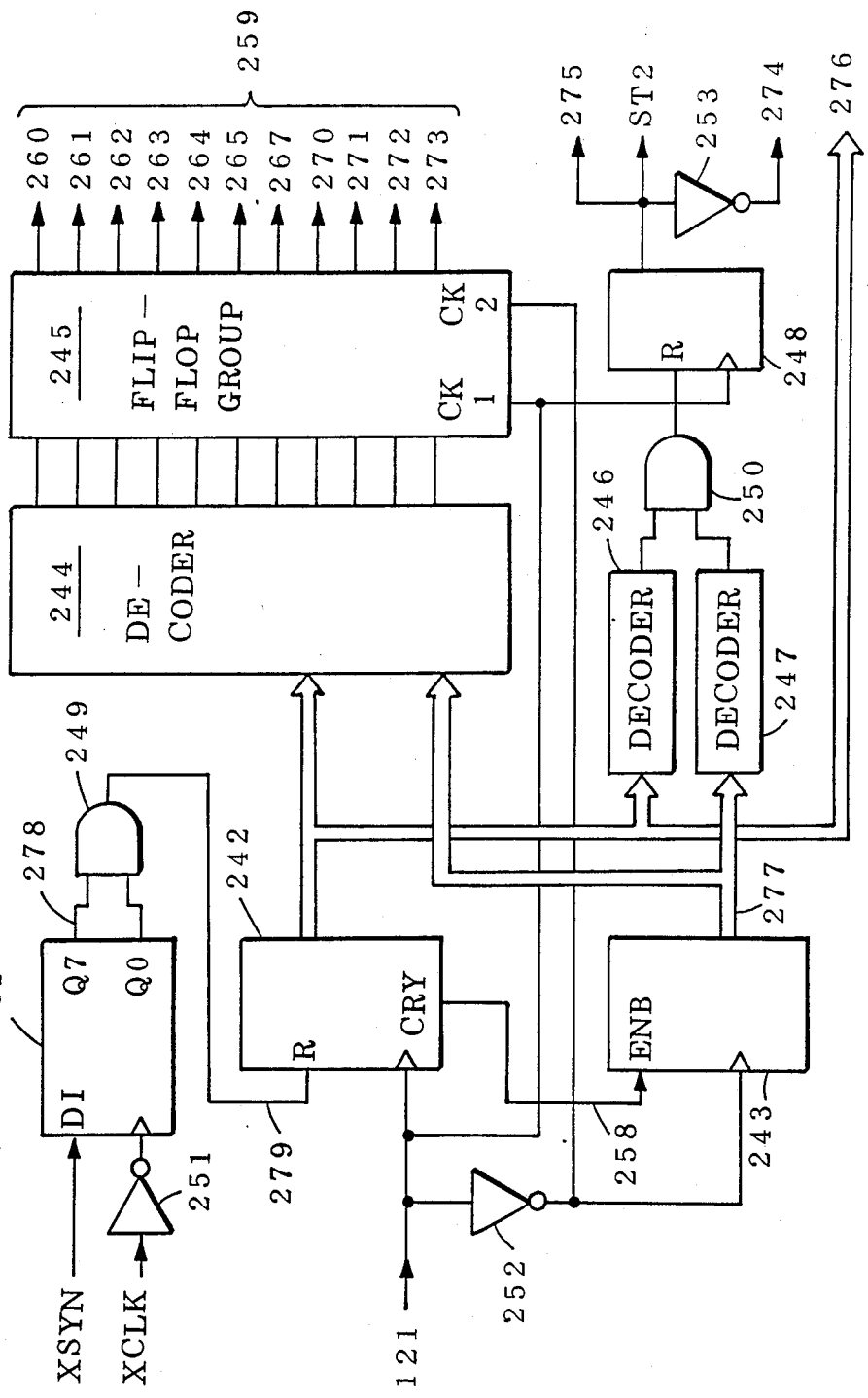
FIG. 14A is a circuit diagram illustrating an embodiment of a clock timing circuit 240 included in the timing generator 200 of FIG. 12.
Figure 14B:
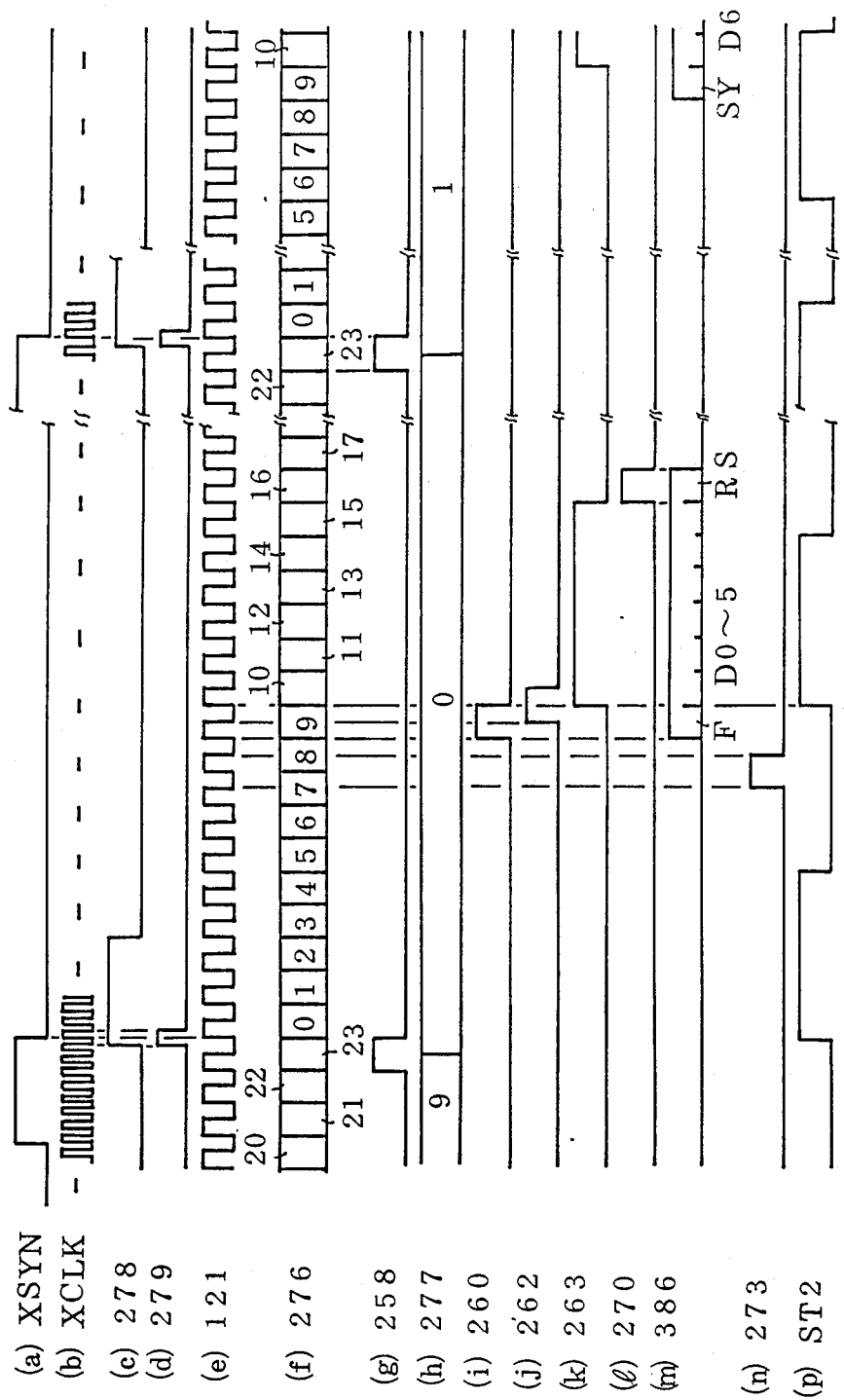
FIG. 14B is a time chart illustrating waveforms at various portions in the circuit diagram of FIG. 14A.

FIGS. 14A and 14B show a block diagram and its time chart of the clock timing circuit 240.

In FIG. 14A, numeral 241 shows a 8-BIT serial-in parallel-out register 241 which receives the signal XSYN of (a) at the repetition interval of 125 microseconds at its data input terminal DI and the sending clock XCLK of (b) at its clock terminal through an inverter 251. The register 241 delivers a signal 278 in FIG. 14B (c) from its output Q7. Each leading edge of &he signal 278 of (c) precedes the trailing edge of the signal XSYN of (a) by a half cycle of the sending clock XCLK of (b). Each trailing edge of a signal of an output terminal Q0 of the register 241 is delayed from a trailing edge of the signal XSYN of (a) by a half cycle of the sending clock XCLK of (b). An AND gate 249 ANDs both signals from outputs Q0 and Q7 of the register 241 and delivers a signal 279 in FIG. 14B (d). Each leading edge of the signal 279 precedes &he trailing edge of the signal XSYN of (a) by a half cycle of the sending clock XCLK of (b) and each trailing edge of the signal 279 is delayed from the trailing edge of the signal XSYN by a half cycle of the sending clock.

The signal 279 is applied to a reset terminal R of a one-to-24 counter 242. On the other hand, a clock terminal of the counter 242 is applied the standard clock 121 of (e). When applied the signal 279, the counter 242 starts to count up pulses of the standard clock 121 from zero to twenty-three and so the counter 242 delivers a signal 258 of (g) from a carry out terminal CRY. Counted values during counting are sent out as a bus signal 276 in FIG. 14B (f).

Receiving the signal 258 of (g) at an enable input ENB and the standard clock 121 of (e) via an inverter 252 at a clock terminal, a decimal multiframe counter 243 counts up at every pulse of the signal 258 to deliver the counting value as a bus signal 277 of (h). When the counting value reaches nine, the counting value of the bus signal 277 shown in (h) becomes to zero and the counting up is continued again by inputs of the next pulse of &he signal 258 of (g) and the standard clock 121.

The bus signal 276 from the one-to-24 frame counter 242 is applied to a flip-flop group 245 via a decoder 244. The flip-flop group 245 includes a number of D flip-flops, in which each D flip-flop corresponds to each decoded signal applied. Each decoded signal from the decoder 244 is inputted to a data terminal of each D flip-flop of which clock terminal is applied the standard clock 121 (CK1) or another standard clock CK2 which is obtained by an inverter 252 inputted the standard clock 121.

In such a manner, the flip-flop group 245 delivers a signal 260 of (i) when the bus signal 276 of (f) indicates nine and a signal 262 of (j) which is delayed from the signal 260 by a half cycle of the standard clock 121.

Figure 24A:
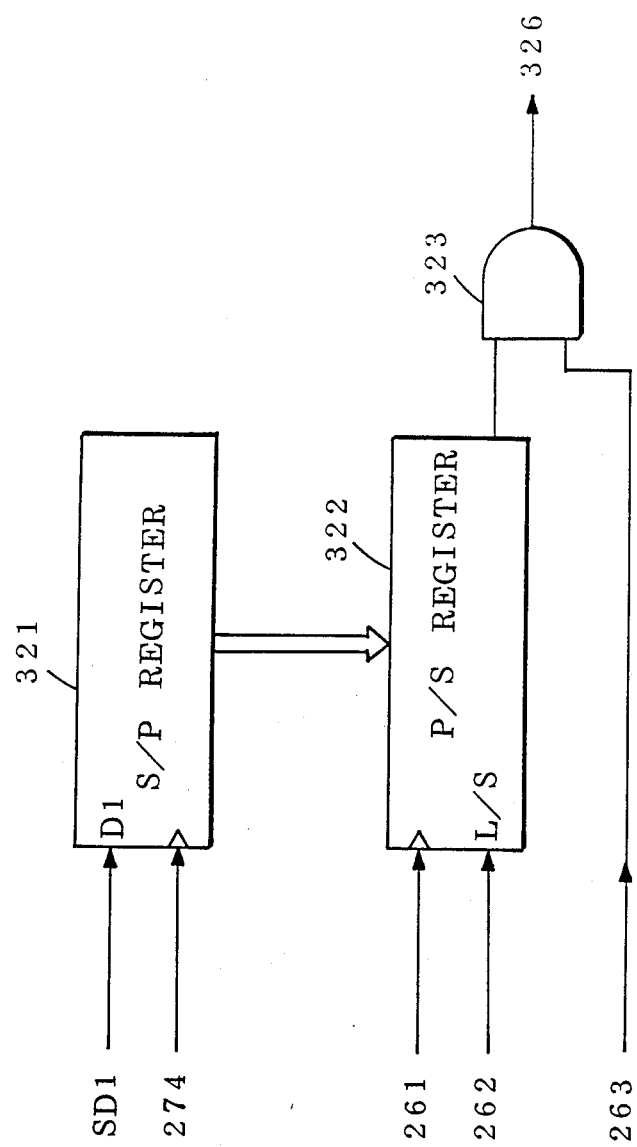
FIG. 24A is a circuit diagram illustrating an embodiment of a SD sending circuit 320 of FIG. 22A.
Figure 24B:
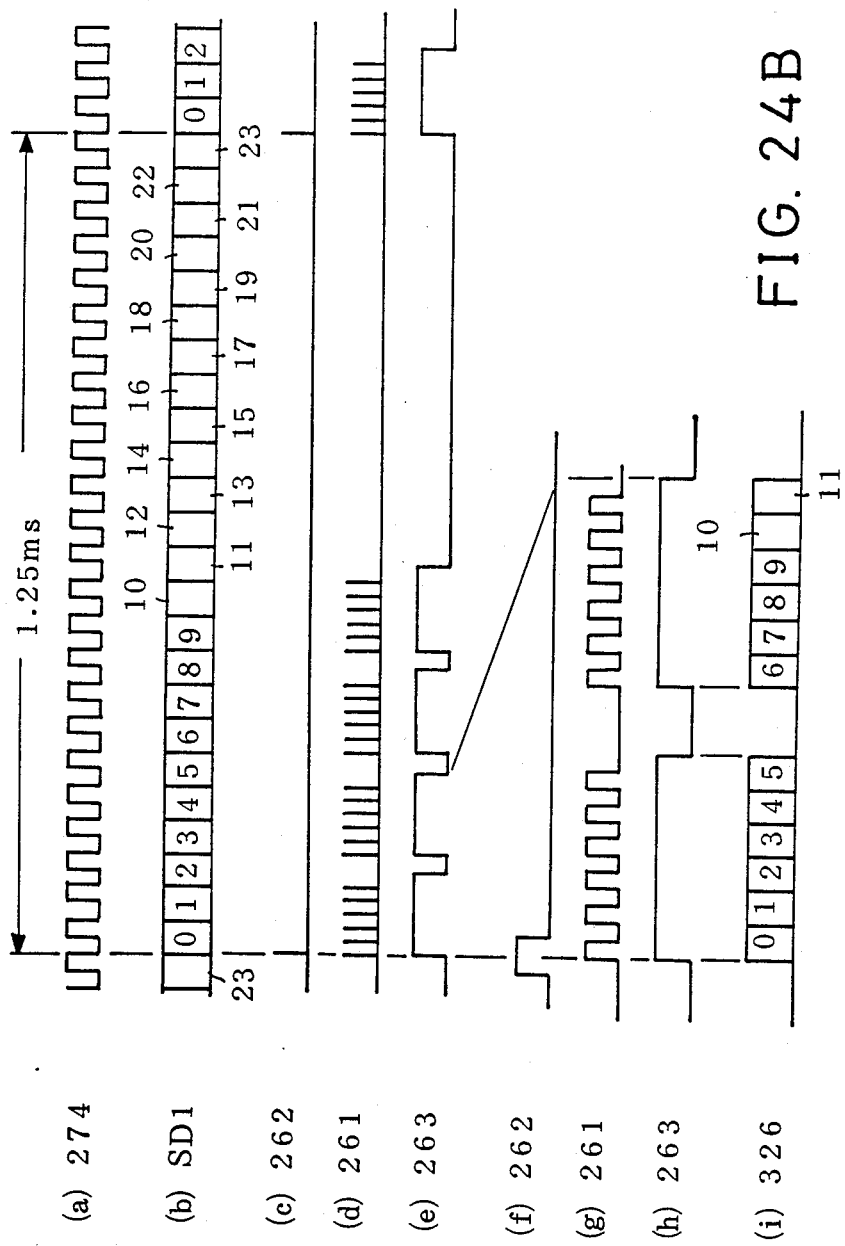
FIG. 24B is a time chart illustrating waveforms at various portions in the circuit diagram of FIG. 24A.

A signal 261 from the flip-flop group 245 consists of six pulses (refer to (d) or (g) of FIG. 24B). Each pulse of the six pulses is respectively delivered when the bus signal 276 of (f) indicates each value of from ten to fifteen and the value of the bus signal 277 shows zero, one, two or three.

A signal 264 which has a pulse width equaling to a period of one cycle of the standard clock 21 of (e) is delivered from the flip-flop group 245 when the bus signal 277 of (h) indicates zero and the bus signal 276 of (f) ten.

In like manner, a signal 265 which has a pulse width equaling to a period of one cycle of the standard pulse 121 of (e), is delivered when the bus signal 277 of (h) indicates one and the bus signal 276 of (f) ten.

In like manner, a signal 267 which has a pulse width equaling to a period of one cycle of the standard pulse 121 of (e) is delivered when the bus signal 277 of (h) indicates three and the bus signal 276 of (f) sixteen.

In like manner, a signal 270 which has a pulse width equaling to a period of one cycle of the standard pulse 121 of (e) is delivered when the bus signal 277 of (h) indicates zero and the bus signal 276 of (f) sixteen.

In like manner, a signal 271 which has a pulse width equaling to a period of one cycle of the standard pulse 121 of (e) is delivered when the bus signal 277 of (h) indicates one and the bus signal 276 of (f) nine.

In like manner, a signal 272 which has a pulse width equaling to a period of one cycle of the standard pulse 121 of (e) is delivered when the bus signal 277 of (h) indicates two and &he bus signal 276 of (f) sixteen.

In like manner, a signal 273 of (n) which has a pulse width equaling to a period of one cycle of the standard pulse 121 of (e) is delivered when the bus signal 277 of (h) indicates zero and the bus signal 276 of (f) seven in which the leading edge of the signal 273 is delayed by a half cycle of the standard clock 121 of (e) from the time when the bus signal 276 indicates seven.

The signal 263 shown in FIG. 14B (k) is delivered when the bus signal 277 of (h) indicates zero one, two or three and the bus signal 276 of (f) indicates from ten to fifteen.

These signals 260, 261, 262, 263, 264, 265, 267, 270, 271, 272 and 273 form a bus signal 269.

The bus signal 276 of (f) is applied to a decoder 246 which sends out the same signal as the signal 262 shown in FIG. 14B (j) to an input terminal of an AND gate 250.

The bus signal 277 is applied to a decoder 247 to be decoded, too. The decoder 247 sends out& a "1" to another input terminal of the AND gate 250 when the bus signal 277 of (h) indicates zero. The AND gate 250 delivers the same signal as the signal 262 of (j) to a rest terminal R of a decimal counter 248 to rest.

On the other hand, the decimal counter 248 of which clock terminal is applied the standard clock 121 of (e) delivers a signal 275 in FIG. 14B (p). The leading edge of the signal 275 rises up synchronously with a leading edge of the standard clock 121 of (e) which is inputted just after the leading edge of the signal 262 of (j). The trailing edge of the signal 275 falls down after counting 5 pulses of the standard clock 121. After that, when 6 pulses of that are counted, the clock ST2 of (p) rises up again. The signal 275, which is the clock ST2, is inverted by an inverter 253 to obtain a clock 274.

Figure 15A:
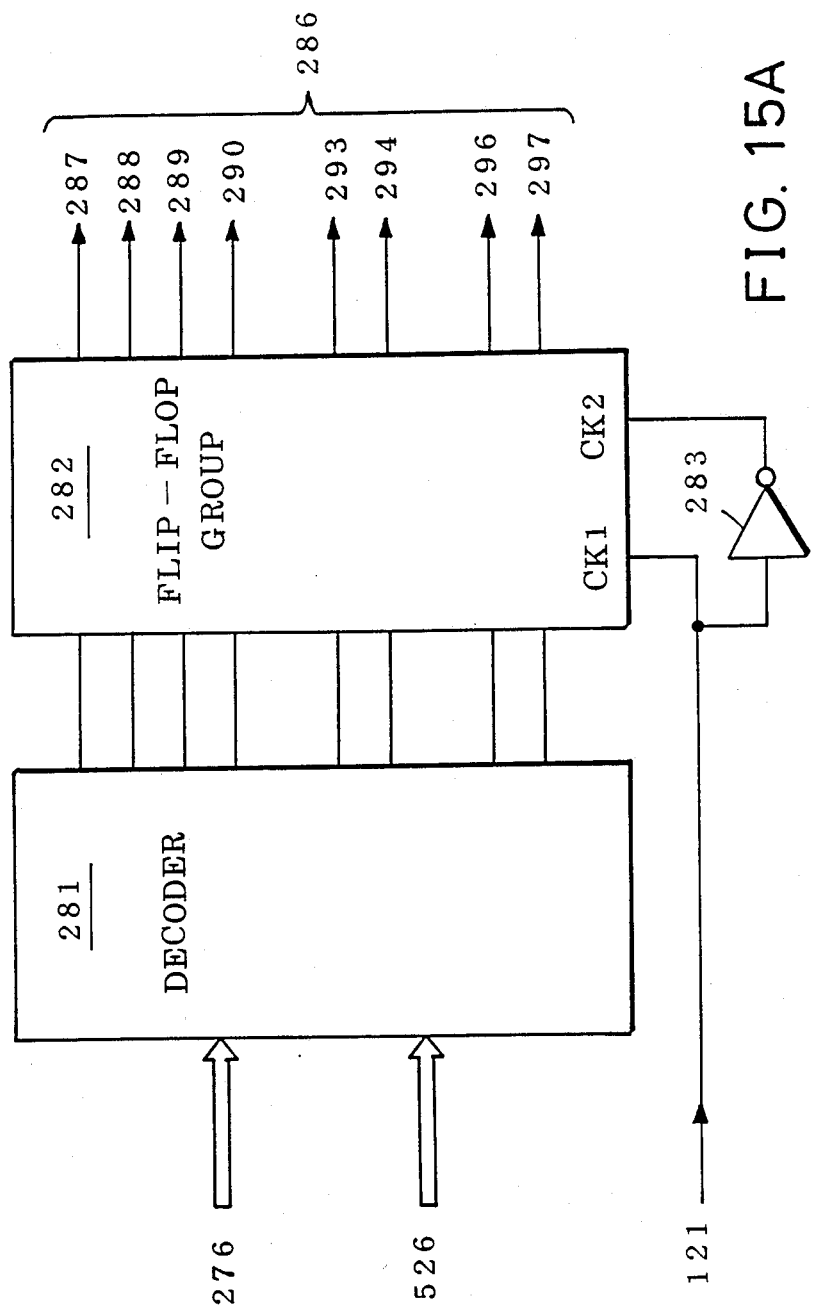
FIG. 15A is a block diagram illustrating an embodiment of a receive timing circuit 280 included in the timing generator 200 of FIG. 12.
Figure 15B:
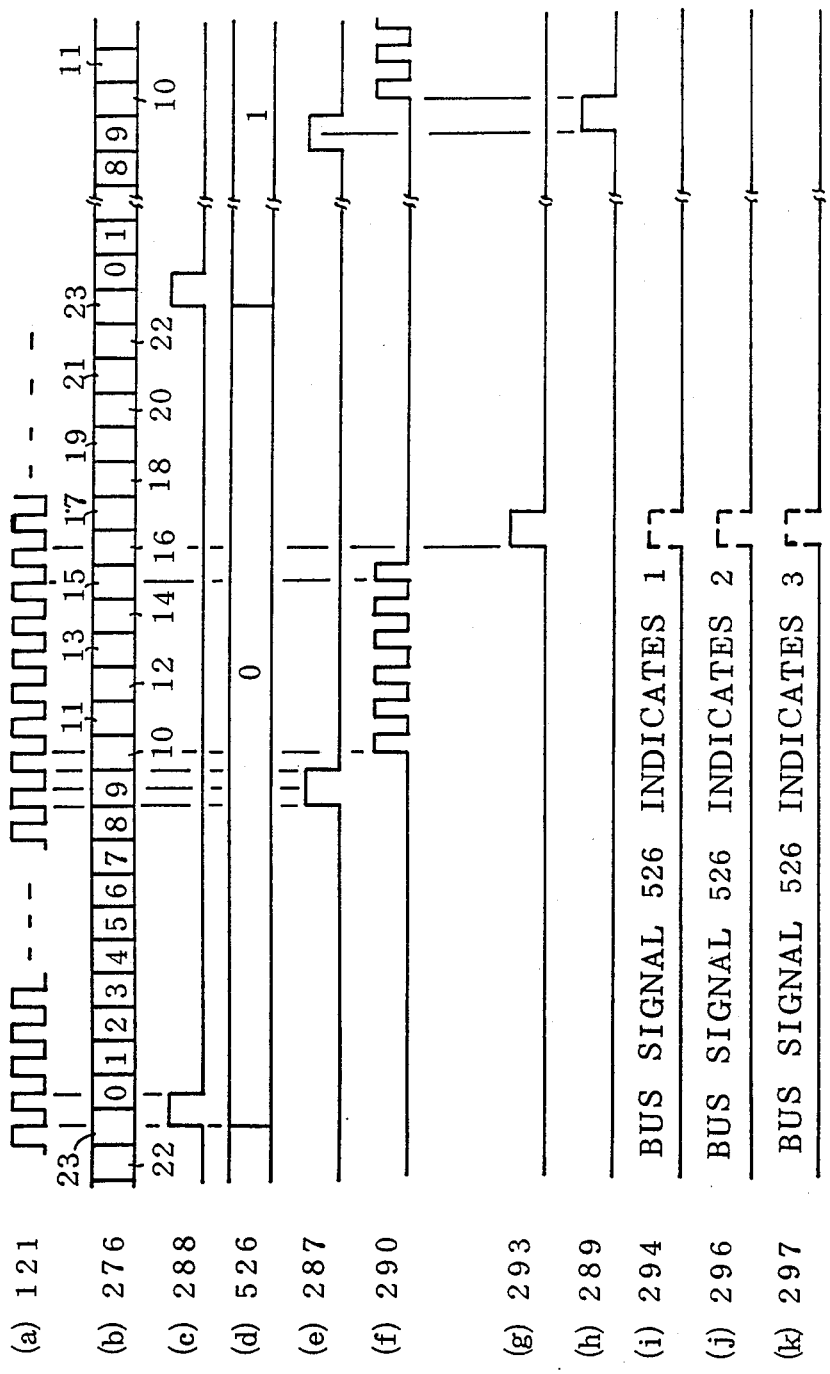
FIG. 15B is a time chart illustrating waveforms at various portions in the block diagram of FIG. 15A.

There are shown in FIGS. 15A and 15B a block diagram and its time chart of an embodiment of the receive timing circuit 280.

In FIG. 15A, a decoder 281 decodes the bus signals 276 and 526 to send out to a flip-flop group 282. The decoder 281, the flip-flop group 282 and inverter 283 correspond to the decoder 244, the flip-flop group 245 and the inverter 252 shown in FIG. 14A respectively.

A signal 288 of FIG. 15B (c) which has a pulse width equaling to a period of one cycle of the standard clock 121 of (a) is delivered at every change of the value of the bus signal 526 of (d). The signal 288 of (c) indicates a "1" for the period of from the later half of three to the first half of zero which are shown by the bus signal 276 of (b).

A signal 287 of (e) which has a pulse width equaling to a period of one cycle of the standard clock 121 of (a) is delivered at every change of the value of the bus signal 526 while the bus signal of 276 (b) indicates nine.

A signal 289 of (h) shows a "1" for the period of from the later half of nine to the first half of ten which are shown by the bus signal 276 of (b) while the bus signal 626 of (d) indicates one.

A signal 293 of (g) shows a "1" for the period of from the later half of sixteen to the first half of seventeen which are shown by the bus signal 276 of (b) while bus signal 526 of (d) indicates zero.

A signal 294 of (i) shows a "1" for the period of from the later half of sixteen to the first half of seventeen which are shown by the bus signal 276 of (b) while the bus signal 526 of (d) indicates one.

A signal 296 of (j) shows a "1" for the period of from the later half of sixteen to the first half of seventeen which are shown by the bus signal 276 of (b) while he bus signal 526 of (d) indicates two.

A signal 297 of (k) shows a "1" for the period of from the later half of sixteen to the first half of seventeen which are shown by the bus signal 276 of (b) while the bus signal 526 of (d) indicates three.

A signal 290 of (f) delivers six pulses for the period of from the later half shown ten to the end shown fifteen by the signal 276 of (b) when the bus signal 526 of (d) indicates zero, one, two or three.

Figure 16:
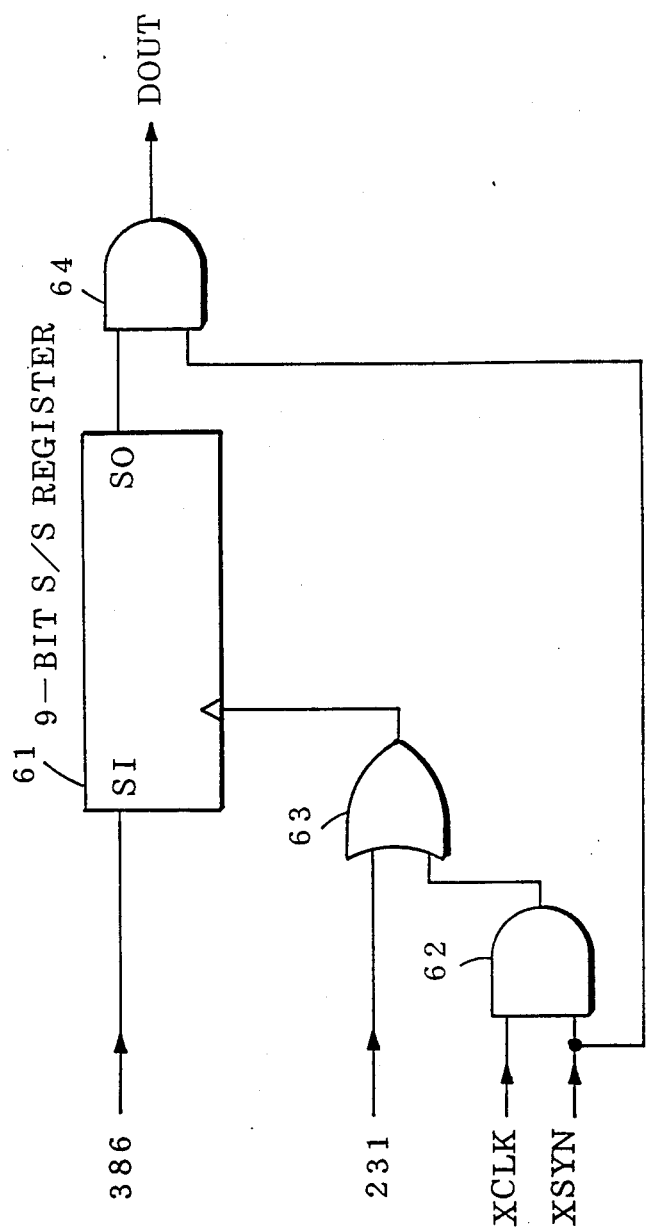
FIG. 16 is a circuit diagram illustrating an embodiment of a sending register 60 of FIG. 9A.

There is shown in FIG. 16 a circuit diagram of an embodiment of the sending register 60 of Which time chart is shown in from (a) to (e) of FIG. 9B.

Numeral 61 indicates a 9-bit serial-in serial-out (S/S) register of which signal input SI is applied the mapped signal 386 in FIG. 9B (a) and of which clock terminal is inputted the signal 231 in FIG. 9B (b) via an OR gate 63 to load the frame zero of the mapped signal 386 of (a) thereinto.

The signal XSYN of (c) and the clock XCLK of (d) is ANDed by a gate 62 to deliver a clock terminal of the register 61 through the OR gate 63. Thus the 9-bit serial-in-serial-out register 61 delivers the frame zero, which has been loaded, from an output terminal SO during the signal XSYN of (c). The output from the output terminal SO and the signal XSYN of (c) are ANDed by an AND gate 64 to be sent out as a data out DOUT of FIG. 9B (b).

In like manner, the frame 1 is loaded into the register 61 to deliver the frame 1 as the out put DOUT.

Figure 17:
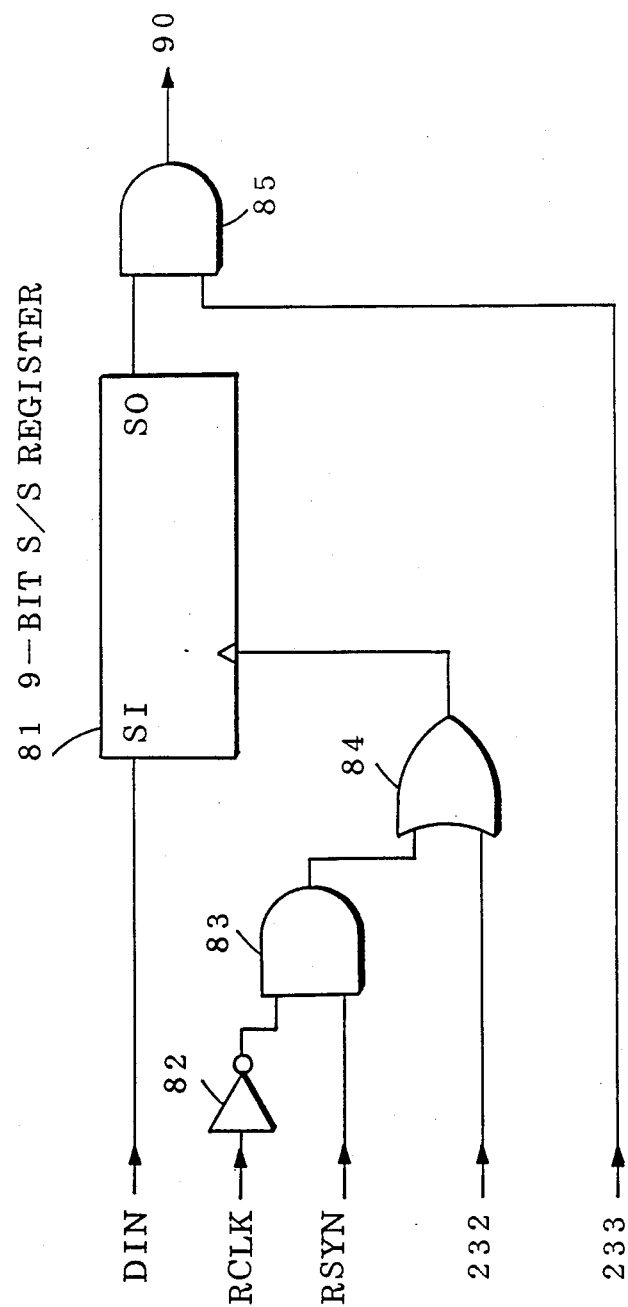
FIG. 17 is a circuit diagram illustrating an embodiment of a receiving register 80 of FIG. 9A.

There is shown in FIG. 17 a circuit diagram of an embodiment the receiving register 80 of which time chart is shown in from (g) to (l) of FIG. 9B. The receiving register 80 has substantially the same circuit diagram as that of the sending register 60 shown in FIG. 16 except an addition of an inverter 82. A data-in signal DIN of FIG. 17 corresponds to mapped signal 386 of FIG. 16. The same relationships applied correspondingly to the following, the clock RCLK to the clock XCLK, the signal RSYN to the signal XSYN, the signal 232 to the signal 231, the signal to be demapped 90 to the data-out DOUT, a 9-bit serial-in-serial-out register 81 to the register 61, an AND gate 83 to ±he AND gate 62, and an OR gate 84 to the OR gate 63. An input terminal of the AND gate 85 is applied the signal 233 in FIG. 9B (1) to send the output SO of the register 81 as the signal to-be-demapped 90 in FIG. 9B (j) to the demapping circuit 400.

Figure 18:
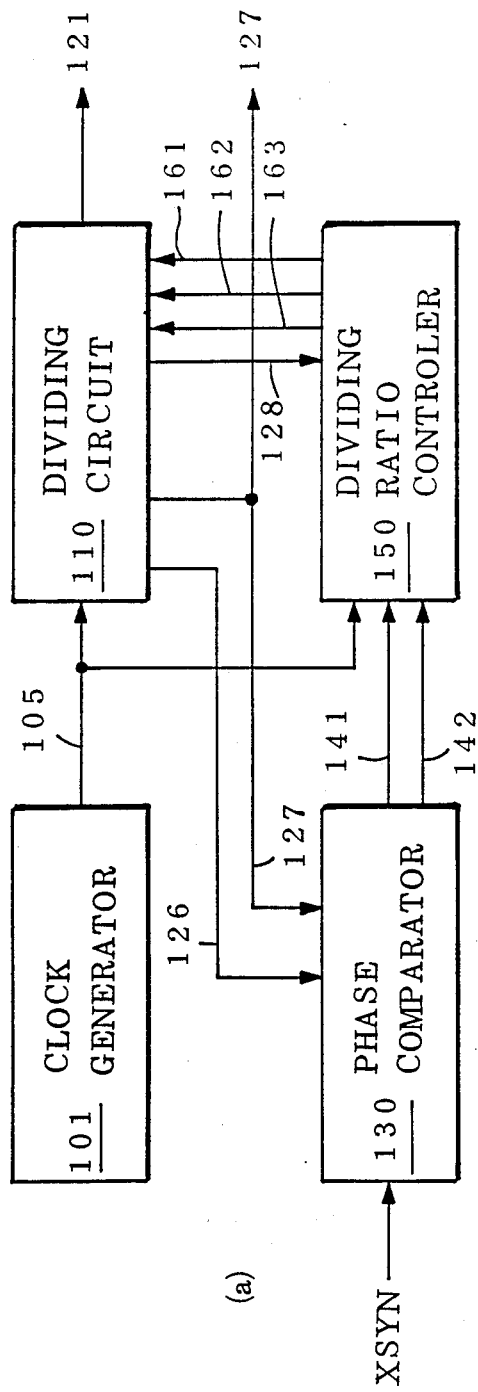
FIG. 18 is a block diagram and a state table illustrating an embodiment of a PLL circuit 100 of FIG. 9A.

There is shown in FIG. 18 a block diagram of an embodiment of the PLL (phase-locked loop) circuit 100. Numeral 101 designates a clock generator to generate a clock 105 of e.g. 3.072 megahertz. Numeral 110 represents dividing circuit divides the clock 105 by a dividing ratio of 15, 16 or 17 under control of signals 161, 162, and 163 shown in the table of FIG. 18 (b).

When signals 163, 162, and 161 show a "0", a "1" and a "1" respectively, a delayed phase which means the frequency of the standard clock 121 being low is detected and so the dividing ratio of fifteen is selected to set the frequency of the standard clock 121 higher.

When signals 163, 162 and 161 show a "1", a "0" and a "0" respectively, a delayed or an advanced phase is not detected and so the dividing ratio of sixteen is selected.

When signals 163, 162, and 161 show a "1", a "0" and a "1" respectively, an advanced phase is detected and so the dividing ratio of seventeen is selected to set the frequency of the standard clock 121 lower. Thus the standard clock 121 of 192 kilohertz is synchronously obtained with the sending synchronization signal XSYN.

The dividing circuit 10 divides the clock 105 of 3.072 megahertz by the dividing ratio of three, four or five as shown in FIG. 18 (b) to obtaining a signal 128 of a repetition rate of 768 kilohertz, too. Further the dividing circuit 110 divides the standard clock 121 by the dividing ratio of twenty-four to obtain a signal 126 of a repetition rate of 8 kilohertz and delivers a clock 127 of the same frequency as that of the signal 128 in different timing.

Numeral 130 shows a phase comparator receiving signals XSYN, 126 and the clock 127 compares the phase of the signal 26 with the same of the signal XSYN. The comparison is executed at every 125 microseconds. When an advanced phase of the signal 126 is detected, a signal 141 is delivered and when a delayed that of 126 is detected, a signal 142 is delivered. Both signals 141 and 142 show "0s" while the comparison is not executed.

Receiving the clock 105, the signal 141 indicating the advanced phase, the signal 142 indicating the delayed phase and the signal 128, a dividing ratio controller 150 makes signals 163, 162 and 161 into a "1", a "0" and a "1" to deliver respectively when the signal 141 shows a "1" indicating the advanced phase, signals 163. 162 and 161 into a "0", a "1" and a "1" respectively when the signal 142 shows a "1" indicating the delayed phase, and signals 163, 162 and 161 into a "1", a "0" and a "0" respectively when both signals 141 and 142 show "0s".

Figure 19A:
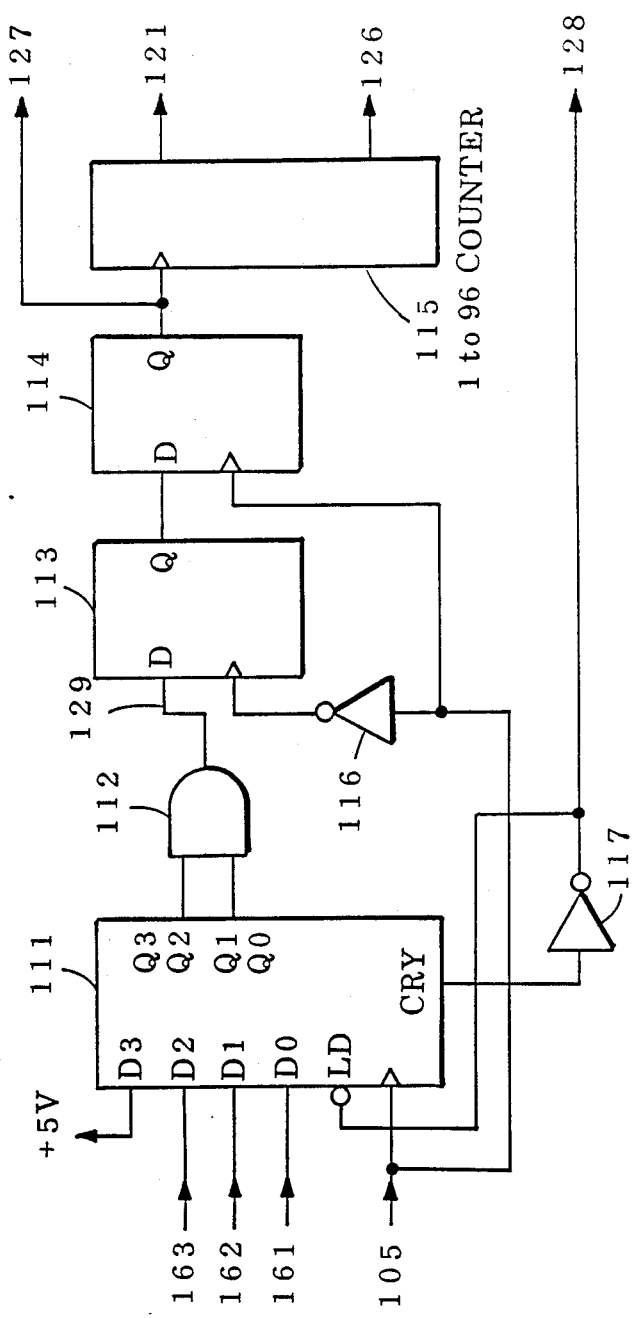
FIG. 19A is a circuit diagram illustrating an embodiment of a dividing circuit 110 included in the PLL circuit 100 of FIG. 18.
Figure 19B:
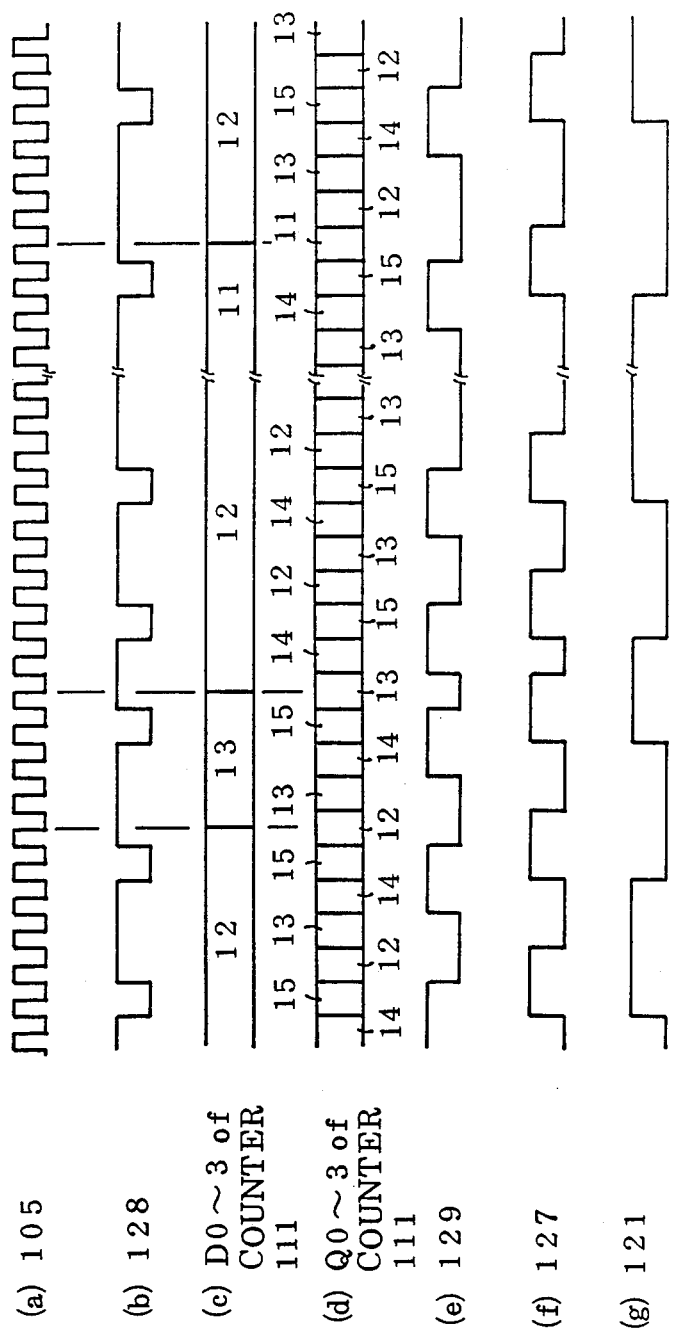
FIG. 19B is a time chart illustrating waveforms at various portions in the circuit diagram of FIG. 19A.

FIGS. 19A and 19B show a circuit diagram and its time chart of an embodiment of &he dividing circuit 110.

Numeral 111 indicates a hexadecimal counter of which clock terminal and load terminal LD are driven by the clock 105 of FIG. 19B (a) and an output of a carry terminal CRY through an inverter 117 respectively.

Further, data terminals D0, D1, D2 and D3 of the counter 111 are applied signals 161, 162, 163 and "1" being +5V and so outputs Q1 and Q2 of the counter 111 are connected to an AND ate 112 to obtain a signal 129 in FIG. 19B (e).

When signals 163, 162 and 161 show a "0", a "1", and a "1" respectively to indicates the delayed phase and a carry CRY is sent out via an inverter 117 as a signal 128 as shown in FIG. 19B (b), the counter 111 applied the signal 128 at a load terminal LD is loaded with a counted number 11 of (c) and so counting up the clock 105 of (a) the output of Q1 of the counter 111 indicates a "1" whenever the counting value indicates 11, 14 or 15. The same of Q2 shows a "1" while the counting values indicate from 12 to 15. The outputs Q1 and Q3 are ANDed by the AND gate 112 to obtain the signal 129 of (e). Therefore the signal 129 designates a "1" when the outputs from Q0 to Q3 shows 14 and 15.

When signals 163, 162 and 161 show "1", "0" and "1" respectively to indicates the advanced phase and a carry CRY is sent out via the inverter 117 as a signal 128 of (b). the counter 111 is loaded with a counted number 13 in FIG. 19B (c) and so counting up the clock 105 of (a). the output Q1 of the counter 111 indicates a "1" while the counting values indicate 14 and 15. The same of Q2 shows a "1" while the counting values designate from 13 to 15. The outputs Q1 and Q3 are ANDed by the AND gate 112 to obtain the signal 129 of (e).

When signals 163, 162 and 161 show "1", "0" and "0" respectively to indicates not delayed phase or not advanced phase and a carry CRY is sent out, the counter 111 is loaded with a counted number 12 in FIG. 19B (c)

and so counting up the clock 105 of (a), the output Q1 of the counter 111 indicates a "1" whenever the counting value indicates 13, 14 or 15. The same of Q2 shows a "1" while the counting value designates from 12 to 15. The outputs Q1 and Q2 are ANDed by the AND gate 112 to obtain the signal 129 of (e).

Numerals 113 and 114 represent D flip-flops. Being applied the signal 129 of (e) to a data terminal D and the clock 105 to a clock terminal through an inverter 116, the D flip flop 113 delivers an output Q to a data terminal D of the D flip-flop 114. The D flip-flop 114 is inputted the clock 105 at its clock terminal to obtain the clock 127 of (f) which is delayed from the signal 129 of (e) by one cycle of the clock 108 in FIG. 19B (a). Receiving the clock 127, a one-to-96 counter 115 divides the same 127 by dividing ratios of one fourth and one ninety-sixth to obtain signals 121 and 126 respectively.

Figure 20A:
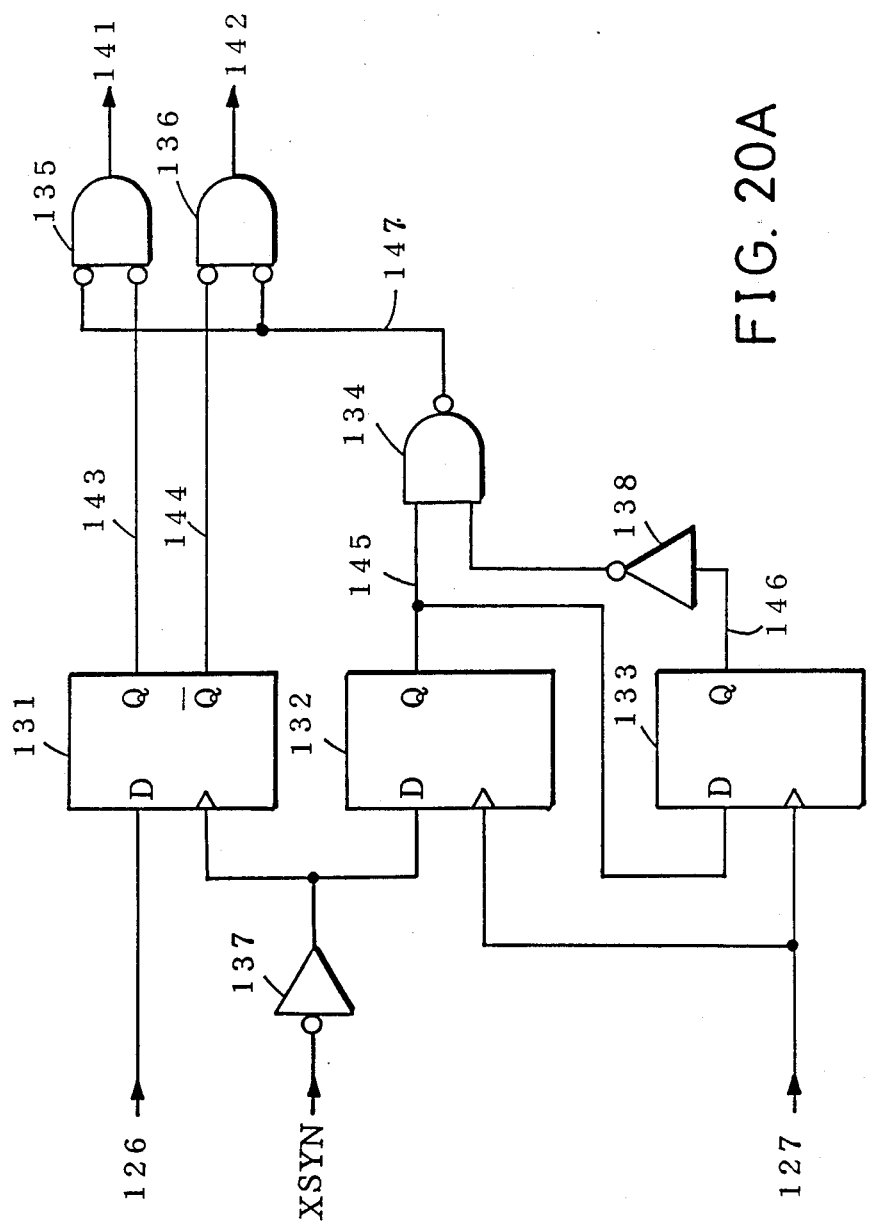
FIG. 20A is a circuit diagram illustrating an embodiment of a phase comparator 130 included in the PLL circuit 100 of FIG. 18.
Figure 20B:
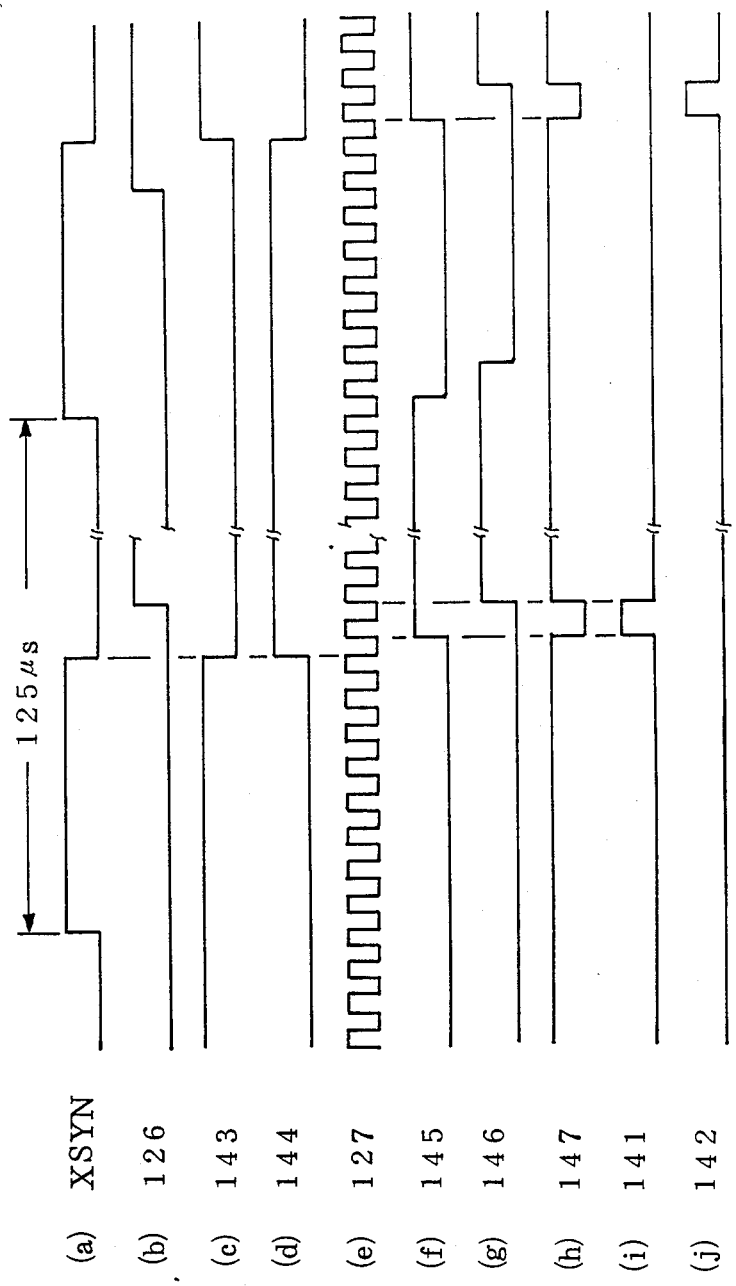
FIG. 20B is a time chart illustrating waveforms at various portions in the circuit diagram of FIG. 20A.

FIGS. 20A and 20B show a circuit diagram and a time chart of an embodiment of the phase comparator 130.

Numerals 131, 132 and 33 refer to D flip-flop. Receiving the signals 126 in FIG. 20B (b) at a data terminal D and the signal XSYN of (a) via an inverter 137 at a clock terminal, the D flip-flop 131 delivers signals 143 of (c) and 144 of (d) from outputs Q and not-Q. When the signal 126 of (b) is delayed from the signal XSYN of (a), the signal 143 indicates a "0" and when advanced, the same 143 indicates a "1".

Receiving the clock 127 of (e) at a clock terminal and the signal XSYN through an inverter 137 at a data terminal D, the D flip-flop 132 delivers a signal 145 of (f) to a NAND gate 134. Receiving the clock 27 of (e) at a clock terminal and the signal 145 of (f) at a data terminal D, the D flip-flop 133 delivers a signal 146 of (g) from the output to the NAND ate 134 through an inverter 138 to obtain a signal 147 of (h) by NANDing.

Signals 143 of (c) and 147 of (h) are provided for a NOR gate 135 to obtain a signal 141 as shown in FIG. 20B (i). Signals 144 of (d) and 147 of (h) are applied to a NOR gate 136 to obtain a signal 142 of (j). Both signals 141 of (i) and 142 of (j) make the only data valid which is obtained from the signal 126 immediately after a trailing edge of the signal XSYN in FIG. 20B (a).

Figure 21A:
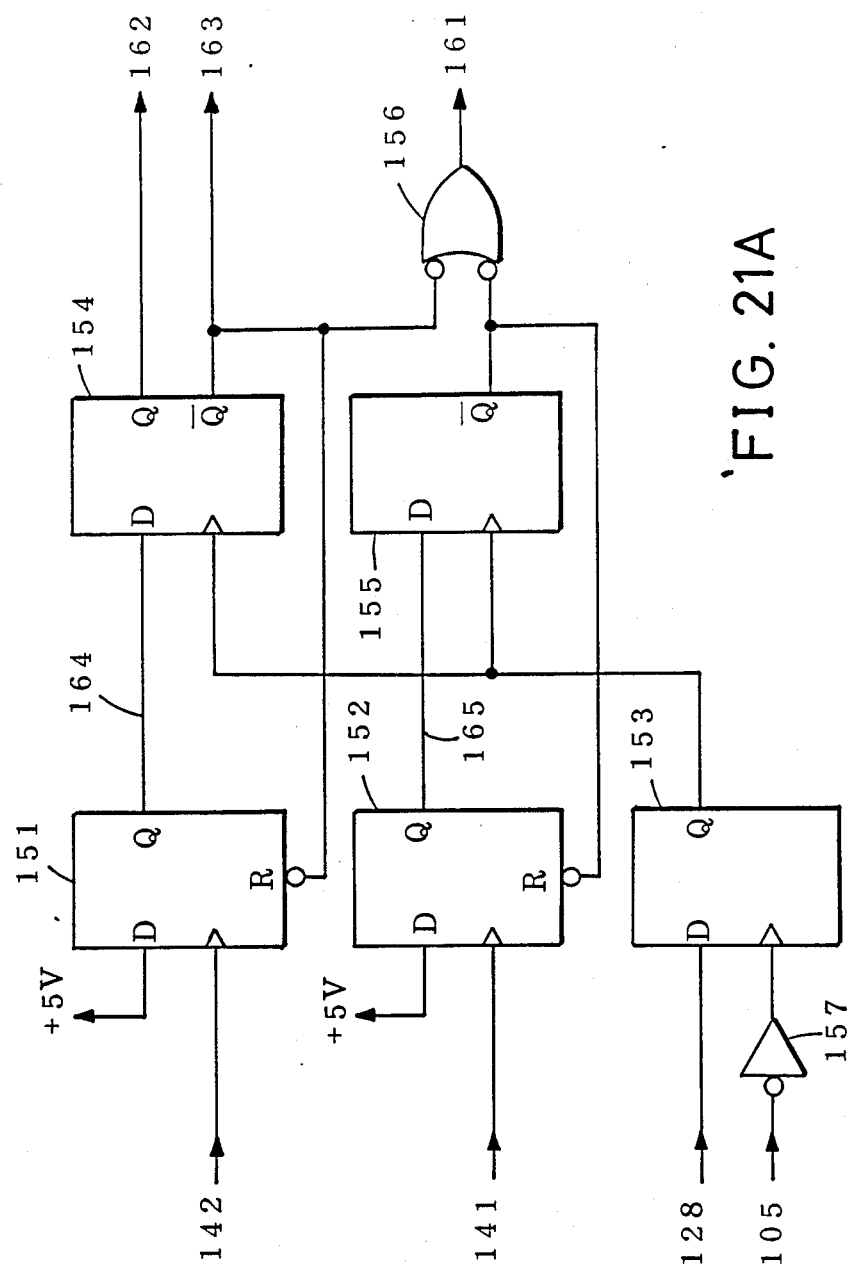
FIG. 21A is a circuit diagram illustrating an embodiment of a dividing ratio controller 150 included in the PLL circuit 100 of FIG. 18.
Figure 21B:
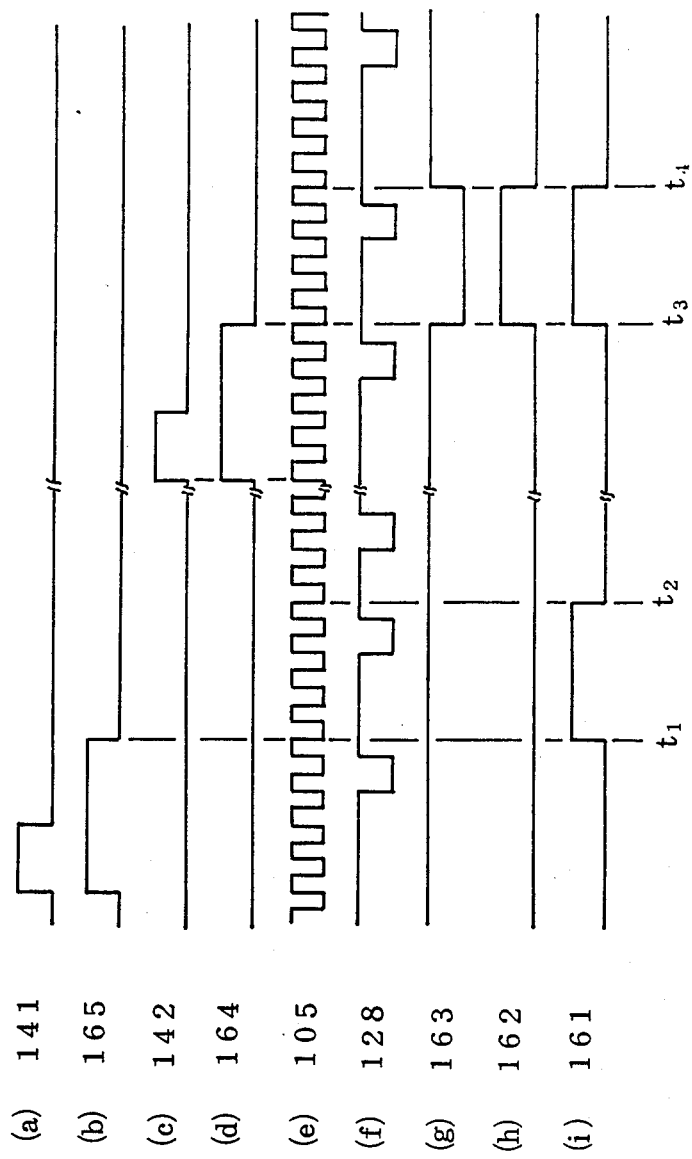
FIG. 21B is a time chart illustrating waveforms at various portions in the circuit diagram of FIG. 21A.

FIG. 21A and 21B show a circuit diagram and a time chart of an embodiment of the dividing ratio controller 150.

Numerals 151 to 155 indicate D flip-flops. When the signal 141 of (a) showing the advanced phase is applied to a clock terminal, the D flip flop 152 of which data terminal D is connected to +5V being "1" delivers a signal 165 FIG. 21A (b). When a signal 128 of (f) is inputted to a data terminal D of the D flip-flop 153 which receives the clock 105 at its clock terminal via an inverter 157, the D flip-flop 153 delivers an output Q to clock terminals of the D flip-flop 154 and 155.

On the other hand, the signal 142 of (c) to indicate the delayed phase is still "0" and so a signal 164 of (d) of an output Q of the D flip-flop 151 is still a "0", too. Receiving an output not-Q of the D flip-flop 155 and a signal 163 of (g), a NAND gate 156 delivers a "1" of a signal 161 of (i) because signals 162 and 163 indicate a "0" and a "1" respectively before the time $t_1$. The signal 161 shows a "0" before the time $t_1$.

After the time $t_1$ of FIG. 21A, the signal 128 of (f) indicates a "0" and the signal 161 of (i) turns from a "1" to a "0" at the time $t_2$ when negative transition of the signal 105 of (e) is applied after a positive transition of the signal 128.

In like manner, the signal 161 of (i) turns from a "0" to a "1", the signal 162 from a "0" to a "1" and the signal 163 of (g) from a "1" to a "0" at the time t₃. As compared this state with the signals in FIG. 18 (b), signals 163 of (g), 162 of (h) and 161 of (i) in FIG. 21B show a "1", a "0" and a "0" respectively before the time t₁ to indicate the state of no control. During a period of between t₁ and t₂, signals 163, 162 and 161 show a "1", a "0" and a "1" respectively to indicate the advance in the phase. During a period of between t₃ and t₄ signals 163, 162 and 161 show a "0", a "1" and a "1" to indicate the delay in the phase. After the time t₄, the state of no control is indicated in FIG. 218.

Figure 22A:
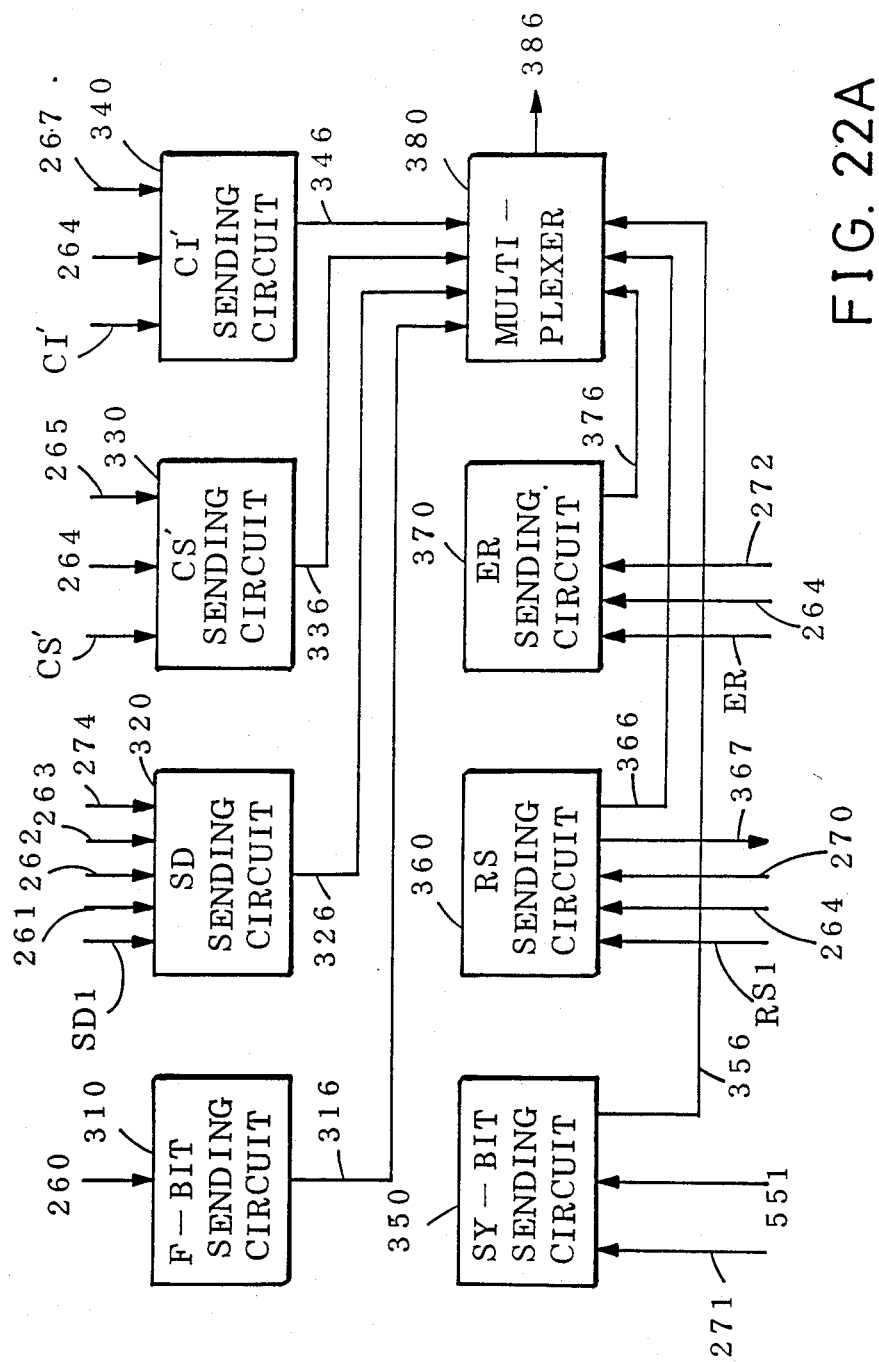
FIG. 22A is a block diagram illustrating an embodiment of a mapping circuit 300 of FIG. 9A.

FIGS. 22A and 22B show a block diagram and a time chart of an embodiment of the mapping circuit 300 which maps the F-bit and SY-bit in the bit NO. 0, various signals CS', CI', RS and ER in the bit NO. 7, and data D0 to D23 in the bit NOs. 1 to 6 to multiplex as shown in FIGS. 1 or 2.

Receiving a signal 260 in FIG. 22B (b), a F-bit sending circuit 310 delivers a "1" of a signal 316 of (c) showing the F-bit. The signal 316 of (c) indicates a "0" when the F bit shows a "0" after 1.25 milliseconds being a frame cycle.

Receiving signals 261 of (e) and 263 of (f) of FIG. 22B, a SD sending circuit 320 samples the sending data SD with a clock 274 to deliver a signal 826 of (g).

A CS' sending circuit samples the clear-to send signal CS' with a signal 264 to deliver a signal 336 at a timing of a signal 265 of (j).

A CI' sending circuit 340 samples the call indicator signal CI' with the signal 264 to deliver a signal 346 at a timing of a signal 267 in FIG. 22B (n). The construction of the CI' sending circuit 340 is the same as that of the CS' sending circuit 330.

Receiving a signal 551, a SY-bit sending circuit 350 delivers a signal 356 at a timing of a signal 271 of (k).

Receiving the request-to-send signal RS1, a RS sending circuit 360 samples the signal RS with the signal 264 to deliver a signal 366 at a timing of a signal 270 of (1). A signal 367 is for sending out always a signal obtained by sampling the signal RS1. The signal 367 is however omitted in the equipment shown in FIG. 9C.

A ER sending circuit 370 samples the equipment ready signal ER with the signal 264 to send out a signal 376 at a timing of a signal 272. The construction of the ER sending circuit 370 is the same as that of the CS' sending circuit 330.

A multiplexer 380 multiplexes signals 316 of (c) and 326 of (g), 336, 346, 356, 366, and 376 by ORing to deliver the mapped signal 386 in FIG. 22B (p).

Figure 22C:
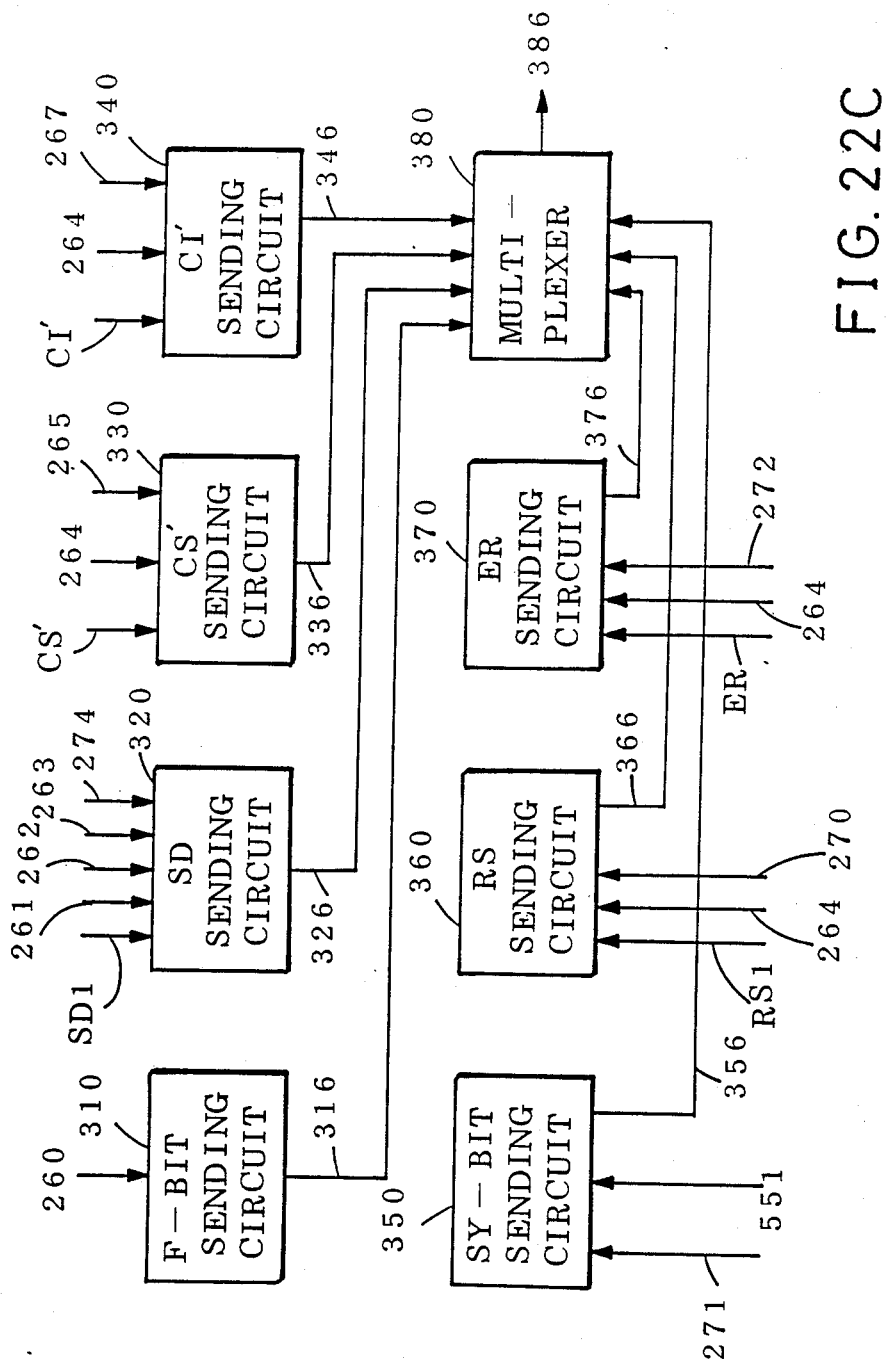
FIG. 22C is a block diagram illustrating an embodiment of a mapping circuit 300 of FIG. 9C.

FIG. 22C shows a block diagram of an embodiment of the mapping circuit 300 of the mapping circuit 300 of DCEs 5A-2, 5B-2, 5C-2, and 5Z-2 for V25 bis of CCITT. There are some difference in FIG. 22C from FIG. 22A. In FIG. 22C, the signal 367 included in the RS sending circuit 360 is not deliver to outer circuits and signals SD and RS are replaced by signals SD1 and RS1. The circuit of FIG. 220 executes the same operation as that of FIG. 22A.

Figure 23A:
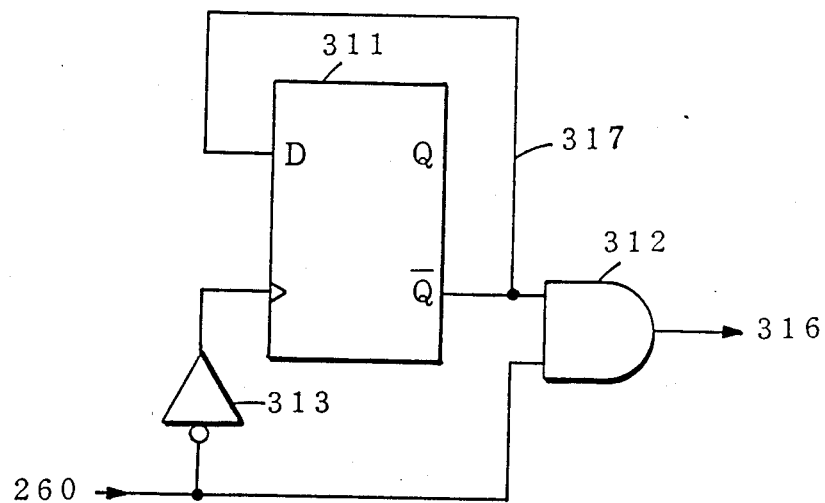
FIG. 23A is a circuit diagram illustrating an embodiment of a F-bit sending circuit 310 of FIG. 22A.
Figure 23B:
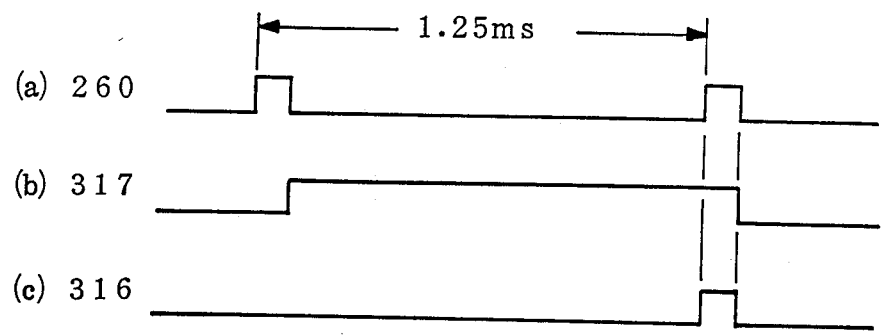
FIG. 23B is a time chart illustrating waveforms at various portions in the circuit diagram of FIG. 23A.

FIGS. 23A and 23B show a circuit diagram and a time chart of an embodiment of the F-bit sending circuit 310.

Numeral 311 represents a D flip-flop of which output not Q being a signal 317 of FIG. 23B (b) is connected to its data terminal D and its clock terminal is provided with a signal 260 of (a) of which cycle time is 1.25 milliseconds through an inverter 313. The signals 316 of (c) and 260 of (a) are ANDed by an AND gate 312 to deliver a signal 316 of (c) at the start of every ten frames.

FIGS. 24A and 24B show a circuit diagram and a time chart of an embodiment of the SD sending circuit 320.

A S/P register 321, which is a 24-bit serial-input-parallel-output shift resister, samples the sending data SD1 with a clock 274 of FIG. 24B (a) &o load and send out in parallel. The clock 274 of (a) has a repetition rate of 19.2 kilobits per second to divide 1.25 milliseconds of a period of 10 frames by 24. The sending data SD1 of (b) shows data of from 0 to 23 which are transmitted from a data terminal equipment.

Receiving the data in parallel from the S/P register 321, a P/S register 322, which is a 24-bit parallel-input-serial-output shift register, loads the data at a timing of a signal 262 of (c) and delivers a signal 326 of (i) at a timing of a signal 261 of (d) during a signal 763 of (e) via an AND gate 323. In FIG. 24B, time axes of (f), (g), and (i) are expanded.

The signal 263 of (h) has a repetition cycle of 125 microseconds. In the cycle the signal 261 of (g) includes four groups to be sent out during 1.25 milliseconds. Each group having a cycle time of 125 microseconds consists of six data of which repetition rate equivalents to 192 kilobits per second.

Figure 25A:
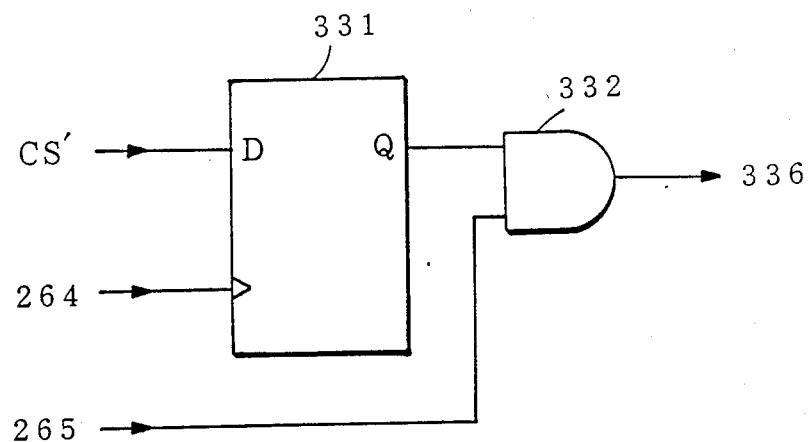
FIG. 25A is a circuit diagram illustrating an embodiment of CS' sending circuit 330 of FIG. 22A.
Figure 25B:
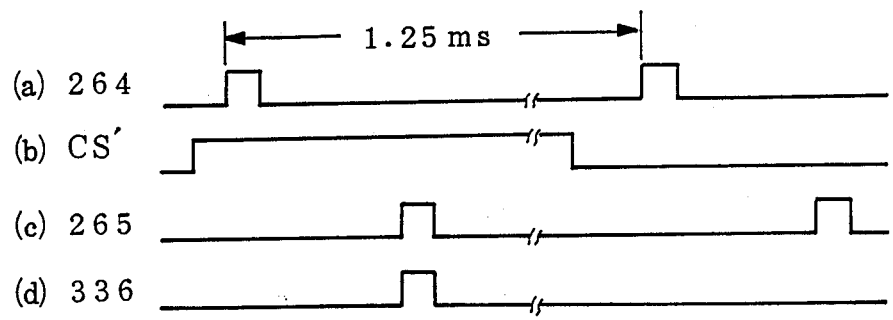
FIG. 25B is a time chart illustrating waveforms at various portions in the circuit diagram of FIG. 25A.

FIGS. 25A and 25B show a circuit diagram and a time chart of an embodiment of the CS' sending circuit 330.

A D flip-flop 331 receives the clear-to-send signal CS' at its data terminal D in FIG. 25B (b) and a signal 264 of (a) of a cycle time of 1.25 milliseconds at its clock terminal to deliver an output Q to an AND gate 332. The AND gate 332 receives the output Q from the D flip-flop 331 and a signal 265 of (c) to deliver a signal 336 of (d). The signal 336 shows a timing to send out the signal CS' to the PCM transmission line.

It is the CS' sending circuit 330 of the same operation as that of the CI' sending circuit 340 or the ER sending circuit 370 in which the signal CS' is replaceable with the call indicator signal CI or the equipment ready signal ER, the signal 265 is replaceable with a signal 267 or 272, and the signal 336 is replaceable with a signal 346 or 376.

Figure 26A:
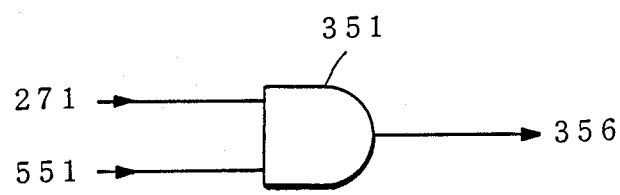
FIG. 26A is a circuit diagram illustrating an embodiment of a SY-bit sending circuit 350 of FIG. 22A.
Figure 26B:
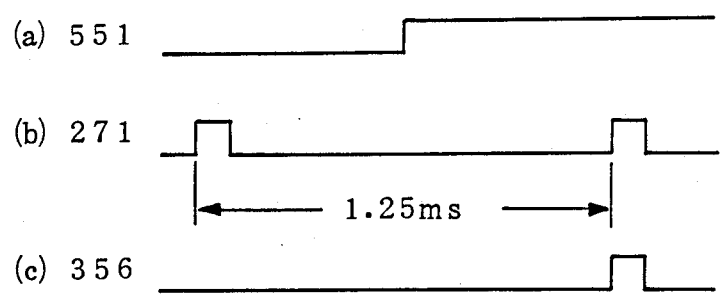
FIG. 26B is a time chart illustrating waveforms at various portions in the circuit diagram of FIG. 26A.

FIGS. 26A and 26B show a circuit diagram and a time chart of an embodiment of the SY-bit sending circuit 350. An AND gate 351 receives signals 551 of FIG. 26A (a) and 271 of (b) having a cycle time of 1.25 milliseconds to obtain ANDing and deliver a signal 356 of (c). The signal indicates the timing to send out the SY-bit to the PCM transmission line.

Figure 27A:
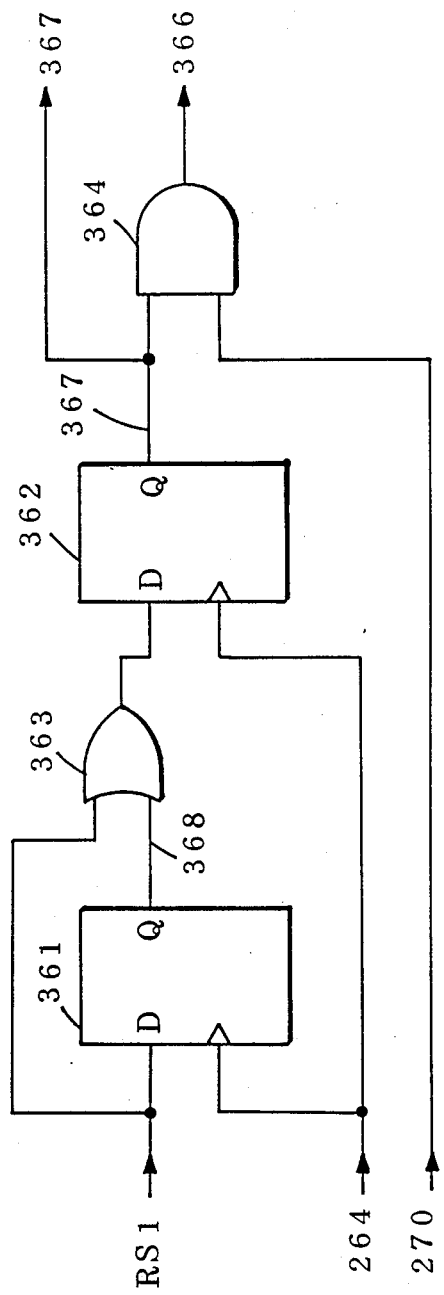
FIG. 27A is a circuit diagram illustrating an embodiment of a RS sending circuit 360 of FIG. 22A.
Figure 27B:
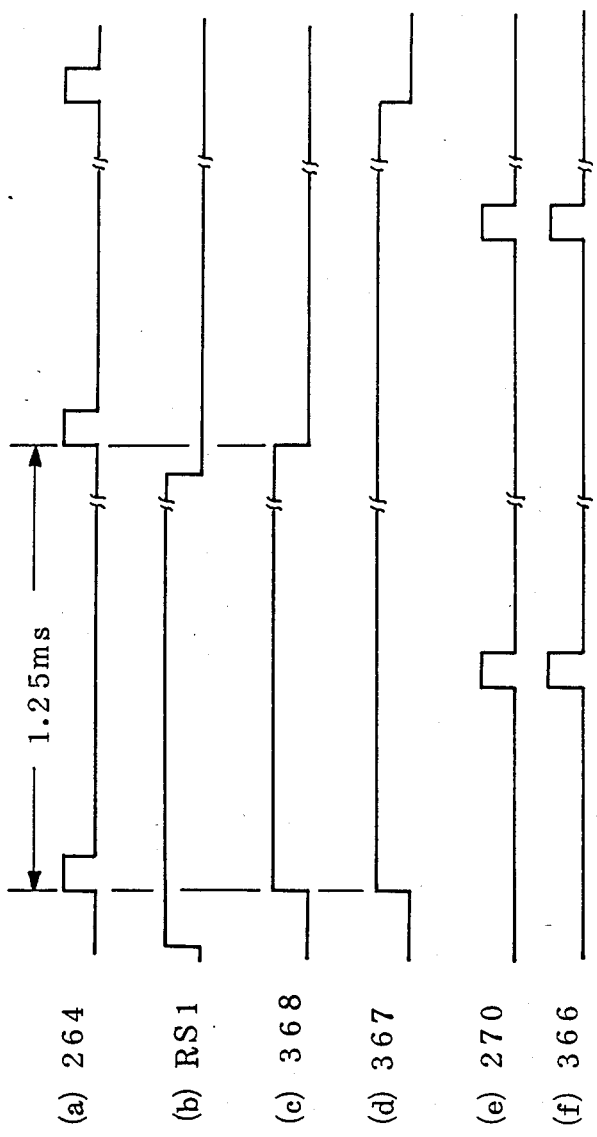
FIG. 27B is a time chart illustrating waveforms at various portions in the circuit diagram of FIG. 27A.

FIGS. 27A and 27B show a circuit diagram and a time chart of an embodiment of the RS sending circuit 360.

Figure 6:
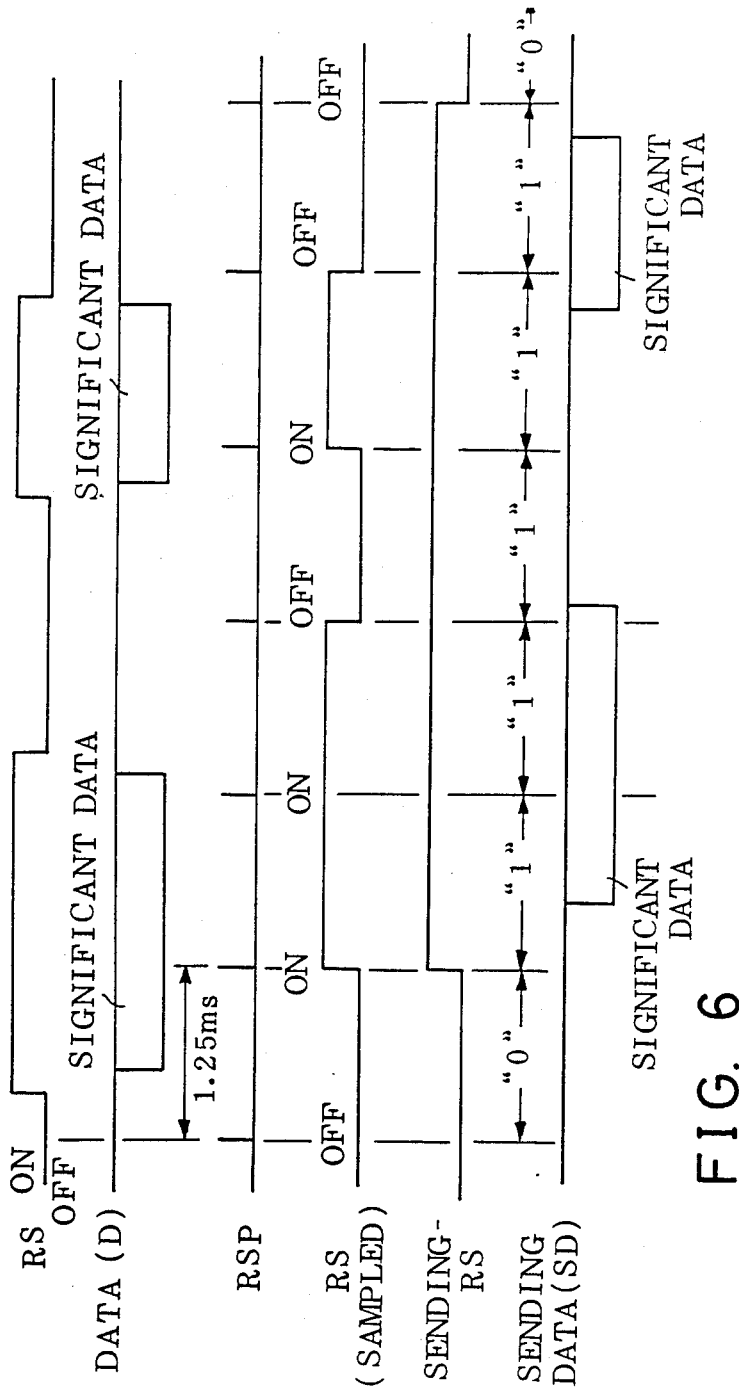
FIG. 6 is a time chart showing an example of transmission of a request-to-send signal RS in the prior art.
Figure 7:
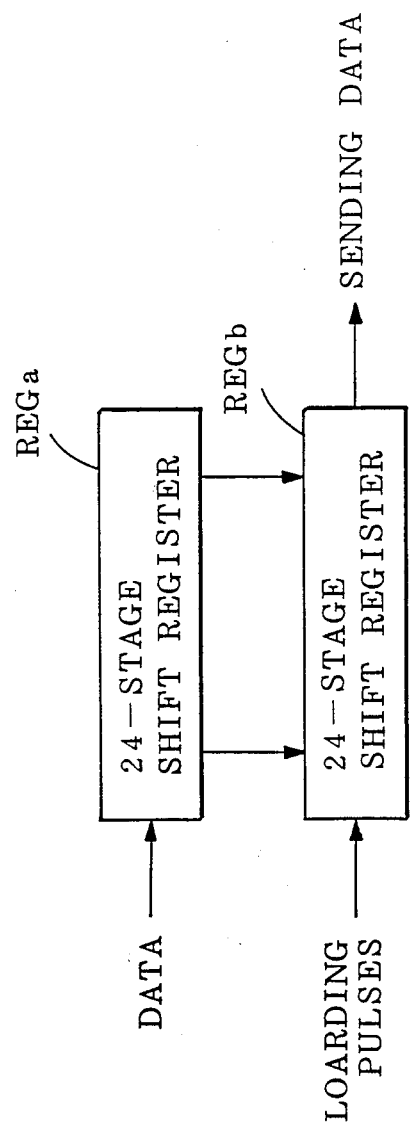
FIG. 7 is a block diagram illustrating an example of a signal delay circuit for use in the prior art.

Receiving the signal RS in FIG. 27B (b) at a data terminal D, and a signal 264 of (a) at a clock terminal a D flip-flop 361 delivers a signal 368 of (c) from its output Q The signal 368 of (c) and the signal RS1 are applied an OR gate 363 to execute ORing. Receiving the output of the OR gate 363 at a data terminal D and the signal 264 of (a) at a clock terminal, a D flip-flop 362 sends out a signal 367 in FIG. 27B (d). The signal 367 is the same signal as the signal RS of FIG. 6.

In the equipment shown in FIG. 9C, the signal 367 is omitted so that the signal 367 is not fed to the demapping circuit 400.

The signal 368 shows the value of the previous signal RS1 which occured 1.25 milliseconds before the present signal RS1. When the previous signal RS1 was a "0" and the present signal RS1 is a "0", the signal 367 of (d) shows a "0". When a "0" and a "1", the signal 367 shows "1". When a "1" and a "0", the signal 367 shows "1". When a "1" and a "0", the signal 367 shows "1". To sum up, the signal 367 shows a "1" whenever the previous signal RS1 showed a "1" or the present signal RS1 shows a "1".

The signals 367 and 270 in FIG. 27B (e) are applied to an AND gate 364 to execute ANDing and deliver a signal 366 of (f). The signal 366 shows a timing to deliver the signal RS1 to the PCM transmission line.

Figure 27C:
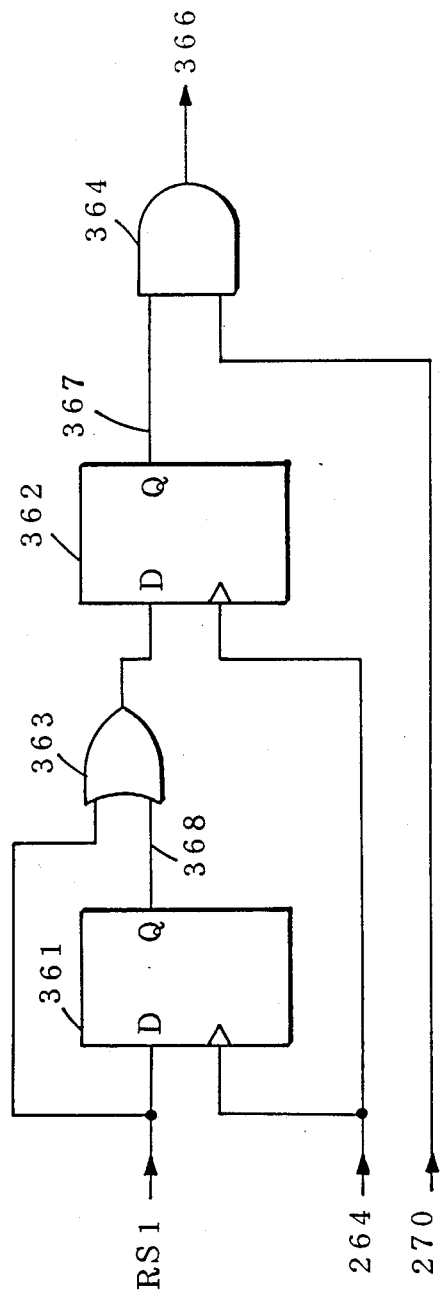
FIG. 27C is a circuit diagram illustrating an embodiment of a RS sending circuit 360 of FIG. 22C.

FIG. 27C shows a circuit diagram of an embodiment of the RS sending circuit 360 of DCEs 5A-2, 5B-2, 5C-2 and 5Z-2, which are shown in FIG. 8D, for V25 bis of CCITT. There are some differences in FIG. 27C from FIG. 27A. In FIG. 27C, the signal 367 included in the RS sending circuit 360 is not deliver to outer circuits and the signal RS is replaced by the signal RS1. The circuit of FIG. 27C executes the same operation as that of FIG. 27A.

Figure 28A:
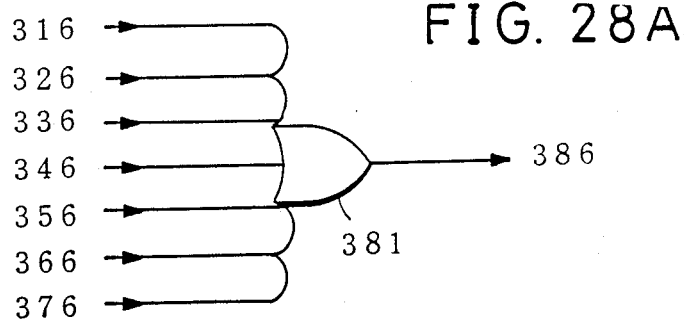
FIG. 28A is a circuit diagram illustrating an embodiment of an multiplexer 380 of FIG. 22A.
Figure 28B:
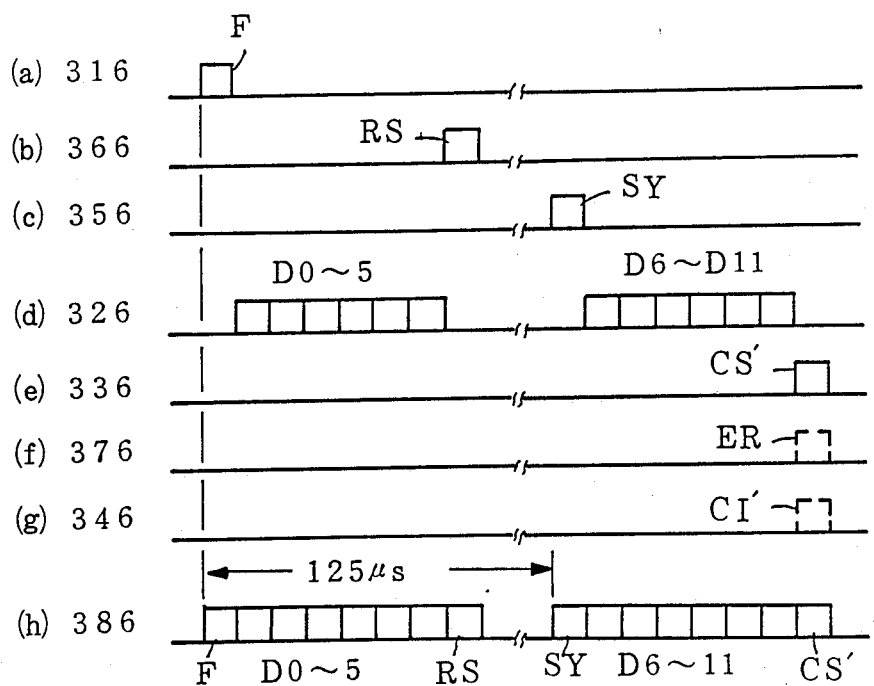
FIG. 28B is a time chart illustrating waveforms at various portions in the circuit diagram of FIG. 28A.

FIGS. 28A and 28B show a circuit diagram and a time chart of an embodiment of the multiplexer 380.

Signals 316 of (a), 326 of (d), 336 of (e), 346 of (g), 356 of (c), 366 of (b) and 376 of (f) of FIG. 28B are applied to an OR gate 381 which sends out the mapped signal 386 of (h). In the mapped signal 386, the first frame of the multiframe consisting of ten frames includes a F-bit at the first bit, data D0 to D5 at the following six bits and the signal RS at the last bit to be transmitted.

The second frame includes a SY-bit at the first bit, data D6 to D11 at the following six bits and the signal CS' at the last bit.

The third frame includes a "0" at the first bit, data D12 to D17 at the following six bits and the signal ER of the signal 376 in FIG. 28B (f).

The fourth frame includes a "0" at the first bit, data D18 to D23 at the following six bits and the signal CI' of the signal 346 in FIG. 28B (g) to be transmitted.

The fifth to the tenth frames include "0s" at all bits Thus the mapped signal 386 as shown in FIG. 1 is obtained.

Figure 29A:
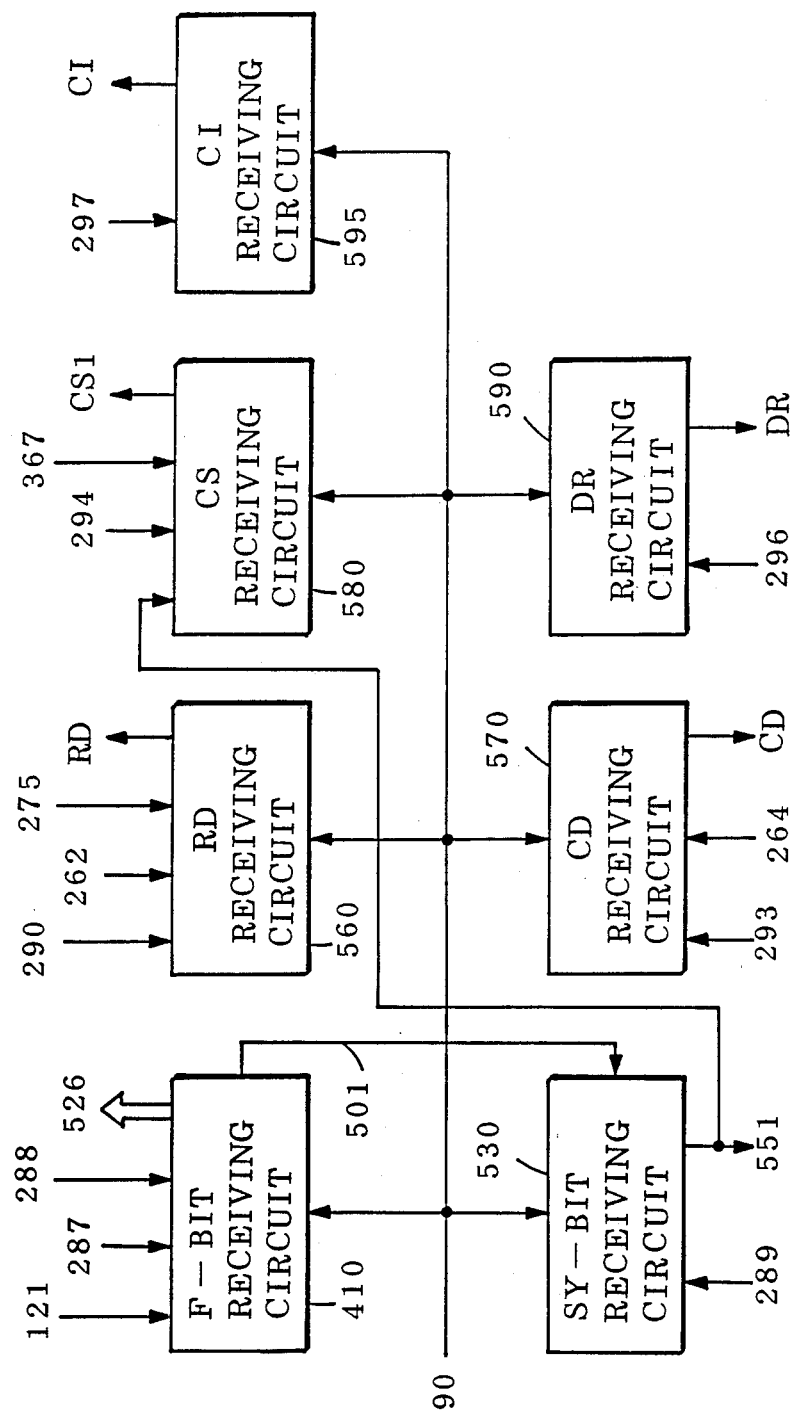
FIG. 29A is a block diagram illustrating an embodiment of a demapping circuit 400 of FIG. 9A.
Figure 29B:
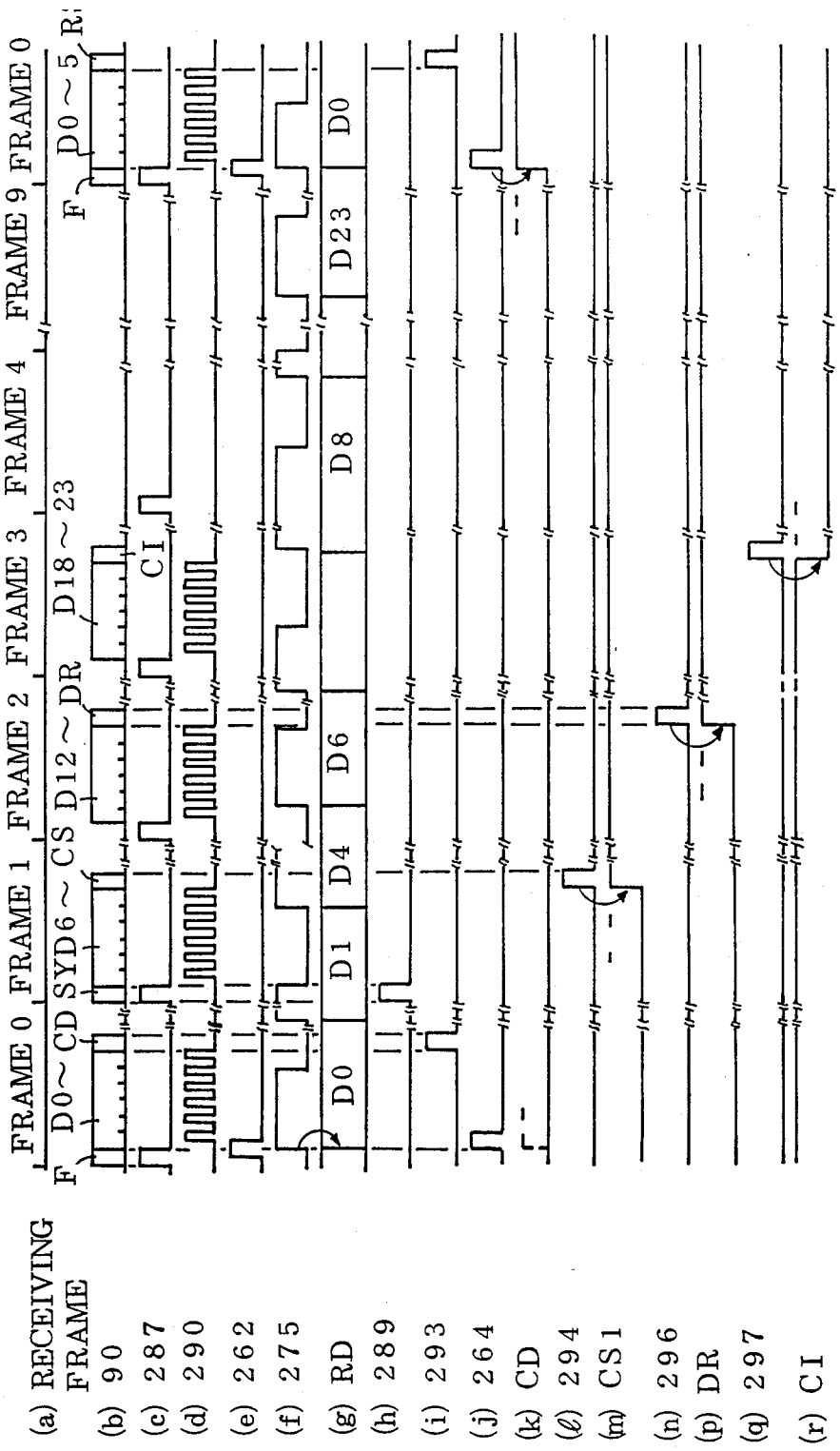
FIG. 29B is a time chart illustrating waveforms at various portions in the block diagram of FIG. 29A.

FIGS. 29A and 29B show a block diagram and a time chart of an embodiment of the demapping circuit 400.

When a F-bit receiving circuit 410 detects a F-bit in the signal to-be-demapped 90 in FIG. 29B (b), the circuit 400 delivers a bus signal 526 and a signal 501. The bus signal 526 indicates a frame number of which frame includes the detected F-bit. The signal 501 shows a synchronous state. The standard clock 121 and signals 287, 288 included in the bus signal 286 are used in order to detect the F-bit. The signal 287 is applied at the timing of the first bit of every frame as shown in FIG. 29B (c). The signal 288 is inputted at every frame in order to indicate the timing to deliver the bus signal 526.

A RD receiving circuit 560 samples the signal to-be-demapped 90 with a signal 290 of FIG. 29B (d) and delivers the sampled receiving data RD of (g) at the timing of a signal 262 of (e) during a signal 275 of (f) to a data & terminal equipment. The receiving data RD of (g) has a repetition rate of e.g. 19.21 kilobits per second to be propriate for operation of a data terminal equipment.

A CS receiving circuit 580 samples the signal to-be-demapped 90 with a signal 294 in FIG. 29B (1) to obtain the signal CS1 of (m). The signal CS1 is transmitted when both signals 367 and 551 are "1s". In the equipment shown in FIG. 9C, the signal CS1 is transmitted when the signal 551 is "1", because the signal 367 is omitted.

A GI receiving circuit 595 samples the signal to-be-demapped 90 with a signal 297 in FIG. 29B (q) to obtain the signal CI of (r).

A SY-bit receiving circuit 530 samples the signal to-be-demapped 90 with a signal 289 of (h) to deliver the sampled result as a signal 551 when the signal 501 is "1".

A CD receiving circuit 570 samples the signal to-be-demapped 90 with a signal 293 of (i) to deliver the sampled result as a signal the signal CD at the timing of a signal 264 of (j).

A DR receiving circuit 590 has the same construction as that of the CI receiving circuit 595 in which a signal 297 is replaceable with a signal 296 of (n) and the signal CI with the signal DR of (p).

Figure 29C:
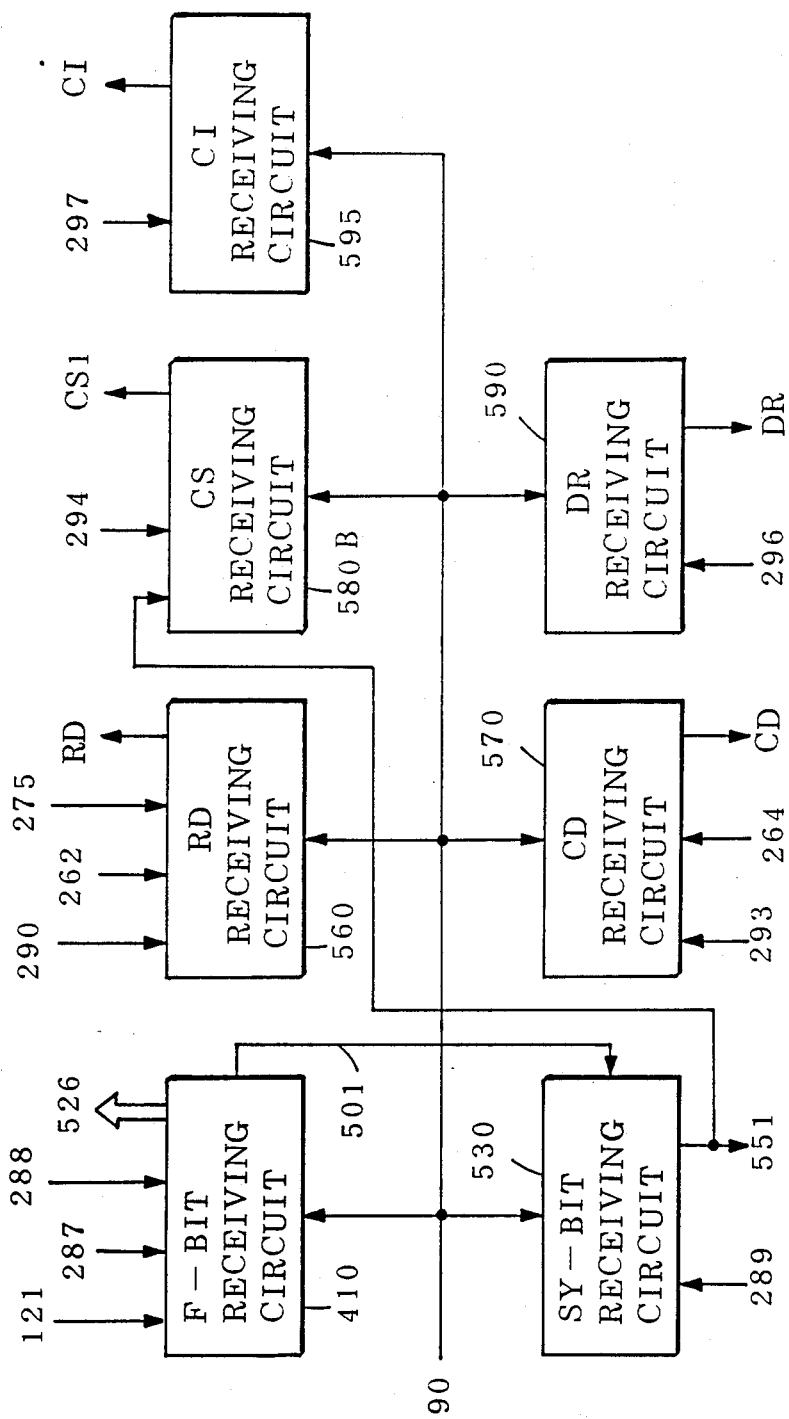
FIG. 29C is a block diagram illustrating an embodiment of a demapping circuit 400B of FIG. 9C.

FIG. 29C shows a block diagram of an embodiment of the demapping circuit 400B of DCEs 5A-2, 5B-2,5C-2 and 5Z-2 for V25 bis of CCITT. There are some differences in FIG. 29C from FIG. 29A. In FIG. 29C, the CS receiving circuit 580B does not need the signal 367 based on the signal RS1 and the signal CS is replaced by the signal CS1. The circuit of FIG. 29C execute the same operation as that of FIG. 29A. It is the reason not to require the signal RS1 that the DCE for V25 vis has to be able to receive the signal CS from the address receiving circuit 7 in spite of the state of the signal RS.

Figure 30A:
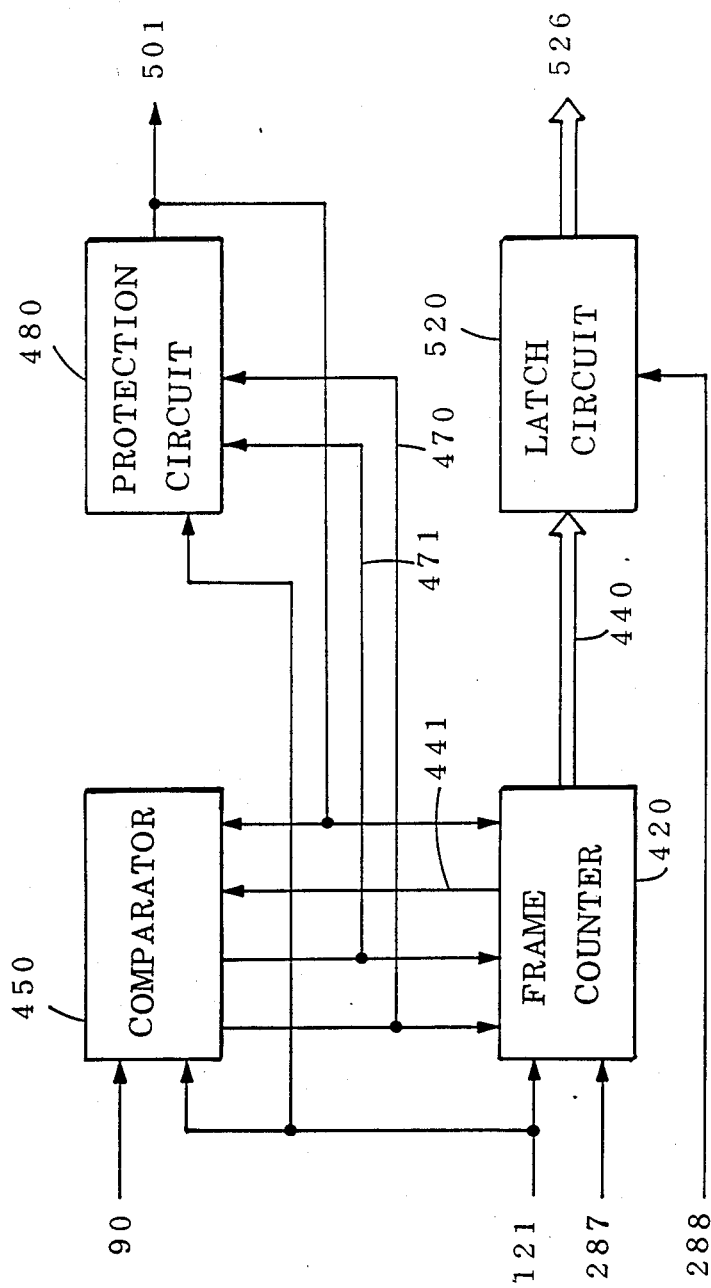
FIG. 30A is a block diagram illustrating a F-bit receiving circuit 410 of FIG. 29A.
Figure 30B:
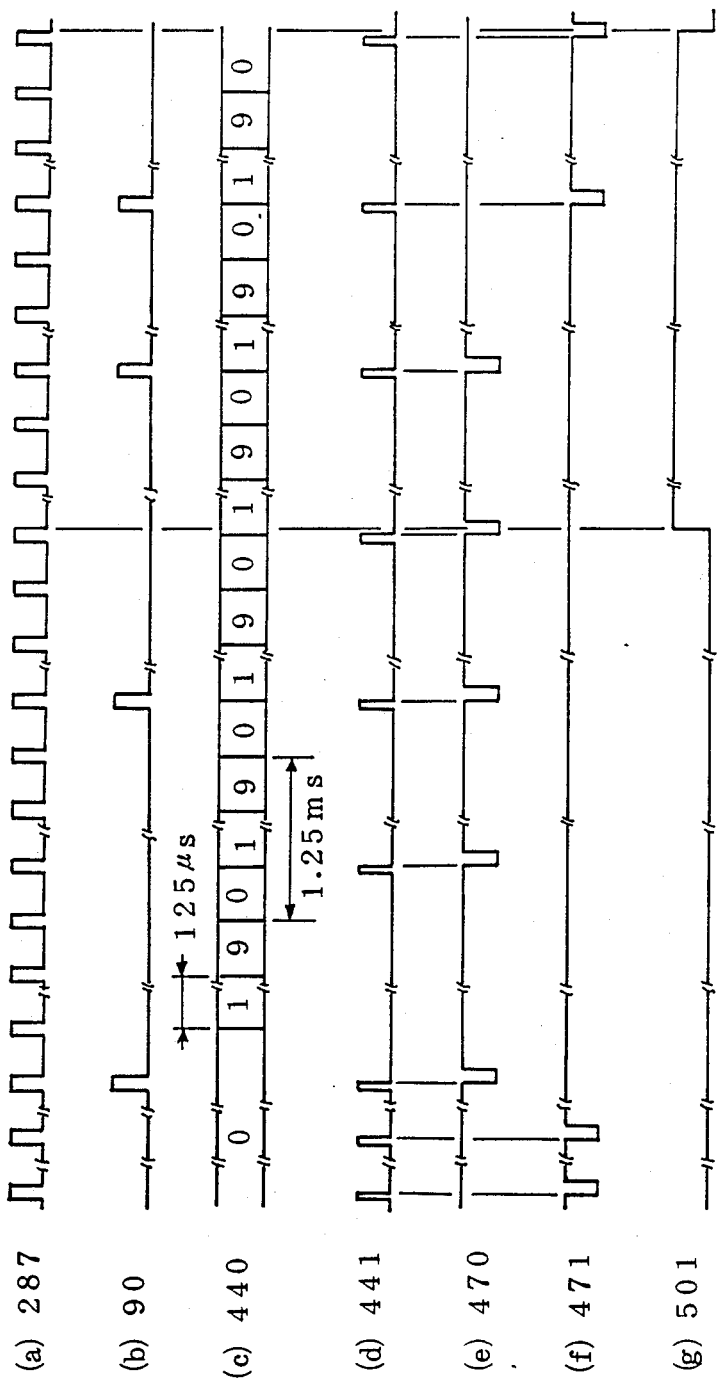
FIG. 30B is a time chart illustrating waveforms at various portions in the block diagram of FIG. 30A.

FIGS. 30A and 30B show a block diagram and a time chart of an embodiment of the F-bit receiving circuit 410. In FIG. 30B (b), the signal to-be-demapped 90 indicates only the F-bit, and all the other data and control signals are "0s" in order to describe simply.

Receiving the standard clock 121 and a signal 287 in FIG. 30B (a), a frame counter 420 sends out a bus signal 440 of (c) which indicates frame numbers 0 to 9. A signal 441 of (d) is delivered at the timing of the signal 287 of (a) during frame number 0.

Receiving a signal 471 of (f), the frame counter 420 can not count up to deliver the bus signal 440 of (c) while a signal 501 of (g) is a "0". Receiving a signal 470 of (e), the frame counter 420 can count up from 0 to 9 on every receipt of a signal 287 of (a) and is reset to 0 again. The count up operation can not be executed when the signal 471 of (a) is applied and can executed when the signal 470 of (e) is applied. In spite of receipt or no receipt of signals 470 of (e) and 471 of (f), the frame counter 420 can count up to make contents of the bus signal 440 change 0 to 9, reset to 0 and 0 to 9 again continuously while the signal 501 of (g) is a "1".

A comparator 450 compares the signal to-be-demapped 90 of (b) showing only F-bits with a state of flip-flops included therein at the timing of a signal 441 of (d) to detect F-bits by obtaining the coincidence of the signal 90 and the state. When the coincidence is obtained, the comparator 450 delivers a signal 470 of (e) and inverts the state of internal flip-flops. When no F-bit is detected and so the non-coincidence is obtained, the comparator 450 delivers a signal 471 of (f) and does not invert the state of flip-flops included therein.

In spite of the coincidence or non-coincidence, the state of flip-flops is inverted at every receipt of a signal 441 of (d) while the signal 501 of (g) is a "1".

Receiving the standard clock 121, a protection circuit 480 detects the asynchronous state to make the signal 501 of (g) into a "0" when the signal 471 of (f) meaning the non-coincidence is applied to the circuit 480 two times continuously and the synchronous state to make the signal 501 into a "1" when the signal 470 of (e) meaning the coincidence is applied four times continuously. In this manner, the synchronous state can be protected from noise because the signal 501 signifying the synchronous state can not be changed by noise.

Receiving the bus signal 440, a latch circuit 520 latches contents (frame Nos.) of the bus signal 440 showing flame numbers at the timing of the signal 288 thereinto to deliver the latched contents as a bus signal 526.

Figure 31A:
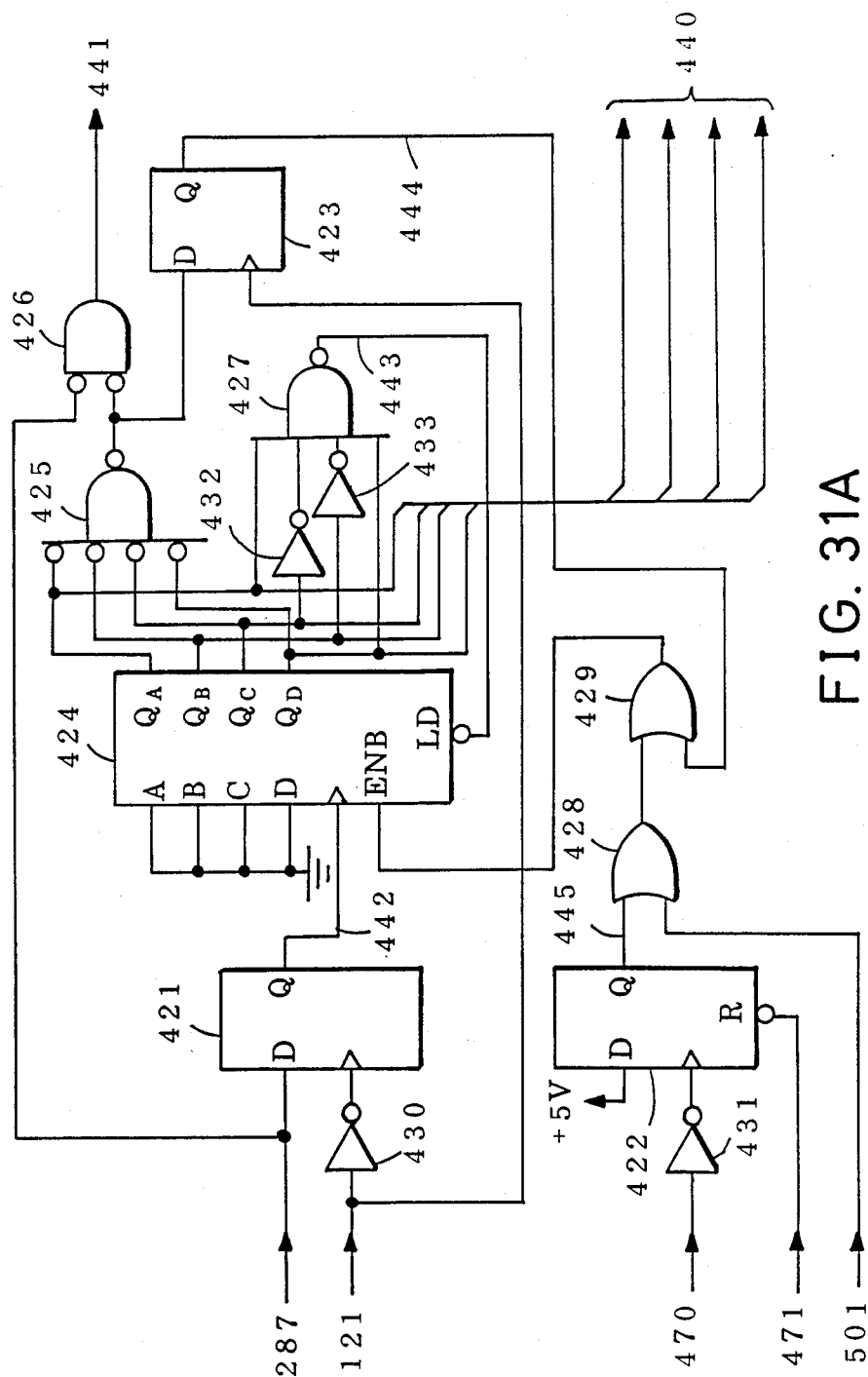
FIG. 31A is a circuit diagram illustrating an embodiment of frame counter 420 of FIG. 30A.
Figure 31B:
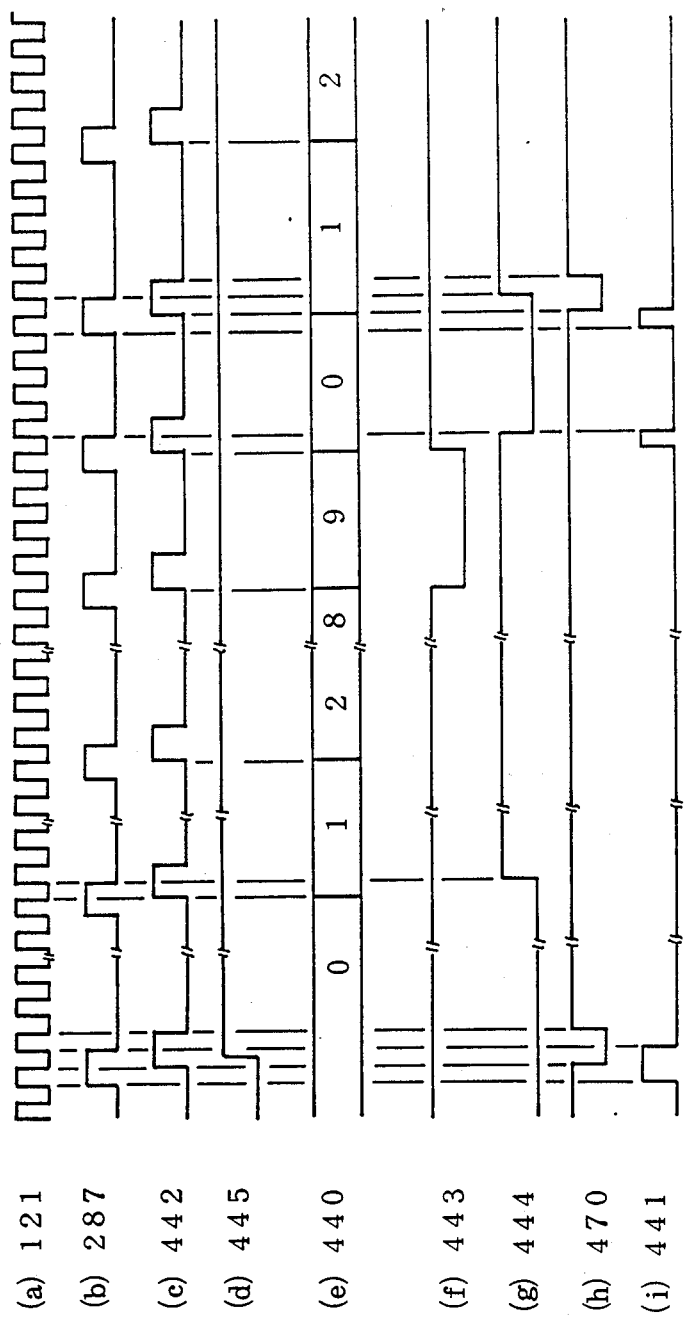
FIG. 31B is a time chart illustrating waveforms at various portions in the circuit diagram of FIG. 31A.

FIGS. 31A and 31B show a circuit diagram and a time chart of an embodiment of the frame counter 420.

A D flip-flop 421 receives the standard clock 121 in FIG. 31B (a) at its clock terminal through an inverter 430 and a signal 287 of (b) at its data terminal D to obtain a signal 442 of (c) at its output Q.

A D flip-flop 422 receives the signal 470 of (h) indicating the coincidence through an inverter 431 at its clock terminal +5V being "1" at its data terminal D, and the signal 471 indicating the non-coincidence at its reset terminal R. When applied the signal 470 of (h), the signal 445 of (d) at the output Q of the D flip-flop 422 turns to a "1" of which state is continued till the input of the signal 471. Signals 445 of (d), 501 and 444 of (g) are ORed by two OR gates 428 and 429 which delivers an output to an enable terminal of a decimal counter 424. The counter 424 counts up every input of a signal 442 in FIG. 31B (c) while the enable terminal is "1".

A signal 441 of (i) is obtained from outputs $Q_A$, $Q_B$, $Q_C$ and $Q_D$ of the counter 424 through an OR gate 425 and a NOR gate 426. The signal 441 indicates a "1" meaning a F-bit detected when the bus signal 440 shows frame number 0 and the signal 287 of (b) representing the lead of a frame is applied.

A D flip-flop 423 receives the standard clock 121 in FIG. 31B (a) at its clock terminal, and the output of the OR gate 425 at its data terminal D to deliver a "1" of a signal 444 of (g) while the bus signal 440 of (e) indicates 1 to 9.

The enable terminal ENB of the counter 424 applied the output of the OR gate 429 goes to a "1" whenever the signal 444 of (g) is a "1", namely the signal 501 is a "1" representing the establishment of the frame synchronization, the signal 470 of (h) is a "1" representing the coincidence or the bus signal 440 of (e) delivered from the counter 424 indicates 1 to 9.

In this manner, when the enable terminal ENB shows a "1", the counter 424 counts up to 9 which is contents of the bus signals 440 of (e). Then a NAND gate 427 receives outputs $Q_A$, $Q_D$ of the counter 424 and outputs $Q_B$, $Q_C$ of the counter 424 through inverters 432 and 433 to turn a signal 443 of (f) from a "1" to a "0" which is fed to a load terminal LD of the counter 424. After loaded with the "0", the counter 424 starts to count up again.

Figure 32A:
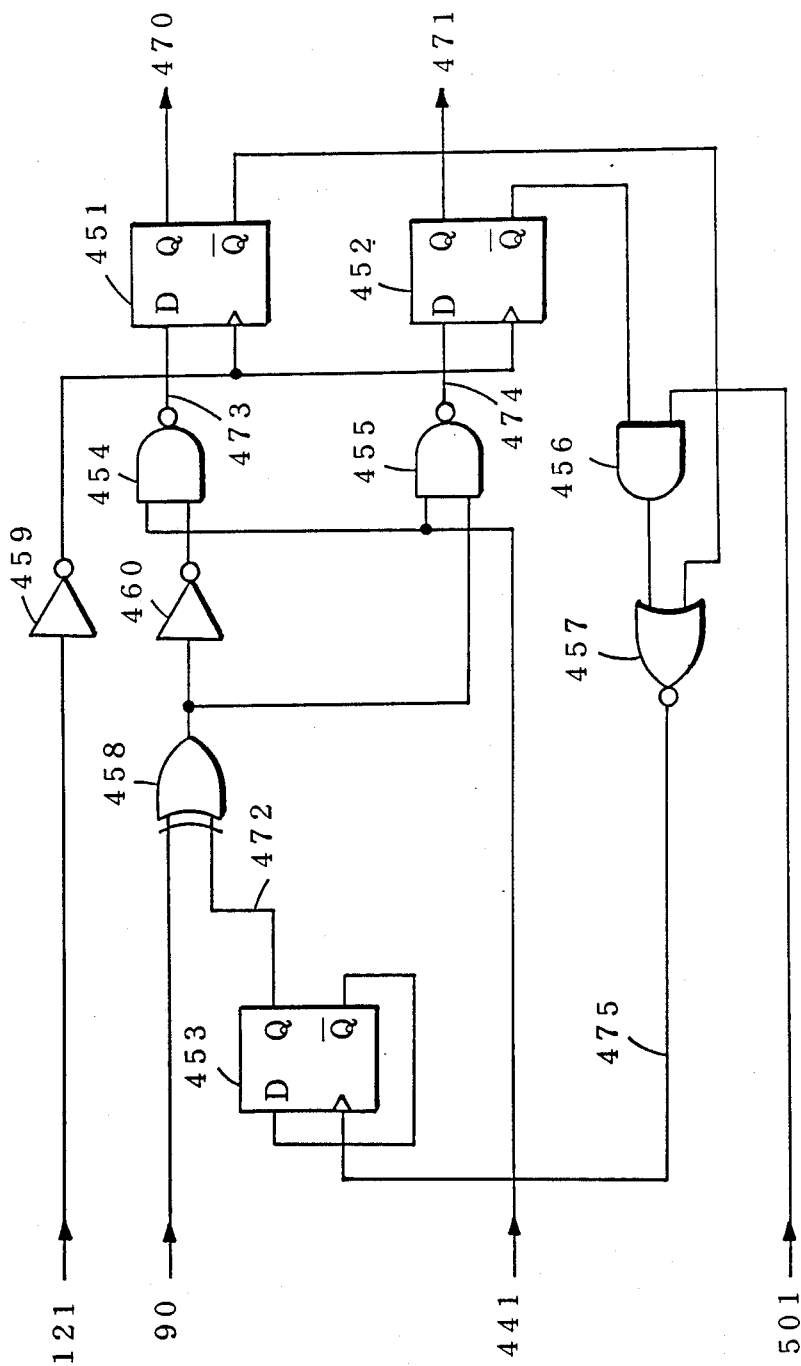
FIG. 32A is a circuit diagram illustrating an embodiment of a comparator 450 of FIG. 30A.
Figure 32B:
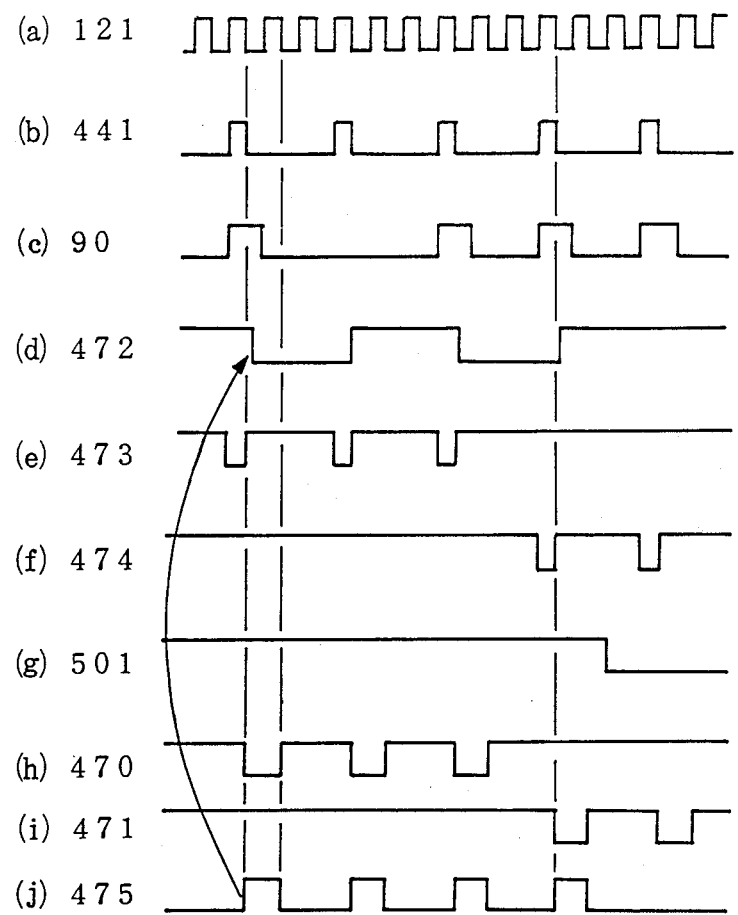
FIG. 32B is a time chart illustrating waveforms at various portions in the circuit diagram of FIG. 32A.

FIGS. 32A and 32B show a circuit diagram and a time chart of an embodiment of the comparator 450. In FIG. 32B (c), the signal to-be-demapped 90 indicates only the F-bit, and all the other data and control signals are "0s" in order to describe simply.

A data terminal D of a D flip flop 453 is connected to its output not-Q so that a signal 472 of (d) of its output Q is turned at every reception of a signal 475 in FIG. 32B (j). The signal 477 of (d) and the signal to-be-demapped 90 of (c) are exclusively ORed by an exclusively-OR gate 458 to deliver its output to a NAND gate 454 through an inverter 460 and to a NAND gate 455 directly. Both NAND gates 454 and 455 are applied the signal 441 to deliver signals 473 of (e) and 474 of (f) to data terminals of D flip-flops 451 and 452 respectively.

The standard clock 121 in FIG. 32B (a) is supplied to both clock terminals of D flip-flops 451 and 452 through an inverter 459. D flip-flops 451 and 452 deliver outputs Qs signals 470 of (h) and 471 of (i) respectively. The signal 470 of (h) showing a "0" is sent out when the signal to-be-demapped 90 is coincident with the signal 472 of (d). The signal 471 of (i) showing a "0" is sent out when the signal 90 is non-coincident with the signal 472 of (d).

An output not-Q of the D flip-flop 482 and the signal 501 of (g) are ANDed by an AND gate 456 which delivers an output to a NOR gate 457. The NOR gate 457 executes NORing an output not-Q of the D flip-flop 451 and an output of the AND gate 456 to obtain a signal 475 of (j) which is fed into a clock terminal of the D flip-flop 453. The signal 501 shows a "1" when the frame synchronization is established. When signals 501 and 471 show "0s", the D flip-flop 453 can not be inverted. When the signal 501 is "1" and the signal 471 is "0", the D flip-flop 453 can be inverted because of the non-coincidence. When the signal 470 is "0" showing the coincidence, the D flip-flop 453 can be inverted in spite of the states of the signal 501.

Figure 33A:
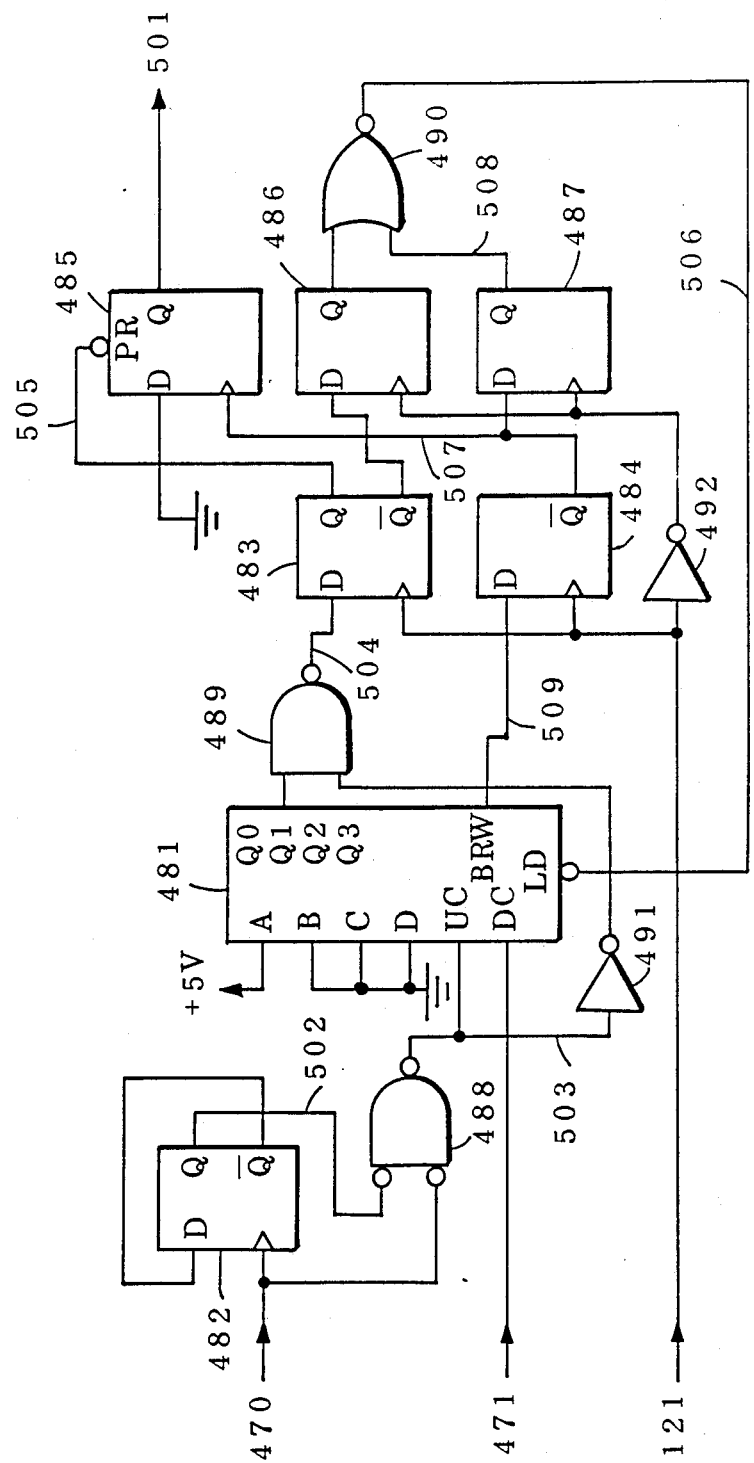
FIG. 33A is a circuit diagram illustrating an embodiment of a protection circuit 480 of FIG. 30A.

FIGS. 33A and 33B show a circuit diagram and a time chart of an embodiment of the protection circuit 480.

A data terminal of a D flip-flop 482 is connected to its output not-Q and its clock terminal is provided with the signal 470 of (a) showing the coincidence to obtain a signal 502 of (b) at its output Q.

The signals 502 in FIG. 33B (b) and 470 in (a) are applied to an OR gate 488 to be ORed. A signal 503 of (c) of the output of the OR gate 488 is applied to an up-count terminal UC of an up-down counter 481 of which a terminal A is connected to +5V ("1") and terminals B, C, D are grounded ("0s"). When a "0" is applied to its load terminal LD, the output Q0 is set to a "1", the outputs Q1, Q2 and Q3 are set to "0s". A down count terminal DC is applied a signal 471 of (d).

Receiving the signal 503 of (c) at the up-count terminal UC, outputs Q0 to Q3 of the counter 481 indicate 2 as shown in (e) by counting and the output Q1 shows 1 when the output Q0 is "1" and all outputs Q1 to Q3 are "0s". After that, when the signal 503 of (c) is turned from a "1"to a "0" to be delivered to a NAND gate 489 through an inverter 491, a signal 504 of (f) at the output of the NAND gate 489 is turned from a "1? to a "0". Receiving the signal 504 of (f) at a data terminal D and the standard clock 121 at a clock terminal, a D flip-flop 483 delivers a signal 505 of (h), which is turned from a "1" to a "0", to a preset terminal PR of a D flip-flop 485. Then the output Q signal 501 of the D flip-flop 485 goes from a "0" to a "1" as shown in (i) of FIG. 33B.

A D flip-flop 488 delivers its output not-Q to a data terminal of a D flip-flop 486 which is applied the standard clock 121 at its clock terminal through an inverter 492. Then the D flip-flop 486 sends out an output Q indicating a signal polarity reverse to the polarity of the first occurrence of a "0" in FIG. 33B (j). The output Q of the D flip flop 486 is delivered to a NOR gate 490 to obtain a signal 506 of (j).

The signal 506 of (j) is applied to a load terminal LD of the up-down counter 481 to load a "1" of terminals A to D so that outputs Q0 to Q3 of (e) show a value 1 again.

When a down-count terminal DC of the up-down counter 481 is applied the signal 471 of (d) showing the non-coincidence, outputs Q0 to Q3 of (e) indicate a value Receiving the second occurrence of a "0" of the signal 471 of (d), the up-down counter 481 counts to negative to deliver signal 509 of (k) showing a "0" from its borrow terminal BRW.

The signal 609 is applied to a data terminal of a D flip-flop 484 which receives the standard clock 121 of (g) at its clock terminal to obtain a signal 507 of (l) at its output not-Q.

The signal 507 is applied to a clock terminal of a D flip-flop 485 of which output Q being a signal 501 of (i) goes from a "1" to a "0". The signal 507 of (l) is also applied to data terminal D of a D flip-flop 487 which delivers a signal 508 of (m) from its output Q. The signal 508 of (m) is applied to the NOR gate 490 to obtain the second occurrence of "0" of the signal 506 of (j) which is delivered to the load terminal LD of the up-down counter 481 which is loaded with a "1" being set at terminals A to D to obtain outputs Q0 to Q3 of (e) showing a value 1 again.

In this manner, the up-counting operation is executed by the signal 470 of (a) and the down-counting operation by the signal 471 of (d) continuously. When four "0s" of the signal 470 showing the coincidence are successively applied to the circuit shown in FIG. 33A, the signal 501 of (i) is turned from a "0" to a "1". When two "0s" of the signal 471 showing the non-coincidence are successively applied, the same from a "1" to a "0".

Figure 34:
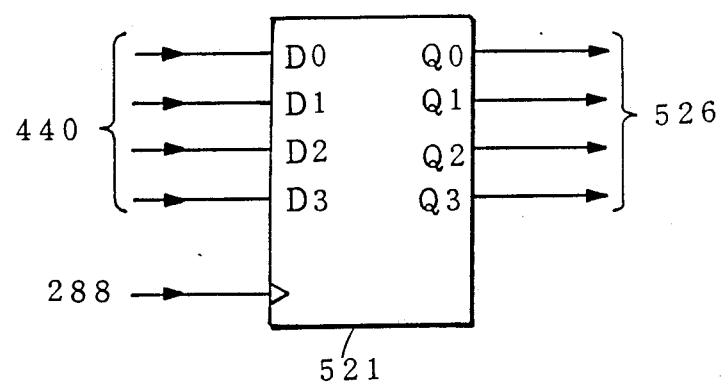
FIG. 34 is a circuit diagram illustrating an embodiment of a latch circuit 520 of FIG 30A.

FIG. 34 shows a circuit diagram of an embodiment of the latch circuit 520 in which a latch 521 receives the bus signal 440 designating frame numbers. The latch 521 sends out outputs Q0 to Q3 as the signal 526 (refer to FIG. 15B (d)) at every reception of the signal 288 (refer to FIG. 15B (c)).

Figure 35A:
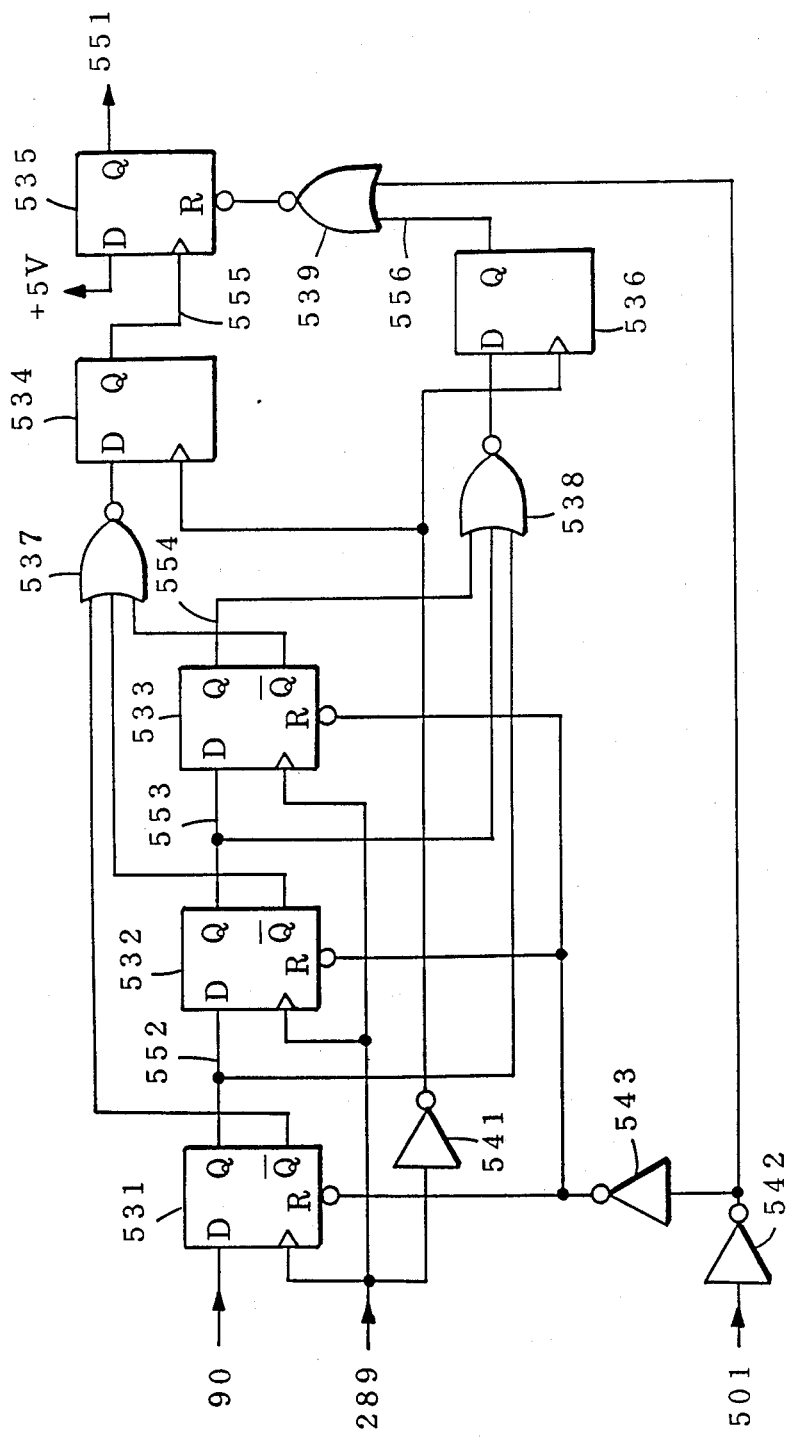
FIG. 35A is a circuit diagram illustrating an embodiment of a SY-bit receiving circuit 530 of FIG. 29A.
Figure 35B:
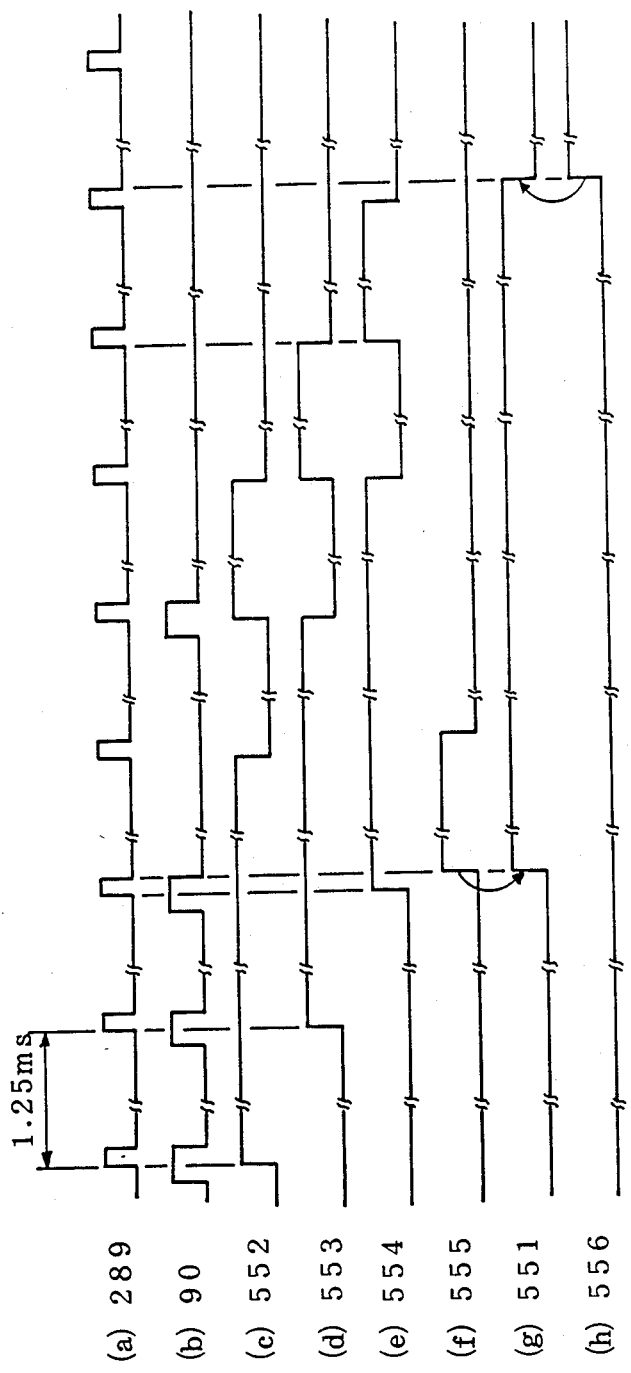
FIG. 35B is a time chart illustrating waveforms at various portions in the circuit diagram of FIG. 35A.

FIGS. 35A and 35B show a circuit diagram and its time chart of an embodiment of the SY-bit receiving circuit 530. In FIG. 35B (b), the signal to-be-demapped 90 indicates the only SY-bits and all the other data and control signals are "0s" in order to describe simply.

A signal 501 applied to reset terminals Rs of D flip-flops 531, 532 and 533 through two inverters 542 and 543.

The signal to be demapped 90 in FIG. 35B (b) is applied to a data terminal D of the D flip-flop 531 during a "1" of the signal 501, and a signal 289 of (a) is applied to a clock terminal of the D flip-flop 681 to obtain an output Q as a signal 552 of (c). The signal 552 is applied to a data terminal of the D flip flop 532 to obtain a signal 658 of (d) at its output Q. The signal 553 is applied to a data terminal of the D flip-flop 533 to obtain a signal 554 of (e) at its output Q.

Each output not-Q of D flip flops 531, 532 and 633 is applied to a NOR gate 537 which delivers an output to a data terminal D of a D flip-flop 534. The D flip-flop 534 receives a signal 289 in FIG. 35B (a) at its clock terminal via an inverter 541 to obtain a signal 555 of (f) at its output Q.

Each output Q of D flip-flops 531, 532 and 533 is applied to a NOR gate 538 which delivers an output to a data terminal of a D flip-flop 586. The flip-flop 636 receives a signal 289 in FIG. 35B (a) through the inverter 541 to obtain a signal 556 of (h) at its output Q.

A D flip-flop 535, which is set "1" (+5V) at its data terminal D, receives a signal 556 of (h) and the signal 501, which is inverted by the inverter 842, through a NOR gate 539, and receives the signal 555 of (f) at its clock terminal. When signals 501 and 556 show a "1" and a "0" respectively, the reset terminal R of &he D flip-flop 535 is set a "1" so that when the signal 555 of (f) is applied, the signal 551 of its output Q in (g) goes to a "1" as shown in FIG. 35B (g). After that, when all signals 552 of (c), 553 of (d) and 554 of (e) show "0s", the D flip-flop 536 receives a "1" at its data terminal D so that the output signal 556 of the D flip flop 536 in (g) is turned from a "0" to a "1" by receiving the signal 289 of (a) through the inverter 541 at its clock terminal. The signal 556 is applied to the reset terminal R of the D flip-flop 535 through the NOR gate 539 to set a "0", so that the output Q of the D flip-flop 535 is changed from a "1" to a "0" as the signal 551 of (g).

When the signal 501, which indicates synchronous state, is a "0", the D flip-flop 535 is reset with a "0" of its reset terminal R to always show "0" of the signal 551.

The SY-bit receiving circuit 530 as shown in FIG. 35A samples the signal to-be demapped 90 in FIG. 35B (b), which indicates only SY-bits, by the signal 289 of (a) for sampling SY-bits When "1s" of SY-bits of the signal 90 have been successively sampled three times, the SY-bit receiving circuit 530 detects that the data circuit terminating equipment of the other party is in the state synchronous with the F-bits and turns the signal 551 of (g) from a "0" to a "1". inversely, when "0s" of SY-bits of the signal 90 have been successively sampled three times by the signal 289 of (a), the SY-bit receiving circuit 530 detects that the data circuit-terminating equipment of the other party is in the state asynchronous with F-bits and turns the signal 551 of (g) from a "1" to a "0".

Figure 36A:
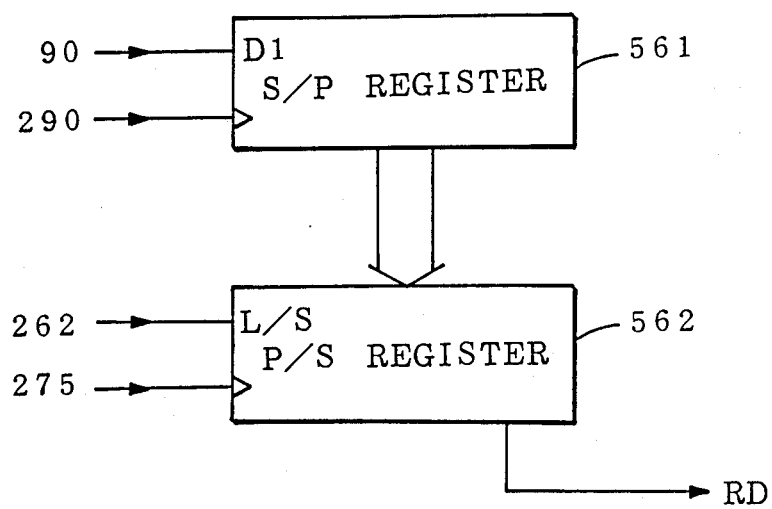
FIG. 36A is a circuit diagram illustrating an embodiment of an RD receiving circuit 560 of FIG. 29A.
Figure 36B:
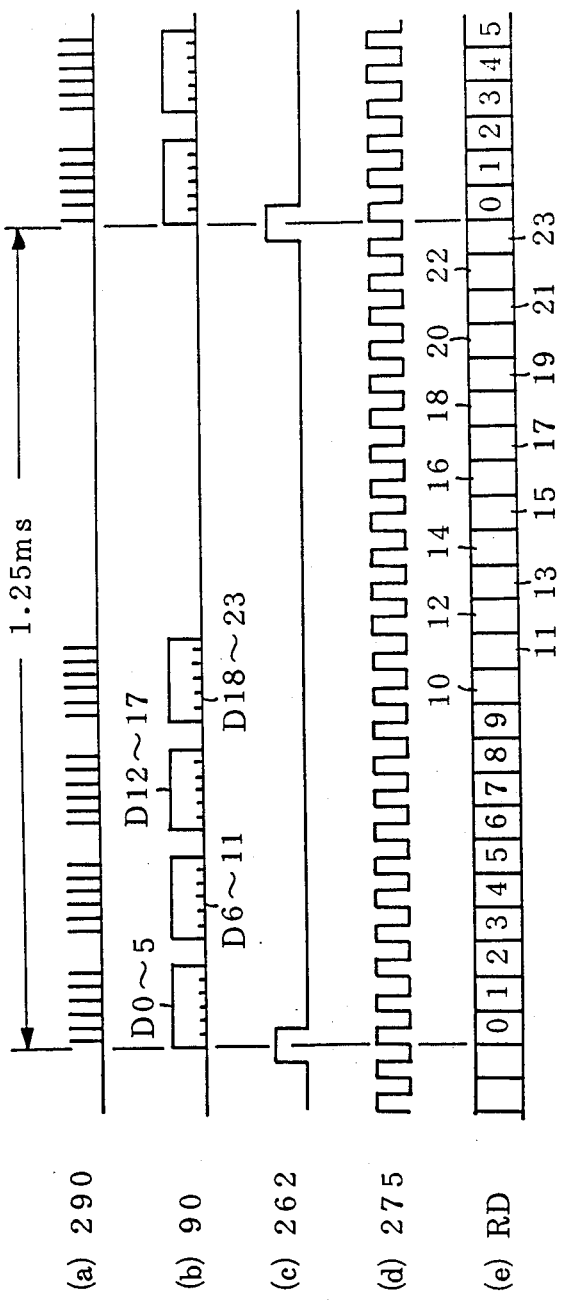
FIG. 36B is a time chart illustrating waveforms at various portions in the circuit diagram of FIG. 36A.

FIGS. 36A and 36B show a circuit diagram and a time chart of an embodiment of the RD receiving circuit 560, in which the signal to-be-demapped 90 in FIG. 36B (b) indicates the only data signal, and all the other control signals are "0s" in order to describe simply.

A S/P register 561, which converts serial input data of 24-bits to parallel data, receives the signal to-be-demapped 90 at its data input DI to sample and load the signal 90 by the signal 290 of (a) applied at its clock terminal so that the loaded parallel data of 24-bits are sent out. The parallel data of 24-bits is applied to a P/S register 562 to convert the parallel data to serial data.

The P/S register 562 is loaded the parallel data by a "1" of a signal 262 of (c) and delivers the receiving data RD of (e) in series by a clock 275 of (d) during a "0" of the signal 262 in FIG. 36B (c).

Figure 37A:
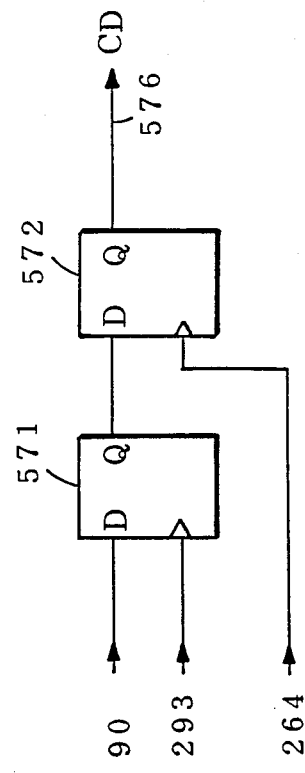
FIG. 37A is a circuit diagram illustrating an embodiment of an CD receiving circuit 570 of FIG. 29A.
Figure 37B:
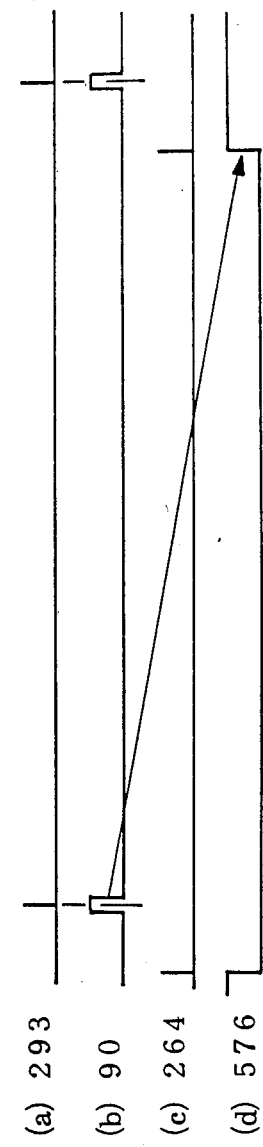
FIG. 37B is a time chart illustrating waveforms at various portions in the circuit diagram of FIG. 37A.

FIGS. 37A and 37B show a circuit diagram and a time chart of an embodiment of the CD receiving circuit 570 in which the signal to-be-demapped 90 in FIG. 37B (b) indicates only the carrier detect signal CD, and the other control and data signals are shown as "0s".

A D flip-flop 571 receives the signal to-be-demapped 90 at its data terminal D in FIG. 37B (b) and a signal 293 of (a) at its clock terminal to deliver its output to a data terminal D of a D flip-flop 572. After that, when a signal 264 of (c) is applied to a clock terminal of the D flip-flop 572, a signal 576 of (d) of its output Q turns from a "0" to a "1". When the signal 90 of (b) indicating only the signal CD shows a "0" and the next signal 264, the D flip-flop 572 delivers a "0" of the signal 576 which is the carrier detect signal CD on reception of the signal 264 of (c). An arrow of FIG. 37B indicates that the signal to-be-demapped 90 of (b) is sent out with the signal 576 arrowed in (d).

Figure 38A:
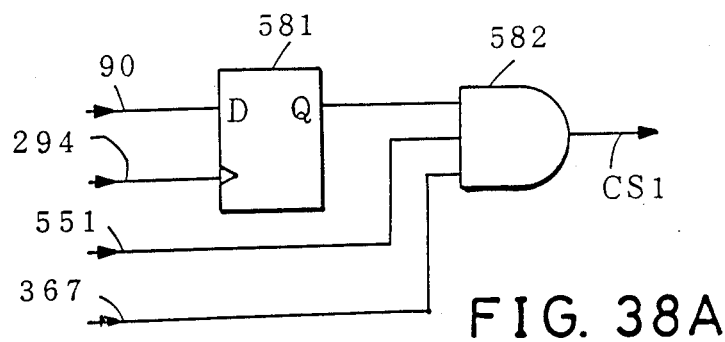
FIG. 38A is a circuit diagram illustrating an embodiment of a CS receiving circuit 580 of FIG. 29A.

FIG. 38A shows a circuit diagram of an embodiment of the CS receiving circuit 580. A D flip-flop 581 receives the signal to-be-demapped 90 in FIG. 29B (b) at its data terminal D and a signal 294 in FIG (1). 29B which has a repetition rate of 1.25 milliseconds a& its clock terminal to obtain an output Q. The output Q is applied to an AND gate 582 which receives signals 367 (refer to FIG. 27B (d)) and 551 (refer to FIG. 35B (g)) to deliver the clear-to-send signal CS1 (refer to FIG. 29B (m)) to the data terminal equipment. Receiving the signal CS1 through the start-stop synchronizing circuit 600, the data terminal equipment can start to send out data.

Figure 38B:
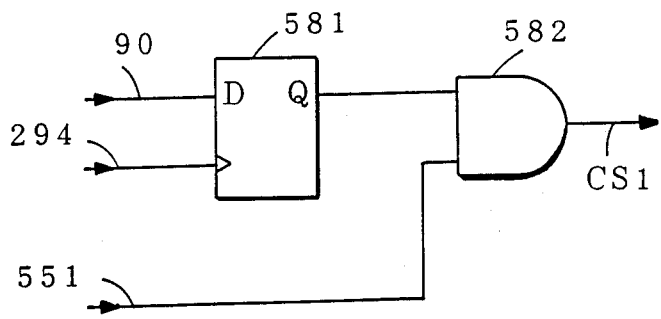
FIG. 38B is a circuit diagram illustrating an embodiment of a CS receiving circuit 580B of FIG. 29C.

FIG. 38B shows a circuit diagram of an embodiment of the CS receiving circuit 580B of DCEs 5A-2, 5B-2, 5C-2 and 5Z-2 for V25 bis of CCITT shown in FIG. 8D. There is a difference in FIG. 38B from FIG. 38A. In FIG. 38B, an AND gate 582 does not need the signal 367 based on the signal RS1. The circuit of FIG. 38B executes the same operation as that of FIG. 38A. The reason not to require the signal 367 has been descrived in FIG. 29C.

Figure 39:
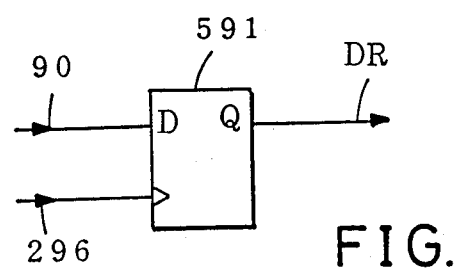
FIG. 39 is a circuit diagram illustrating an embodiment of a DR receiving circuit 590 of FIG. 29A.

FIG. 39 shows a circuit diagram of an embodiment of the DR receiving circuit 590. A D flip-flop 591 receives the signal to-be-demapped 90 in FIG. 29B (b) at its data terminal D and the signal 296 in FIG 29B (n) at its clock terminal and delivers the data set ready signal DR in FIG. 29B (p).

The CI receiving circuit 595 has the same circuit as that of the DR receiving circuit 590 shown in FIG. 89 in which the signal 296 is replaced by the signal 297 in FIG. 29B (q), the signal DR by the call indicator signal CI in FIG. 29B (r).

In this manner, the demapping circuit 400 delivers various signals RD, CS, CD, DR and CI in parallel to the data terminal equipment.

It is obvious from the abovementioned that as the data circuit-terminating equipment according to the present invention can be connected with a PCM transmission line which has various transmission rate, the data terminal equipment can communicate in the start-stop synchronous state at the speed to be required by the data terminal equipment without any operation.

Further, the DCE, which satisfies the recommendations of the V25 bis of CCITT, can process an address as one of data to be transmitted.

While the preferred form of the present invention has been described, it is to be understood that modifications will be apparent those skilled in the art without departing from the spirit of the invention.

The scope of the invention, therefore, is to be determined solely by the claims.

What is claimed is:

1. A data circuit-terminating equipment for connecting a start-stop synchronous data terminal equipment with a PCM transmission line which can transmit at various transmission rates by means of accommodating data and control signals in a multiframe construction by using at least a PCM synchronization signal and at least a PCM clock, wherein said data circuit-terminating equipment comprises:

start-stop synchronizing means for sampling a request-to-send signal and send data, which are transmitted from said start-stop synchronous data terminal equipment, with a sampling clock of which repetition rate is higher than a repetition rate of said send data in which said sampling clock is synchronized with a standard clock, for delivering said sampled request-to-send signal and said sampled send data, and for transmitting a clear-to-send signal to said start-stop synchronous data terminal equipment corresponding with data volume of said sampled send data to be sent out;

mapping means for mapping said sampled request-to-send signal, said samples send data and control signals from said start-stop synchronizing means in a predetermined procedure and for constructing multiframes to send out a mapped signal;

sending register means for registering said mapped signal to send out at a transmission rate of said PCM transmission line at a timing being determined by said PCM synchronization signal and said PCM clock to said PCM transmission line;

receiving register means for receiving and registering data and control signals of multiframes which are received from said PCM transmission line at said transmission rate and for delivering a signal to-be-demapped at a predetermined timing synchronized with said PCM synchronization signal;

demapping means for demapping said signal to-be-demapped to obtain demapped data and control signals and for delivering said demapped data and control signals to said start-stop synchronous data terminal equipment at a predetermined timing;

PLL means including a phase-locked loop for generating said standard clock which synchronizes with said PCM synchronization signal; and timing generating means for generating required timing signals from said standard clock, said PCM synchronizatioan signal and said PCM clock which are supplied to said start-stop synchronizing means, said sending register means, said receiving register means, said mapping means and said demapping means.

2. A data circuit-terminating equipment as claimed in claim 1, wherein said sending register means includes a register which receives data to send out.

3. A data circuit-terminating equipment as claimed in claim 1, wherein said receiving register means includes a register which receives data to send out.

4. A data circuit-terminating equipment as claimed in claim 1, wherein said PLL means comprises:

clock generating means for generating a PLL clock of which repetition rate is higher than a repetition rate of said standard clock:

dividing means for dividing said PLL clock at a dividing ratio being instructed with phase control signals to obtain said standard clock;

phase comparing means for comparing a phase of an dividing operation of said dividing means and a phase of said PCM synchronization signal to obtain a compared result: and dividing ratio controlling means for obtaining said phase control signals by receiving said compared result.

5. A data circuit-terminating equipment as claimed in claim 1, wherein said mapping means comprises F-bit sending means for sending out bits which show at least frames;

SD sending means for sending out said sampled send data; and

RS sending means for sending out said sampled request-to-send signal.

6. A data circuit-terminating equipment as claimed in claim 1, wherein said demapping means comprises:
- F-bit receiving means for receiving F-bits which show at least frames in which said F bits are included in said signal to be demapped;
- RD receiving means for receiving data which are included in said signal to-be-demapped; and
- CD receiving means for receiving a carrier detect signal which is included in said signal to-be-demapped.

7. A data circuit-terminating equipment as claimed in claim 1, wherein said mapping means comprises:
- F-bit sending means for sending out bits which show at least frames;
- SD sending means for sending out said sampled send data;
- CS' sending means for sending out a clear-to-send signal which is transmitted from said data terminal equipment;
- CI' sending means for sending a call indicator signal which is transmitted from said data terminal equipment;
- SY-bit sending means for sending out SY-bits which indicates a synchronous state;
- RS sending out said sampled requestto-send signal;
- ER sending means for sending out a equipment ready signal which is transmitted from said data terminal equipment; and
- multiplexing means for multiplexing outputs of said F-bit sending means, said SD sending means, said CS' sending means, said CI' sending means, said SY-bit sending means, said RS sending means, and said ER sending means to deliver said mapped signal.

8. A data circuit-terminating equipment as claimed in claim 1, wherein said demapping means comprises:
- F-bit receiving means for receiving F bits Which show a least frames in which said F-bits are included in said signal to be demapped
- RD receiving means for receiving data which are included in said signal to-be-demapped;
- CS receiving means for receiving a clear-to-send signal which is included in said signal to-be-demapped;
- CI receiving means for receiving a call indicator signal which is included in said signal to-be-demapped;
- SY-bit receiving means for receiving SY-bits which show a synchronized state in which said SY-bits are included in said signal to-be-demapped
- CD receiving means for receiving a carrier detect signal which is included in said signal to-be-demapped; and
- DR receiving means for receiving a data set ready signal which is included in said signal to-be-demapped.

9. A data circuit-terminating equipment as claimed in claim 1, wherein said timing generating means comprises:
- register timing means for delivering timing signals to said sending register means and said receiving resister means by receiving said standard clock and a frame indication signal which indicates frames;
- clock timing means for delivering a mapping clock and a timing signal indicating positions to be mapped to said mapping means, a demapping clock and a timing signal indicating positions to be demapped to said mapping means, a mapping position signal which indicates each position of bits of frames in said mapping means and a timing signal to said start-stop synchronizing means by receiving said standard clock, said PCM synchronization signal and said PCM clock;
- receiving timing means for receiving said standard clock, said mapping position signal and a signal which indicates each position of frames in said signal to-be-demapped and for delivering a signal which indicates each position of bits of frames in said demapping means.

10. A data circuit-terminating equipment as claimed in claim 8, wherein said F-bit receiving means comprises:
- frame counting means for receiving said standard clock, a signal which indicates each interval between frames in said signal to-be-demapped, a signal indicating coincidence, a signal indicating noncoincidence, and a signal indicating a synchronized state to deliver each frame number and a timing signal which indicates outputs of predetermined frame numbers;
- comparing means including a flip-flop flip-flopping at every reception of said timing signal which indicates outputs of predetermined frame numbers, for receiving said signal to-be-demapped, said standard clock and said signal indicating said synchronized state, and for comparing a state of said flip-flop with said signal to-be-demapped &o deliver said signal indicating coincidence when a coincidence is obtained in said comparing and to deliver said signal indicating noncoincidence when a noncoincidence is obtained in said comparing; and
- protection means for sending out said signal indicating said synchronized state on successive reception of a predetermined number of signals indicating said coincidence and for not sending out said signal indicating said synchronized state on successive receipts of a predetermined number of signals indicating said noncoincidence to protect a synchronized state.

11. A data circuit-terminating equipment as claimed in claim 1, wherein said start-stop synchronizing means comprises:
- start-stop synchronizing detection means for sampling said send data and said request-to-send signal, which are transmitted from said start-stop synchronous data terminal equipment, with said sampling clock, for delivering said sampled send data to be temporary stored and said sampled request-to-send signal to be temporary stored, and for transmitting a stop-bit detection signal when a stop-bit is detected in said data from said start-stop synchronous data terminal equipment: and
- error frequency absorbing buffer means for temporary storing said sampled send data to be temporary stored and said sampled request-to-send signal to be temporary stored by means of said stop-bit detection signal, for transmitting said temporary stored data and signal as said sampled send data and said sampled request-to-send signal respectively by means of a sending clock which has a same repetition rate as that of said send data from said start-stop synchronous data terminal equipment and synchronizes with said standard clock, for processing said demapped data by first in first-out, and for absorbing a error frequency between said send data from said start-stop synchronous data terminal equipment and said sending clock by delivering a clear-to-send signal till data volume not to have been sent out reaches a predetermined value.

12. A data circuit-terminating equipment for connecting a start-stop synchronous data terminal equipment with a PCM transmission line which can transmit at various transmission rates by means of accommodating data and control signals in a multiframe construction by using at least a PCM clock, wherein said data circuit-terminating equipment comprises:

start-stop synchronizing means for sampling a request-to-send signal and send data, which are transmitted from said start-stop synchronous data terminal equipment, with a sampling clock of which repetition rate is higher than a repetition rate of said send data in which said sampling clock is synchronized with a standard clock, for delivering said sampled request-to-send signal and said sampled send data, and for transmitting a clear-to-send signal to said start-stop synchronous data terminal equipment corresponding with data volume of said sampled send data to be sent out;

mapping means for mapping said sampled request-to-send signal, said sampled send data and control signals, which include at least a clear-to-send signal, from said start-stop synchronizing means in a predetermined procedure and for constructing multiframes to send out a mapped signal;

sending register means for registering said mapped signal to send out at a transmission rate of said PCM transmission line at a timing being determined by said PCM synchronization signal and said PCM clock to said PCM transmission line;

receiving register means for receiving and registering data and control signals of multiframes which are received from said PCM transmission line at said transmission rate and for delivering a signal to-be-demapped at a predetermined timing synchronized with said PCM synchronization signal;

demapping means for demapping said signal to-be-demapped to obtain demapped data and control signals which include at least a carrier detect signal and for delivering said demapped data and control signals to said start-stop synchronous data terminal equipment at a predetermined timing;

PLL means including a phase-locked loop for generating said standard clock which synchronizes with said PCM synchronization signal;

timing generating means for generating required timing signals from said standard clock, said PCM synchronization signal and said PCM clock which are supplied to said start-stop synchronizing means, said sending register means, said receiving register means, said mapping means and said demapping means; and shorting means for shorting to make said carrier detect signal from said demapped means into said clear-to-send signal in said mapping means.

13. A data circuit-terminating equipment as claimed in claim 12, wherein said sending register means includes a register which receives data to send out.

14. A data circuit-terminating equipment as claimed in claim 12, wherein said receiving register means includes a register which receives data to send out.

15. A data circuit-terminating equipment as claimed in claim 12, wherein said PLL means comprises:

clock generating means for generating a PLL clock of which repetition rate is higher than a repetition rate of said standard clock;

dividing means for dividing said PLL clock at a dividing ratio being instructed with phase control signals to obtain said standard clock;

phase comparing means for comparing a phase of an dividing operation of said dividing means and a phase of said PCM synchronization signal to obtain a compared result; and dividing ratio controlling means for obtaining said phase control signals by receiving said compared result.

16. A data circuit-terminating equipment as claimed in claim 12, wherein said mapping means comprises:

CS' sending means for detecting said clear-to-send signal to send out by receiving said carrier detect signal as said clear-to-send signal through said shorting means:

F-bit sending means for sending out bits which show at least frames;

SD sending means for sending out said sampled send data; and

RS sending means for sending out said sampled request-to-send signal.

17. A data circuit-terminating equipment as claimed in claim 12, wherein said demapping means comprises:

F-bit receiving means for receiving F bits which show at least frames in which said F-bits are included in said signal to-be-demapped;

RD receiving means for receiving data which are included in said signal to-be-demapped; and CD receiving means for receiving a carrier detect signal which is included in said signal to-be-demapped.

18. A data circuit-terminating equipment as claimed in claim 12, wherein said mapping means comprises:

F-bit sending means for sending out bits which show at least frames;

SD sending means for sending out said sampled send data:

CS' sending means for sending out a clear-to-send signal which is transmitted from said data terminal equipment;

CI' sending means for sending a call indicator signal which is transmitted from said data terminal equipment;

SY-bit sending means for sending out SY-bits which indicates a synchronous state;

RS sending means for sending out said sampled request-to-send signal;

ER sending means for sending out a equipment ready signal which is transmitted from said data terminal equipment; and multiplexing means for multiplexing outputs of said F-bit sending means, said SD sending means, said CS' sending means, said CI' sending means, said SY-bit sending means, said RS sending means, and said ER sending means to deliver said mapped signal.

19. A data circuit-terminating equipment as claimed in claim 12, wherein said demapping means comprises:

F-bit receiving means for receiving F-bits which show at least frames in which said F-bits are included in said signal to-be-demapped;

RD receiving means for receiving data which are included in said signal to-be-demapped;

CS receiving means for receiving a clear-to-send signal which is included in said signal to-be-demapped;

CI receiving means for receiving a call indicator signal which is included in said signal to-be-demapped;

SY-bit receiving means for receiving SY-bits which show a synchronized state in which said SY-bits are included in said signal to-be-demapped;

CD receiving means for receiving a carrier detect signal which is included in said signal to-be-demapped: and DR receiving means for receiving a data set ready signal which is included in said signal to-be-demapped.

20. A data circuit-terminating equipment as claimed in claim 12, wherein said timing generating means comprises:

register timing means for delivering timing signals to said sending register means and said receiving register means by receiving said standard clock and an frame indication signal which indicates frames;

clock timing means for delivering a mapping clock and a timing signal indicating positions to be mapped to said mapping means, a demapping clock and a timing signal indicating positions to be demapped to said mapping means, and a mapping position signal which indicates each position of bits of frames in said mapping means and a timing signals to said start-stop synchronizing means by receiving said standard clock, said PCM synchronization signal and said PCM clock;

receiving timing means for receiving said standard clock, said mapping position signal and a signal which indicates each position of frames in said signal to-be-demapped demapped and for delivering a signal which indicates each position of bits of frames in said demapping means.

21. A data circuit terminating equipment as claimed in claim 19, wherein said F-bit receiving means comprises:

frame counting means for receiving said standard clock, a signal which indicates each interval between frames in said signal to-be-demapped, a signal indicating coincidence, a signal indicating noncoincidence, and a signal indicating a synchronized state to deliver each frame number and a timing signal which indicates outputs of predetermined frame numbers;

comparing means including a flip-flop flip-flopping at every reception of said timing signal which indicates outputs of predetermined frame numbers for receiving said signal to-be-demapped, said standard clock and said signal indicating said synchronized state and for comparing a state of said flip-flop with said signal to-be-demapped to deliver said signal indicating coincidence when a coincidence is obtained in said comparing and to deliver said signal indicating noncoincidence When a noncoincidence is obtained in said comparing; and protection means for sending out said signal indicating said synchronized state on successive reception of a predetermined number of signals indicating said coincidence and for not sending out said signal indicating said synchronized state on successive receipts of a predetermined number of signals indicating said noncoincidence to protect a synchronized state.

22. A data circuit-terminating equipment as claimed in claim 12, wherein said start-stop synchronizing means comprises:

start-stop synchronizing detection means for sampling said send data and said request-to-send signal, which are transmitted from said start-stop synchronous data terminal equipment, with said sampling clock, for delivering said sampled send data to be temporary stored and said sampled request-to-send signal to be temporary stored, and for transmitting a stop-bit detection signal when a stop-bit is detected in said data from said start-stop synchronous data terminal equipment; and error frequency absorbing buffer means for temporary storing said sampled send data to be temporary stored and said sampled request-to-send signal to be temporary stored by means of said stop-bit detection signal, for transmitting said temporary stored data and signal as said sampled send data and said sampled request-to-send signal respectively by means of a sending clock which has a same repetition rate as that of said send data from said start-stop synchronous data terminal equipment and synchronizes with said standard clock, for processing said demapped data by first-in first-out, and for absorbing a error frequency between said send data from said start-stop synchronous data terminal equipment and said sending clock by delivering a clear-to-send signal till data volume not to have been sent out reaches a predetermined value.

* * * * *